United States Patent
Kim et al.

(10) Patent No.: US 9,456,130 B2
(45) Date of Patent: Sep. 27, 2016

(54) APPARATUS FOR PROCESSING A SERVICE AND METHOD THEREOF

(71) Applicant: LG ELECTRONICS INC., Seoul (KR)

(72) Inventors: Jayoen Kim, Seoul (KR); Daeyol Na, Seoul (KR)

(73) Assignee: LG ELECTRONICS INC., Seoul (KR)

(*) Notice: Subject to any disclaimer, the term of this patent is extended or adjusted under 35 U.S.C. 154(b) by 429 days.

(21) Appl. No.: 13/734,652

(22) Filed: Jan. 4, 2013

(65) Prior Publication Data

US 2013/0176415 A1 Jul. 11, 2013

Related U.S. Application Data

(60) Provisional application No. 61/583,609, filed on Jan. 6, 2012.

(30) Foreign Application Priority Data

| Mar. 6, 2012 | (KR) | 10-2012-0022696 |
| Mar. 6, 2012 | (KR) | 10-2012-0022697 |
| Mar. 6, 2012 | (KR) | 10-2012-0022698 |

(51) Int. Cl.

| *H04N 5/232* | (2006.01) |
| *H04N 21/41* | (2011.01) |
| *H04N 21/422* | (2011.01) |
| *H04N 21/4223* | (2011.01) |

(Continued)

(52) U.S. Cl.
CPC ..... *H04N 5/23219* (2013.01); *H04M 1/72533* (2013.01); *H04N 21/4122* (2013.01); *H04N 21/4126* (2013.01); *H04N 21/422* (2013.01); *H04N 21/4223* (2013.01); *H04N 21/436* (2013.01); *H04N 21/4402* (2013.01); *H04N 21/44218* (2013.01)

(58) Field of Classification Search
CPC .......... A63F 2300/409; H04N 21/43615; H04N 21/27; H04N 21/4302
See application file for complete search history.

(56) References Cited

U.S. PATENT DOCUMENTS

| 7,650,057 B2 * | 1/2010 | Takeshita ............ 386/248 |
| 2006/0188234 A1 | 8/2006 | Takeshita |

(Continued)

FOREIGN PATENT DOCUMENTS

| CN | 101800816 A | 8/2010 |

OTHER PUBLICATIONS

Dickie et al., "eyeLook: Using Attention to Facilitate Mobile Media Consumption," UIST'05, Oct. 23-27, 2005, XP_55108961A, pp. 103-106.

(Continued)

*Primary Examiner* — Joseph Ustaris
*Assistant Examiner* — Zhubing Ren
(74) *Attorney, Agent, or Firm* — Birch, Stewart, Kolasch & Birch, LLP

(57) ABSTRACT

A display device including a display configured to display multimedia contents; a wireless communication unit configured to wirelessly communicate with at least one external mobile terminal; a camera unit configured to sense an eye movement of a user holding the mobile terminal; and a controller configured to receive indication signals from the mobile terminal indicating at least one of a grip pattern and eye movement of the user holding the mobile terminal, and to control a streaming operation of streaming the multimedia contents displayed on the display to the mobile terminal.

28 Claims, 46 Drawing Sheets

(51) Int. Cl.
  *H04N 21/436*   (2011.01)
  *H04N 21/4402*  (2011.01)
  *H04N 21/442*   (2011.01)
  *H04M 1/725*    (2006.01)

(56) References Cited

U.S. PATENT DOCUMENTS

2006/0256133 A1    11/2006  Rosenberg
2007/0002016 A1*    1/2007  Cho et al. .................. 345/157
2007/0271518 A1    11/2007  Tischer et al.
2011/0167447 A1     7/2011  Wong
2013/0027337 A1     1/2013  Chen

OTHER PUBLICATIONS

Harvell et al., "The Complete guide to AirPlay: Tutorial: How to stream movies and music all around your house" www.techradar.com, Jul. 21, 2011, XP_2687957A, pp. 1-7.

Hinckley et al., "Sensing Techniques for Mobile Interaction," UIST'00, Nov. 5-8, 2000, XP_1171596A, pp. 91-100.

Hinckley et al., "Toward More Sensitive Mobile Phones," ACM UIST 2011 Symposium on User Interface Software & Technology, 2001, XP_55108963A, 2 pages.

Kim et al., "Hand Grip Pattern Recognition for Mobile User Interfaces," American Association for Artificial Intelligence, 2006, XP_2718299A, pp. 1789-1794.

* cited by examiner

FIG. 16
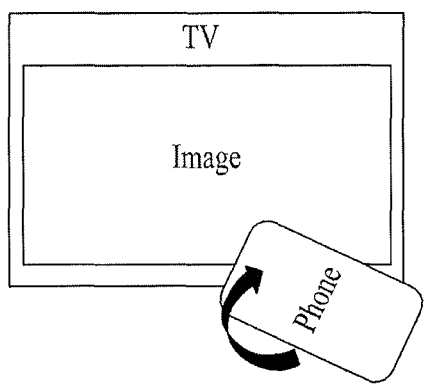
(a)
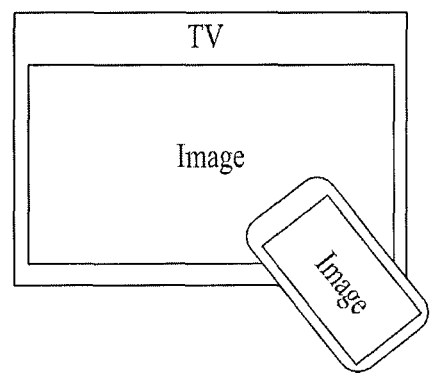
(b)
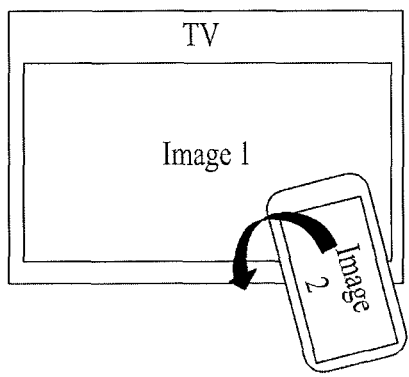
(c)
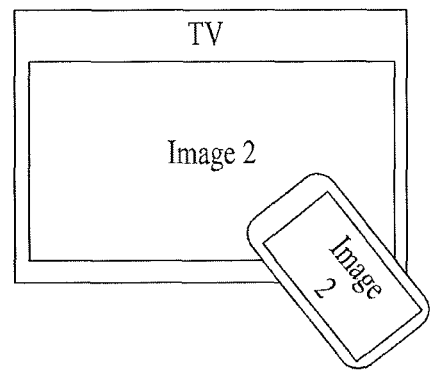
(d)

FIG. 21
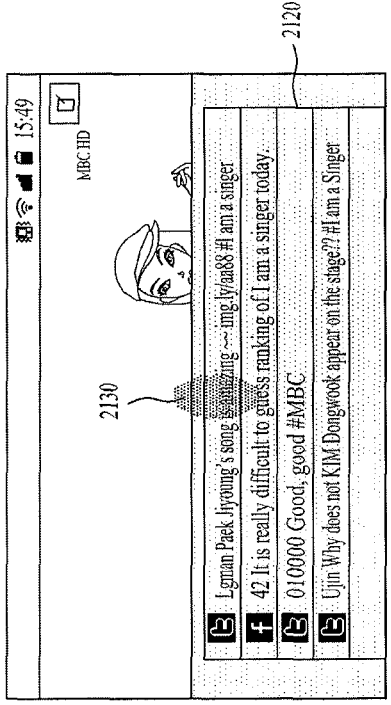
(a)
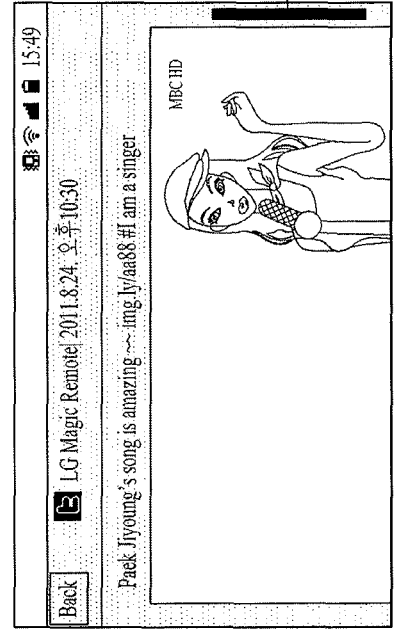
(b)
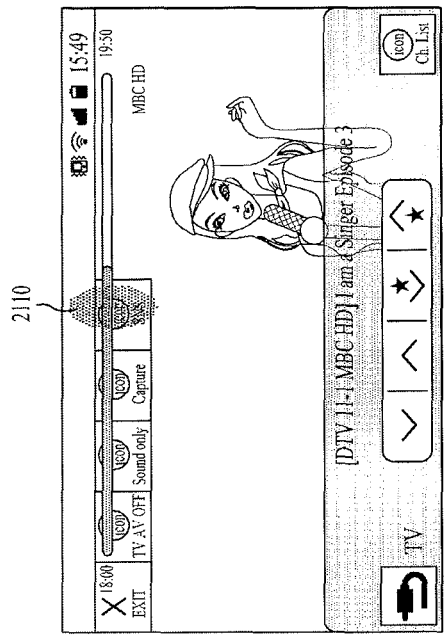
(c)
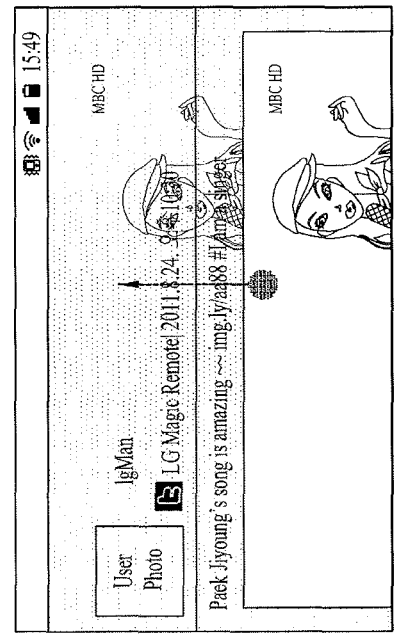
(d)

FIG. 24
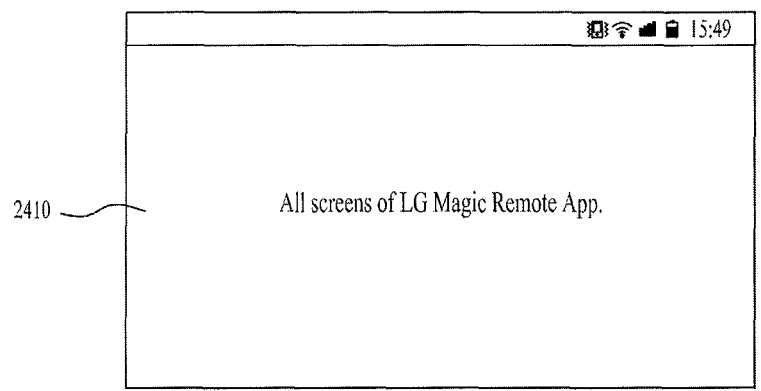
(a)
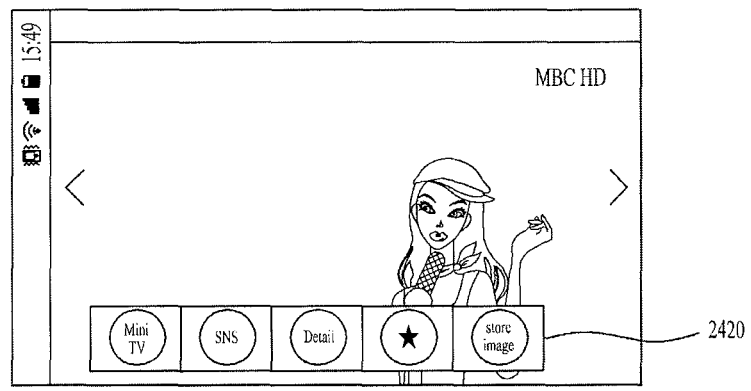
(b)

FIG. 26
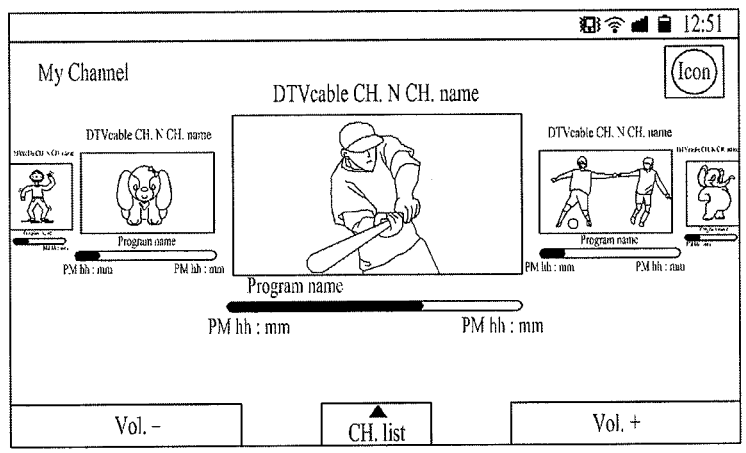
(a)
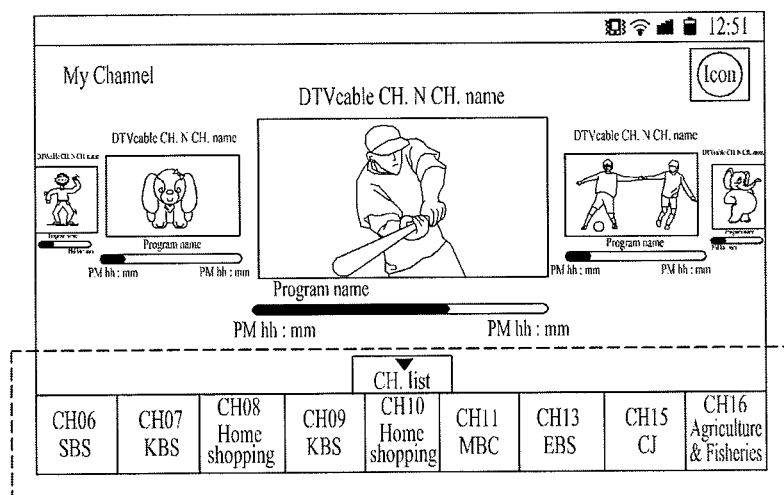
(b)

FIG. 39
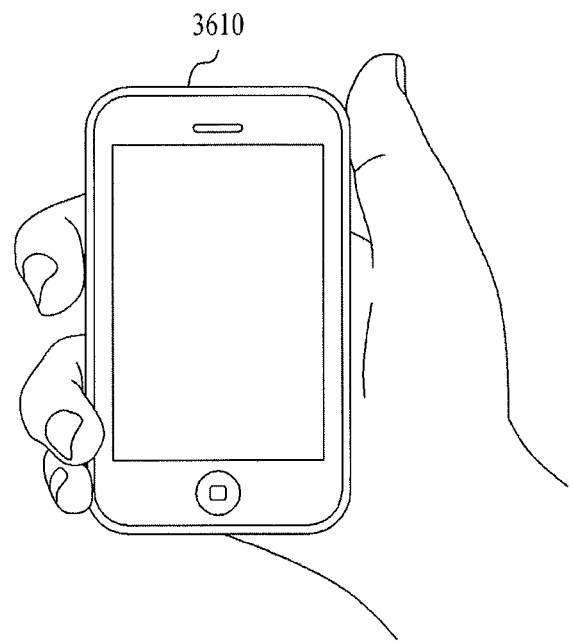
(a)
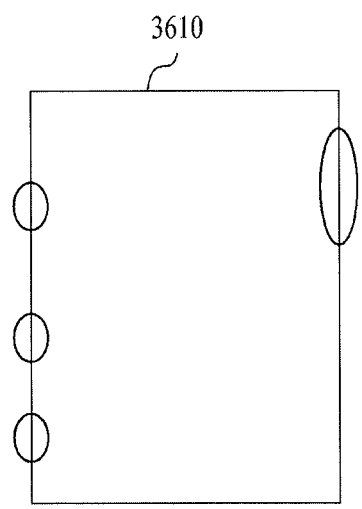
(b)

FIG. 40
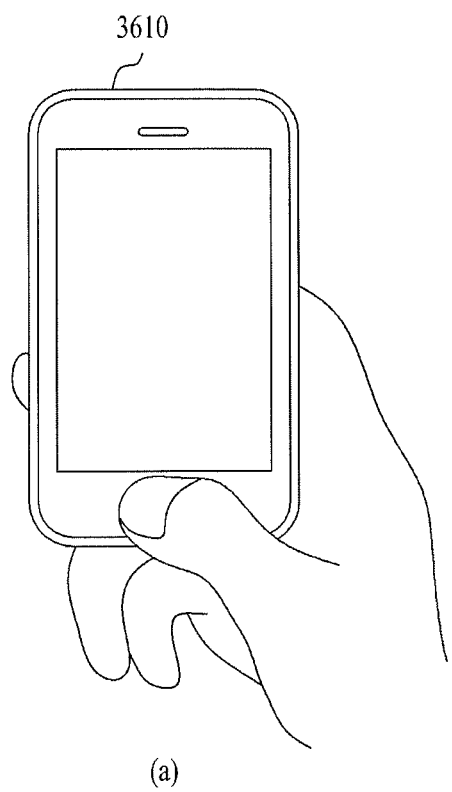
(a)
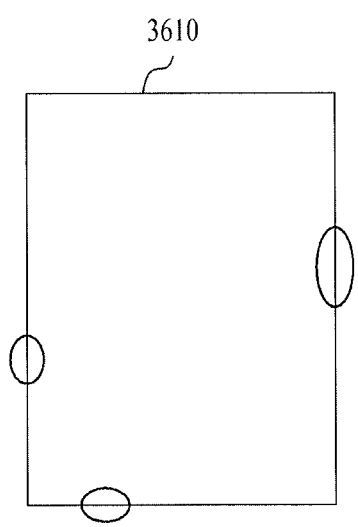
(b)

FIG. 41
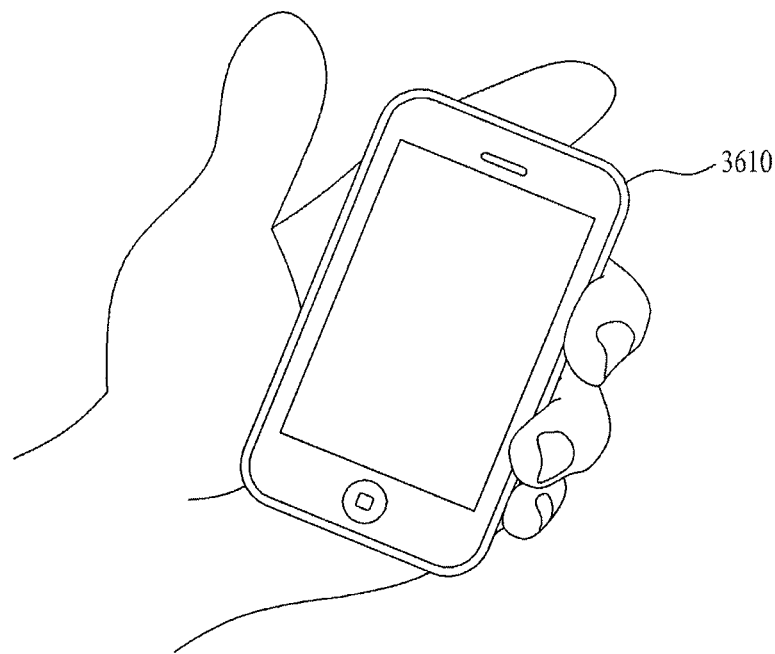
(a)
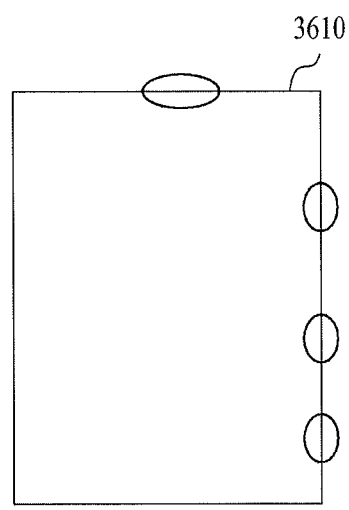
(b)

FIG. 42
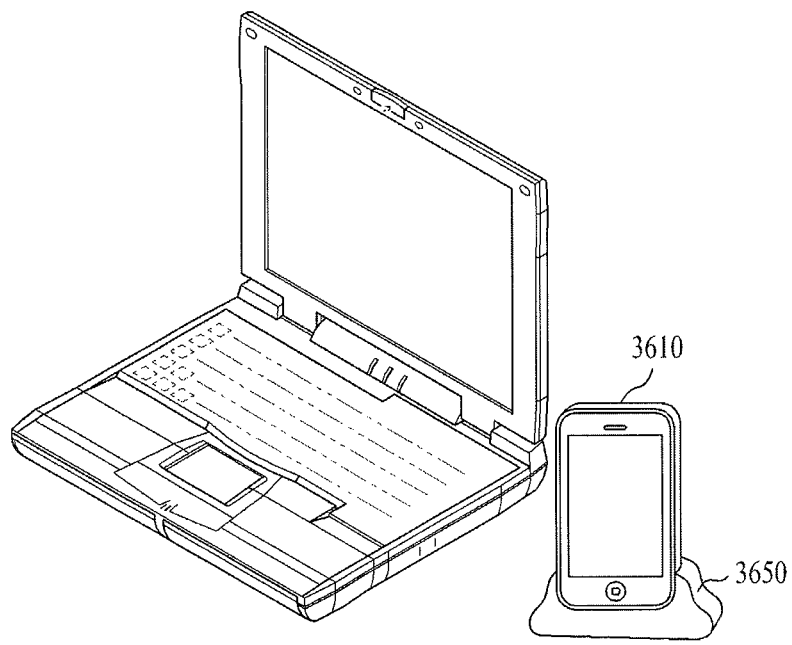
(a)
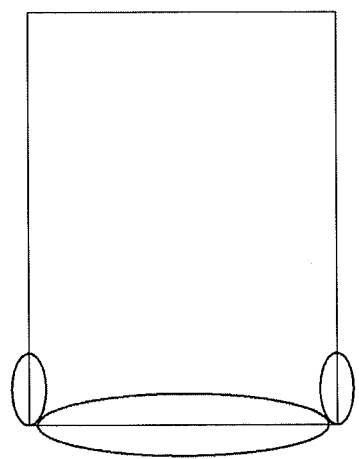
(b)

FIG. 43
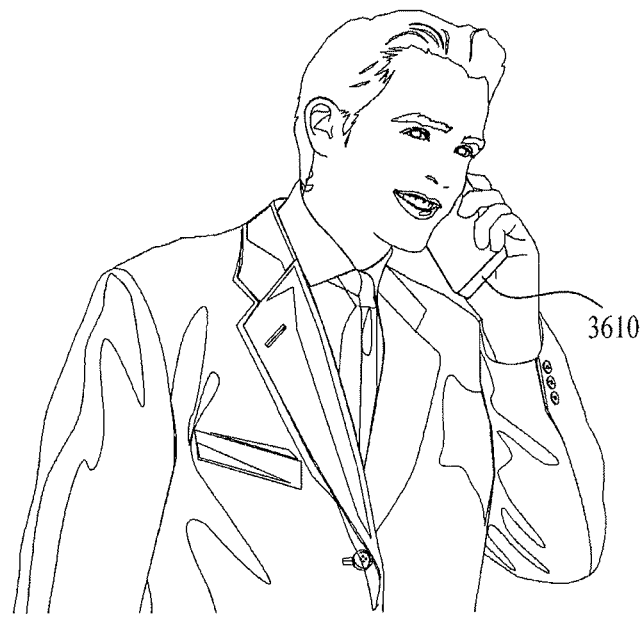
(a)
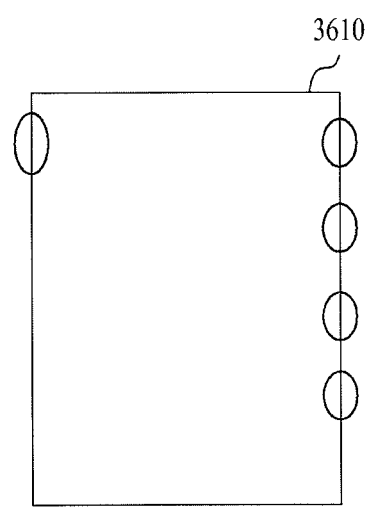
(b)

FIG. 44
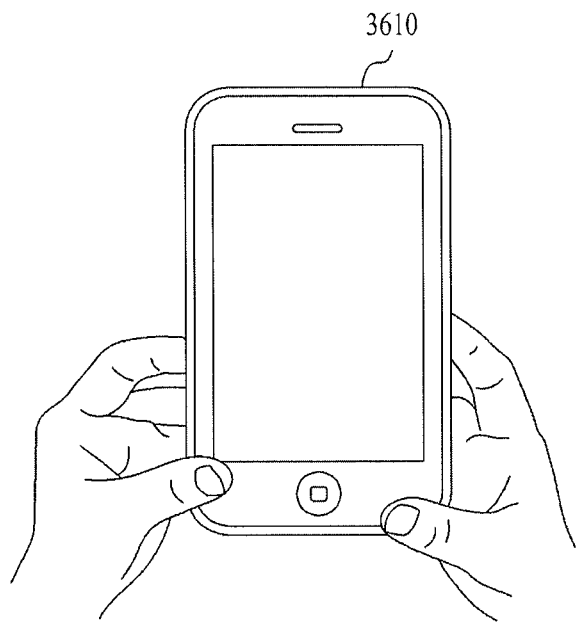
(a)
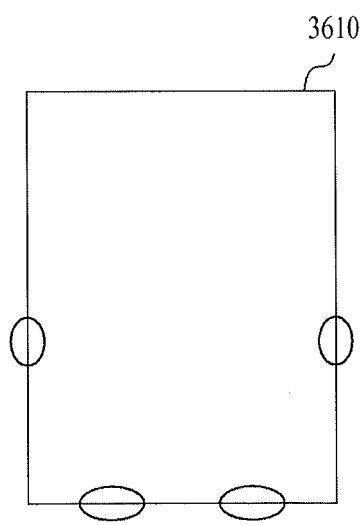
(b)

FIG. 45
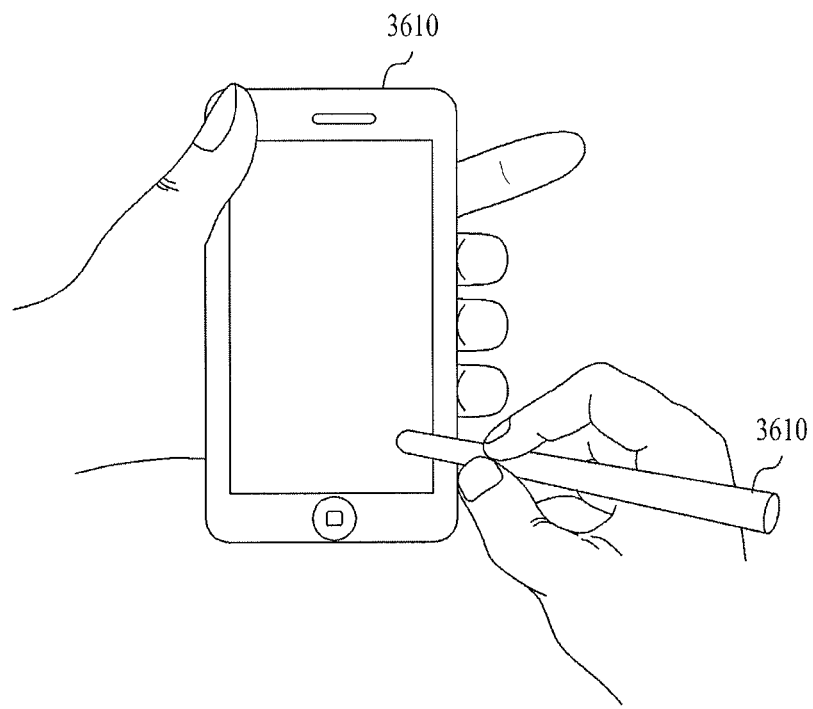
(a)
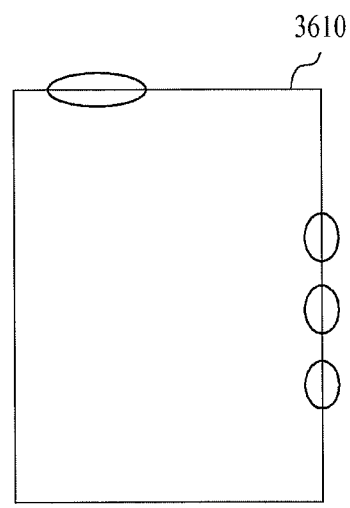
(b)

FIG. 46
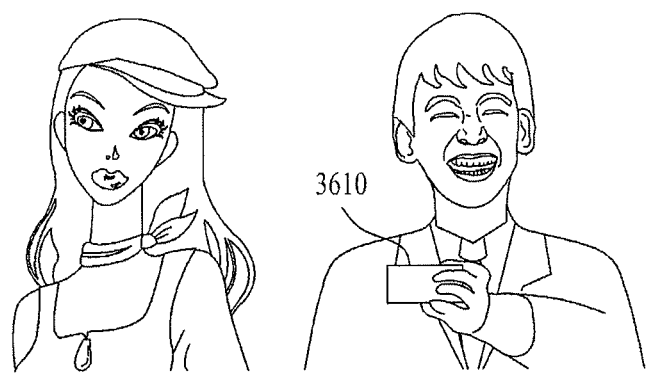
(a)
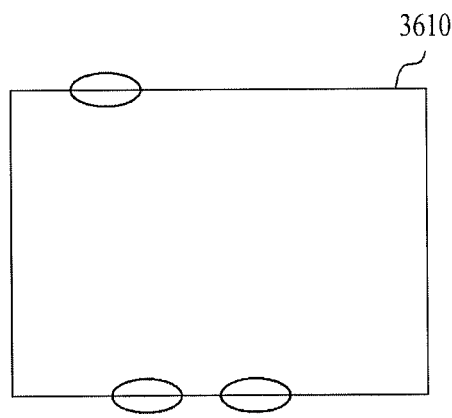
(b)

APPARATUS FOR PROCESSING A SERVICE AND METHOD THEREOF

This application claims the benefit of a provisional application No. 61/583,609, filed on Jan. 6, 2012, and the Korean Patent Application Nos. 10-2012-0022696, filed on Mar. 6, 2012, 10-2012-0022697, filed on Mar. 6, 2012, and 10-2012-0022698, filed on Mar. 6, 2012, which are hereby incorporated by reference as if fully set forth herein.

BACKGROUND OF THE INVENTION

1. Field of the Invention

The present invention relates to an apparatus for processing a service and method thereof. Although the present invention is suitable for a wide scope of applications, it is particularly suitable for processing services among a plurality of devices.

2. Discussion of the Related Art

Smart televisions (TVs) are now becoming popular. A traditional remote controller is used to operate the smart TV. The integration of a user's mobile terminal with the functions provided by the smart TV has not been sufficiently addressed. Further, the mobile device and TV adhere to their own exclusive domain and do not smoothly work together.

SUMMARY OF THE INVENTION

Accordingly, one object of the present invention is to provide an apparatus and corresponding method for processing a service that substantially obviate one or more problems due to limitations and disadvantages of the related art.

Another object of the present invention is to provide an interfacing method and environment, by which communications between a mobile device and other digital devices, data transmissions and receptions and the like can be performed more easily and efficiently.

Another object of the present invention is to provide a new service model by providing further enhanced interfacing and communication environments and processes, by which the limitations put on one device having a function of simply outputting video, audio, image and the like received from another digital device or a function of playing a role as a substitute for a remote controller are overcome.

To achieve these objects and other advantages and in accordance with the purpose of the invention, as embodied and broadly described herein, the present invention provides a display device including a display configured to display multimedia contents; a wireless communication unit configured to wirelessly communicate with at least one external mobile terminal; a camera unit configured to sense an eye movement of a user holding the mobile terminal; and a controller configured to receive indication signals from the mobile terminal indicating at least one of a grip pattern and eye movement of the user holding the mobile terminal, and to control a streaming operation of streaming the multimedia contents displayed on the display to the mobile terminal. The present invention also relates to a mobile terminal interfacing with the display device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 16(a) to 16(d) are diagrams illustrating another example of an access method for a mini TV function activation or access according to an embodiment of the present invention;

FIG. 21 is a diagram illustrating another function of a mini TV according to an embodiment of the present invention;

FIG. 24 is a diagram illustrating another example for a mini TV access according to an embodiment of the present invention;

FIGS. 25 to 27 are diagrams illustrating other examples for a mini TV access according to an embodiment of the present invention;

FIGS. 39-46 are overviews illustrating different grip patterns of the mobile terminal according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In this specification, a service processing apparatus includes a computing device such a digital device capable of processing and outputting a content as a stationary broadcast receiver, a mobile broadcast receiver, a PC (or notebook computer), a smart phone, a mobile device (e.g., a tablet PC, etc.) and the like. Further, a broadcast receiver may include such a digital TV as a network TV, a smart TV, an IP (internet protocol) TV, a web TV and the like.

The service processing apparatus also include at least two digital devices capable of communication in-between via a connected network. For clarity of the following description, the service processing apparatus is described as a main device and a mobile device. The main device and the mobile device may also be provided in an n-to-m correspondence (where, 'n' and 'm' are positive integers, respectively). For instance, the main device may include a main TV or an external input paired with the main TV. In another instance, the mobile device may include a smart phone, a tablet PC or the like.

The Mini TV may be hardware linked with a mobile device and/or software such as an application, a function and the like. The mini TV corresponds to a mobile device performing a function of controlling a main device and the like by exchanging various kinds of data with the main device through interfacing or communication or one of a plurality of functions of the mobile device. The mini TV may be implemented through a prescribed application. In this specification, the prescribed application is called a remote application that may be related with a plurality of functions including the mini TV. However, the present invention is non-limited by the above-enumerated names. The mini TV may have functions or roles similar to or totally different from those of an external TV 140 of a second TV type described with reference to FIG. 1 later as well as the main device.

For example, the mini TV includes functions of the second TV and may further include the functions, which will be explained later, i.e., features differentiated from those of the second TV in aspect of access type or function, whereas the external TV 140 of the second TV type receives a broadcast image from a main device and then displays the received broadcast image only or the main device performs general functions of a TV remote controller as an input mechanism. This will be described in detail with reference to the accompanying drawings. Besides, the mini TV is non-limited to the mobile device or may include a separate mini TV dedicated mobile device or one of other service processing apparatuses.

Figure 1:
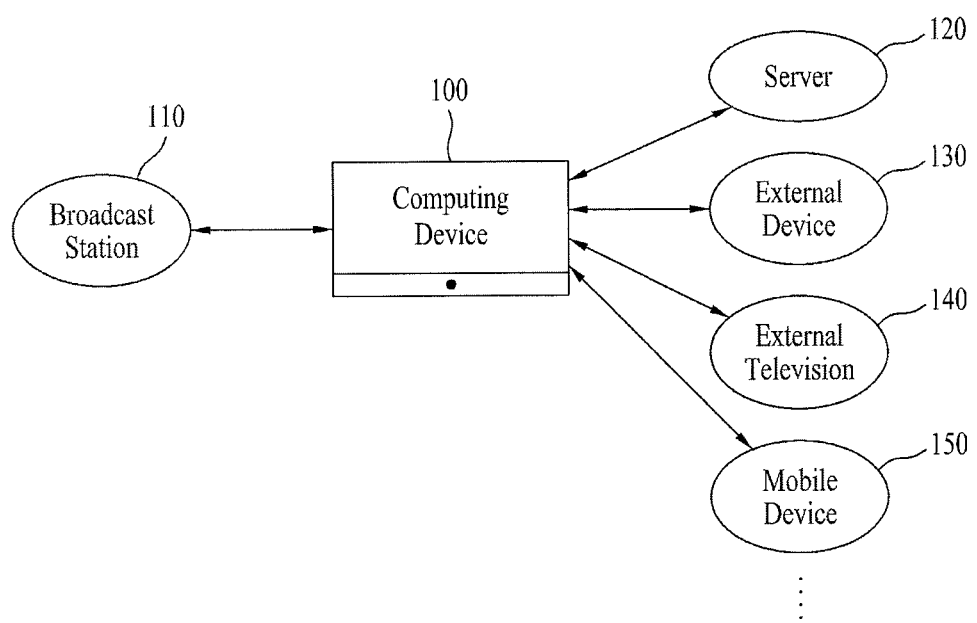
FIG. 1 is conceptional diagram illustrating one example of an overall system including a service processing apparatus according to an embodiment of the present invention.

FIG. 1 is conceptional diagram illustrating one example of an overall system including a service processing apparatus according to an embodiment of the present invention. In FIG. 1, the service processing apparatus can correspond to a service processing system. As shown in FIG. 1, a service processing system includes a main or computing device 100, a broadcast station 110, a server (internal, external or IP server included) 120, an external device 130, an external (or second) TV 140, a mobile device 150 and the like.

The broadcast station 110 includes a content, service and/or network provider. The broadcast station 100 provides contents and can interactively transceive data with the main device 100 and/or the mobile device 150. Further, the main device 100 is connected with the broadcast station 110 via such medium as terrestrial wave, cable, satellite, internet and the like and can then receive contents or exchange data interactively. In addition, the main device 100 may be connected with the server 120, the external device 130, the external TV 140, the mobile device 150 and the like via wire/wireless networks. Further, the server 120, the external device 130, the external TV 140, the mobile device 150 and the like may be connected with each other via wire/wireless networks. Alternatively, the server 120, the external device 130, the external TV 140, the mobile device 150 and the like may be directly connected with the broadcast station 110 without the main device 100. Further, the external device 130 includes at least one of USB memory, HDD (hard disc drive), PC, various digital devices connected via home network and the like.

Figure 2:
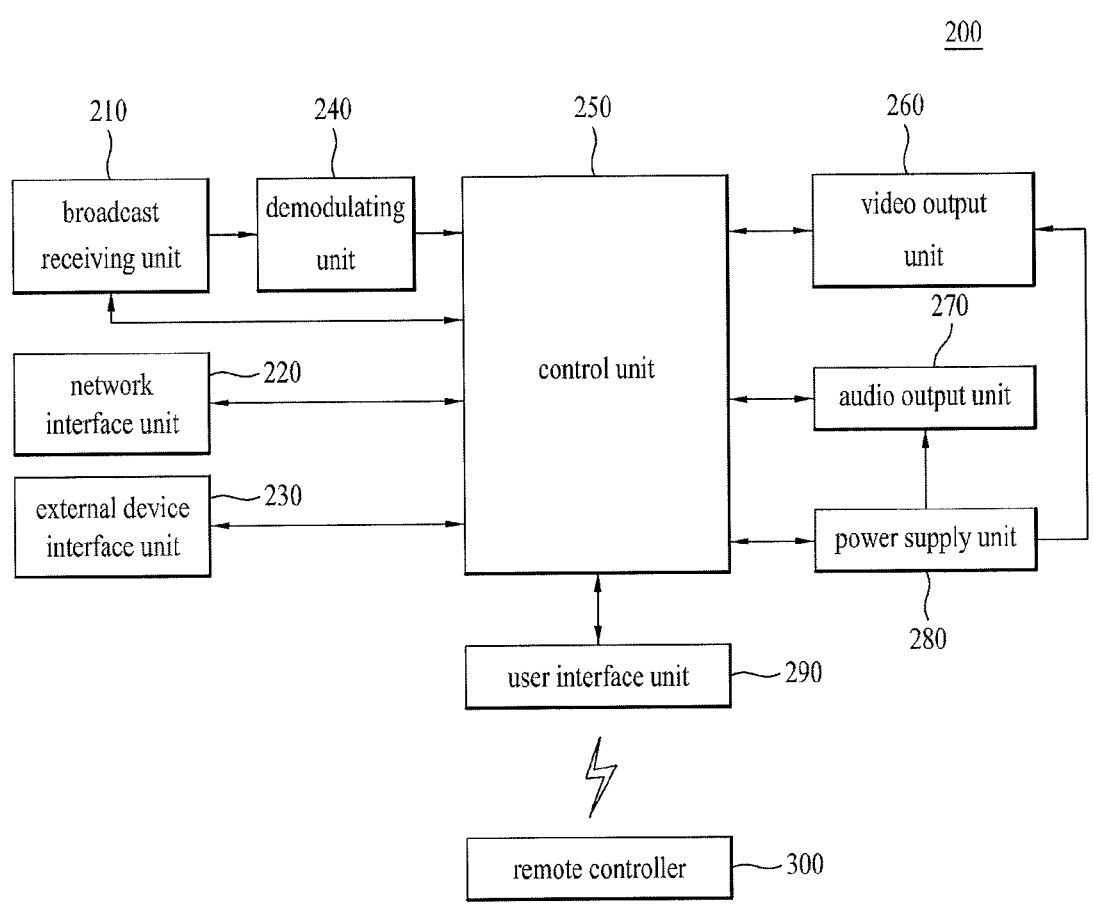
FIG. 2 is a detailed block diagram illustrating one example of a service processing apparatus according to an embodiment of the present invention.

Next, FIG. 2 is a detailed block diagram illustrating one example of the main device 100 or the mobile device 150 according to an embodiment of the present invention. For clarity of the following description, the illustrated configuration may include components of the main device 100 or components of the mobile device 150.

A service processing apparatus according to one embodiment of the present invention may include a network processing unit paired with at least one external device in response to a first request, a control unit controlling an activation of a prescribed application in response to the first request, the control unit controlling a control signal to be transmitted to the paired external device in response to a second request, and a display module receiving image data corresponding to the control signal in response to the second request from the external device, the display module outputting the received image data.

In particular, the control unit receives a signal for an output change from the second device, determines whether to switch an output image based on the received signal for the output change, creates a signal for an output image change, and then controls an output of the second device by transmitting the created signal to the second device. Further, in the above description, the first device may include a mobile device, the second device may include a digital broadcast receiver, and the prescribed application may include a remote application.

The control unit can recognize the second request from at least one of a selection of an icon related to the second request in a user interface provided by each step or a quick rapid movement or shaking (e.g., snatching) of the second device, a drag & drop operation, a prescribed item of the user interface provided by each step in a prescribed direction, a touch to a prescribed region within a screen and a drag or flicking in a prescribed direction, a screen capture of the external device, and a drag & drop operation of image data within the user interface provided by the each step into a prescribed region.

Referring to FIG. 2, the main device 100 includes a broadcast receiving unit 210, a demodulating unit 240, a network interface unit 220, an external device interface unit 230, a control unit 250, a video output unit 260, an audio output unit 270, a power supply unit 280, a user interface unit 290 and the like. Further, the main device 200 can receive an input of a prescribed data or perform a prescribed function, through a communication with an input mechanism such as a remote controller 300, the mobile device 150 and the like.

The broadcast receiving unit 210 may include an interface receiving broadcast data from an RF (radio frequency) tuner, a set-top box (STB) and the like. The broadcast receiving unit 210 can receive an RF broadcast signal of a single carrier by ATSC (advanced television system committee) or an RF broadcast signal of multicarrier by DVB (digital video broadcasting).

Further, the demodulating unit 240 receives a digital IF signal (DIF) converted by the broadcast receiving unit 210 and then demodulates the received signal. When the digital IF signal output from the broadcast receiving unit 210 follows ATSC, the demodulating unit 240 performs 8-VSB (8-vestigial sideband) demodulation.

The external device interface unit 230 is configured to transceive data between an external device and the main device 100 via a wire/wireless network. In this instance, the external device may include at least one of a DVD (digital versatile disc) player, a Blu-ray player, a game device, a camera, a camcorder, a computer (e.g., laptop, etc.), a set-top box (STB), the mobile device 150 and the like. Further, the external device interface unit 230 may include at least one of a USB terminal, a CVBS (composite video banking sync) terminal, a component terminal, an S-video terminal (e.g., analog), a DVI (digital visual interface) terminal, an HDMI (high definition multimedia interface) terminal, an RGB terminal, a D-SUB terminal and the like.

The network interface unit 220 is configured to connect the main device 100 with the wire/wireless network including an internet network. In this instance, the network interface 220 can use an Ethernet terminal for a connection with the wire network or such a communication protocol for a connection with the wireless network as WLAN (Wireless LAN) (Wi-Fi), Wibro (Wireless broadband), Wimax (World Interoperability for Microwave Access), HSDPA (High Speed Downlink Packet Access) and the like.

The user interface unit 290 delivers a signal input by a user to the control unit 250 or may transmit a signal delivered from the control unit 250 to the external device (e.g., the remote controller 300, the mobile device 150, etc.). The user interface unit 290 receives a control signal for power-on/off, channel selection, screen setup or the like from the remote controller 300 and then processes the received control signal, in accordance with various communication systems including the RF communication system, infrared (IR) communication system and the like. Alternatively, the user interface unit 290 can transmit the control signal delivered from the control unit 250 to the remote controller 300 or the mobile device 150.

In addition, the video output unit 260 generates a drive signal by converting a video signal, a data signal and an OSD (on screen display) signal, which were processed by the control unit 250, or a video signal, a data signal and the like, which are received from the external interface unit 230, to R, G and B signals. The audio output unit 270 receives an input of an audio signal (e.g., stereo signal, 3.1 channel signal, 5.1 channel signal, etc.) processed by the control unit 250 and then outputs the received signal.

Further, the power supply unit 280 can supply a corresponding power to each of the components that configure the main device 100. The power supply unit 280 can supply power to the control unit 250 implemented into SOC (system on chip), the video output unit 260 for a video display, the audio output unit 270 for an audio output and the like. Further, the control unit 250 is described in detail with reference to FIG. 3 and FIG. 4 as follows. In particular, the control unit shown in FIG. 3 may include individual components or can be implemented into a single module.

Figure 3:
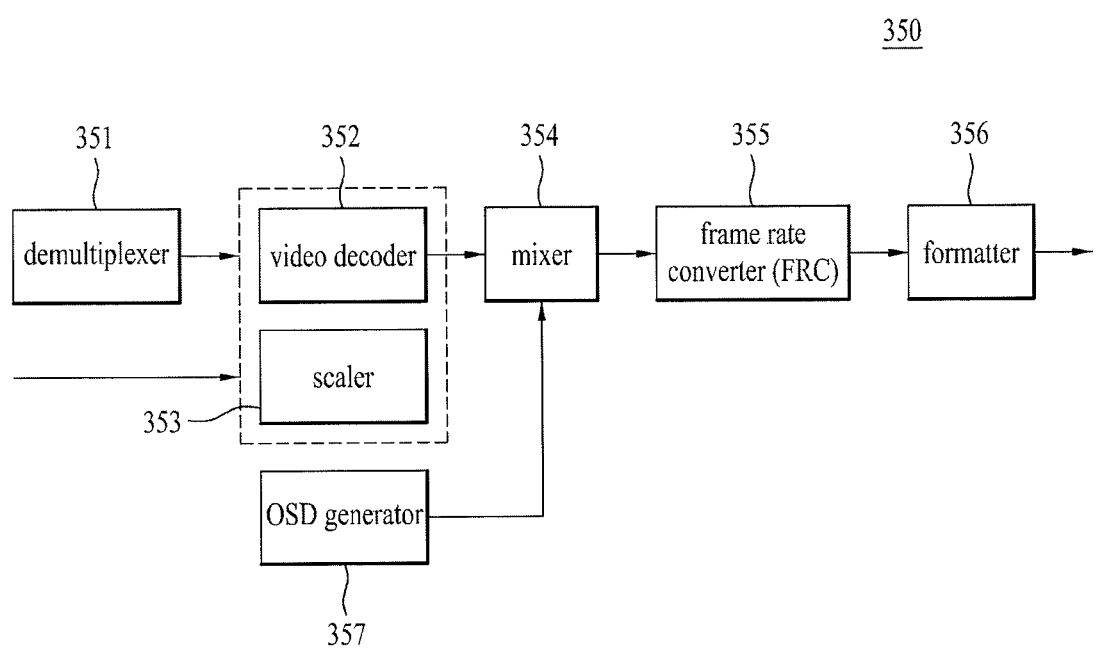
FIG. 3 is a block diagram illustrating one example of a control unit according to an embodiment of the present invention.

Next, FIG. 3 is a block diagram illustrating one example of a control unit 350 of the main device 100 or the mobile device 150 according to an embodiment of the present invention. In particular, as mentioned in the foregoing description with reference to FIG. 2, the control unit 350 in FIG. 3 may correspond to a component of the main device 100 or the mobile device 150 shown in FIG. 1.

Referring to FIG. 3, the control unit 350 includes a demultiplexer 351, a video decoder 352, a scaler 353, an OSD generator 357, a mixer 354, a frame rate converter (FRC) 355 and a formatter 356. Moreover, the control unit 350 may further include an audio processor, a data processor and the like.

In addition, the demultiplexer 351 demultiplexes an input transport stream, and the video decoder 352 decodes a demultiplexed video signal. Further, the scaler 353 performs scaling to enable a resolution of the decoded video signal to be outputtable from the video output unit.

The OSD generator 357 generates OSD data in response to a user input or by itself. Further, the mixer 354 mixes the OSD data generated by the OSD generator 357 with the video signal processed by a video processor including the video decoder 352 and the scaler 353. The frame rate converter (FRC) 355 can convert a frame rate of an input video. In this instance, the video frame rate conversion may be attributed to an output frequency of a display module. For instance, the frame rate converter 355 converts a frame rate 60 Hz of an input video to a frame rate 120 Hz or 240 Hz of a video output to correspond to an output frequency of the display module.

The formatter 356 receives an input of an output signal of the FRC 355, changes a format of the received signal to be suitable for the video output unit, and then outputs the format-changed signal. For instance, the formatter 356 can R, G and B data signals. In addition, the R, G and B data signals may be output as low voltage differential signaling (LVDS) or mini-LVDS.

The components described with reference to FIG. 2 and FIG. 3 may be merged together into a module or may be implemented as individual components. In addition, prescribed components may be omitted or added. Moreover, input signals or data may bypass prescribed components in response to various kinds of inputs.

The present invention provides an environment to facilitate data transmission and receptions (control data or signals included) between a mobile device and a main device more efficiently and also provides an interface for the environment. In this specification, various digital device objects including a mobile device, a main device, an external device and the like are described. In particular, regarding a mini TV, a mobile device may be taken as an example. However, the spirit or scope of the inventions in association with the mini TV is not limited to the mobile device only.

Further, in order to help the understanding of the present invention and provide convenience in description, a mobile device can access a mini TV via various paths and depths. For instance, the mini TV may be activated in response to an activation of a remote application. Further, the present invention provides a service processing apparatus for providing a communication environment or interface with further enhanced functions to overcome a limited function of a mobile device playing a role as a display device capable of simply outputting data or signals received from a main device (e.g., providing the same screen of the main device) or a limited function of the mobile device used as a substitute for an input means of a main device like a remote controller. The present invention also encourages a user's purchase desire by providing a user-friendly interface environment and/or service.

Figure 4:
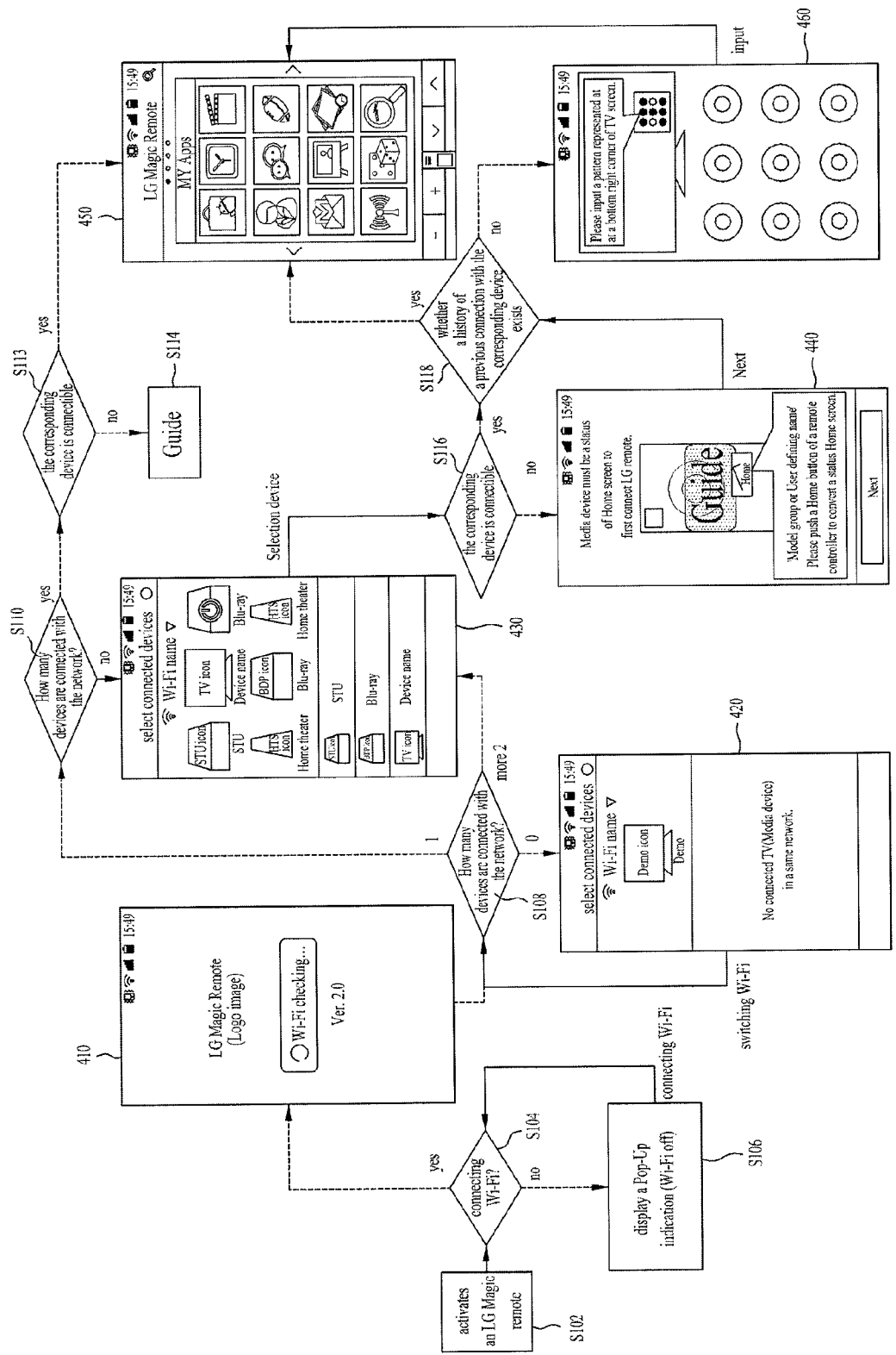
FIG. 4 and FIG. 5 are diagrams illustrating a pairing process between a mobile device and a main device according to an embodiment of the present invention.
Figure 5:
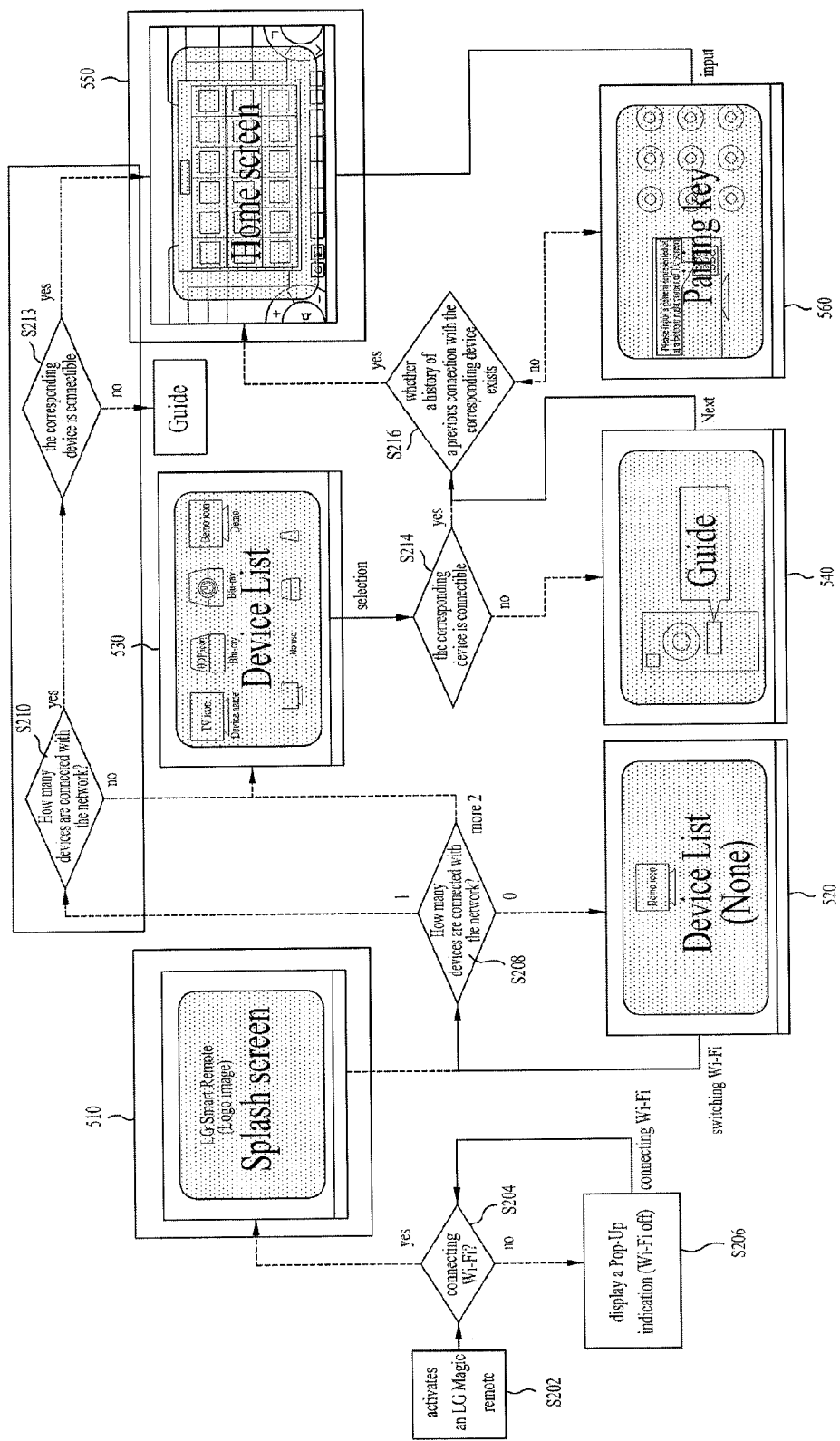

Next, FIG. 4 and FIG. 5 are diagrams illustrating a process for pairing a mobile device and a main device with each other according to an embodiment of the present invention. Referring to FIG. 4 and FIG. 5, a user interface (UI) provided in association with a paring and the like may slightly differ in accordance with a type of a mobile device (e.g., a smart phone shown in FIG. 4 or a tablet PC shown in FIG. 5).

First of all, a mobile device activates a remote application (S102, S202). Thus, when the mobile device activates the remote application, a pairing process starts. The paring may be performed on a previously agreed or defaulted device such as a main device or every device linkable or interoperable with the mobile device via wire/wireless network. Hence, the mobile device provides a list of all paired devices to a mobile terminal and can then be paired with a device having a best network condition or a best communication status for the pairing, a device according to a preset priority or the like, for example.

Further, if the remote application is activated, a state of the pairing is determined or the pairing is started, for example. However, if the pairing is determined in accordance with an attribute of an activated application instead of the remote application, the pairing process may be performed. Moreover, the pairing may be initiated in response to a user's setup or under a prescribed condition irrespective of the activation of an application. However, the pairing process is assumed to be performed in response to the activation of the remote application.

Once the remote application is activated, the mobile device determines a communication network state for the pairing, i.e., a presence or non-presence of a connection with a network or a connected state with the network (S104, S204). For this, the mobile device can provide a UI 410/510 indicating that a network connected state is being checked. In FIG. 4 or FIG. 5, the communication network for the pairing includes Wi-Fi, for example, by which the present invention is non-limited. Alternatively, the communication network may include Ethernet terminal for a connection with the wire network or such a communication protocol for a connection with the wireless network as WLAN (Wi-Fi), Wibro, Wimax, HSDPA and the like.

In the step S104 or S204, as a result of the determination of a presence or non-presence of the connection with the network or the connected state for the pairing, if the connection is not established, a popup indication is displayed on a screen of the mobile device (S106, S206). When the network is not connected, it may be because a user randomly blocks the network connection or the network connected state is poor due to a location of the mobile device and/or the like. Therefore, if the user of the mobile device checks the pop-up indication in the step S106 or S206, the user can solve this problem by setting up a network connection, moving the location or the like. Thus, the mobile device can provide the screen with the UI 410/510 to indicate that the connected state is being checked. In particular, the UI 410/510 can be provided if the user does not block the network connection in the mobile device.

Subsequently, the method checks how many devices are connected with the network through the step S104/S204 or the step S106/S206 (S108, S208). Through this checking step, if the number of the connected device(s) is 0, for example, a UI 420/520 is provided to indicate that there is no connected device. The user may reattempt the above-described process by resetting the network or setting another network.

On the other hand, if the number of the device(s) connected to the network is checked as 1 or more in the step S108 or S208, the mobile device provides a UI 430/530 including information on each connected device (e.g., only 1 device is displayed in this example) and determines whether a history of a previous connection with the corresponding device exists (S110, S210). If the previously connected history exists, the mobile device obtains a status of the corresponding device and then checks whether the corresponding device is connectible (S112, S212). If the corresponding device is not in the connectible status currently, the mobile device provides a guide UI 440/540 for the solution (S114, S214).

Further, if the number of the devices connected to the network, which is checked in the steps S108 or S208 is equal to or greater than 2, the mobile terminal provides a UI 430/530 including information on each of the connected devices and then waits for a selection made by a user. If the user selects a prescribed device through the UI 430/530, the mobile device checks a status of the selected device and then determines a connectible state (S116, S216). Thus, the UI 430/530 can provide various kinds of information including an identifier, name, power-on/off state, connectible state and network connected state (e.g., signal strength, etc.) of each of the devices and the like.

As a result of the determining step S116 or S216, if the corresponding device is not in the connectible state, the mobile device can provide the UI 440/550 indicating a guide to the solution. If the corresponding device connectible state is enabled via the guide or the connectible state of the corresponding device is determined in the step S116 or S216, the mobile device determines whether a history of a previous connection with the corresponding device exists (S118, S218).

If the state connectible with the corresponding device is enabled through the step S112/212 or the step S114/214, the mobile device may complete the pairing process. In addition, the mobile device provides a UI 450/550 for a next operation to be performed together with the paired device. Further, if the history of the previous connection with the corresponding device exists (Yes in S118, S218), the mobile device ends the pairing process and then provides the UI 450/550 to enable a next process to be performed. On the contrary, if the history of the previous connection with the corresponding device does not exist (No in S118, S218), the mobile device undergoes the step for an access to the corresponding device to complete the pairing process with the corresponding device.

In this step, the mobile device provides a related UI 460/560. In FIG. 4 and FIG. 5, a security related UI such as a user authentication window is exemplarily shown, by which the present invention is non-limited. In addition, other UIs for the corresponding step can be further provided. Further, if there is no connection history in the step S110 or S210, the UI 430/530 or the UI 460/560 may be provided.

The above description of the present invention with reference to FIG. 4 and FIG. 5 describe one embodiment of a pairing process between a mobile device and another device assuming that the pairing is performed by paring a mobile device and a main device (e.g., a main TV) with each other. The pairing can be performed on other external devices. In this instance, both of the foregoing description and the following description may be applicable to the pairing in a similar manner.

In the following description, for example, of a mini TV function activation between a mobile device (e.g., a mini TV) and a main device (e.g., a main TV) paired with each other according to an embodiment of the present invention, various methods for exchanging data with the main TV are explained.

In particular, FIGS. 6 to 12 are diagrams illustrating a method of providing a mini TV function in a mobile device after pairing according to embodiments of the present invention. That is, FIGS. 6 to 12 show examples of mini TV providable scenes of a mobile device in accordance with a state or mode of the mobile device and/or a main device.

Figure 6:
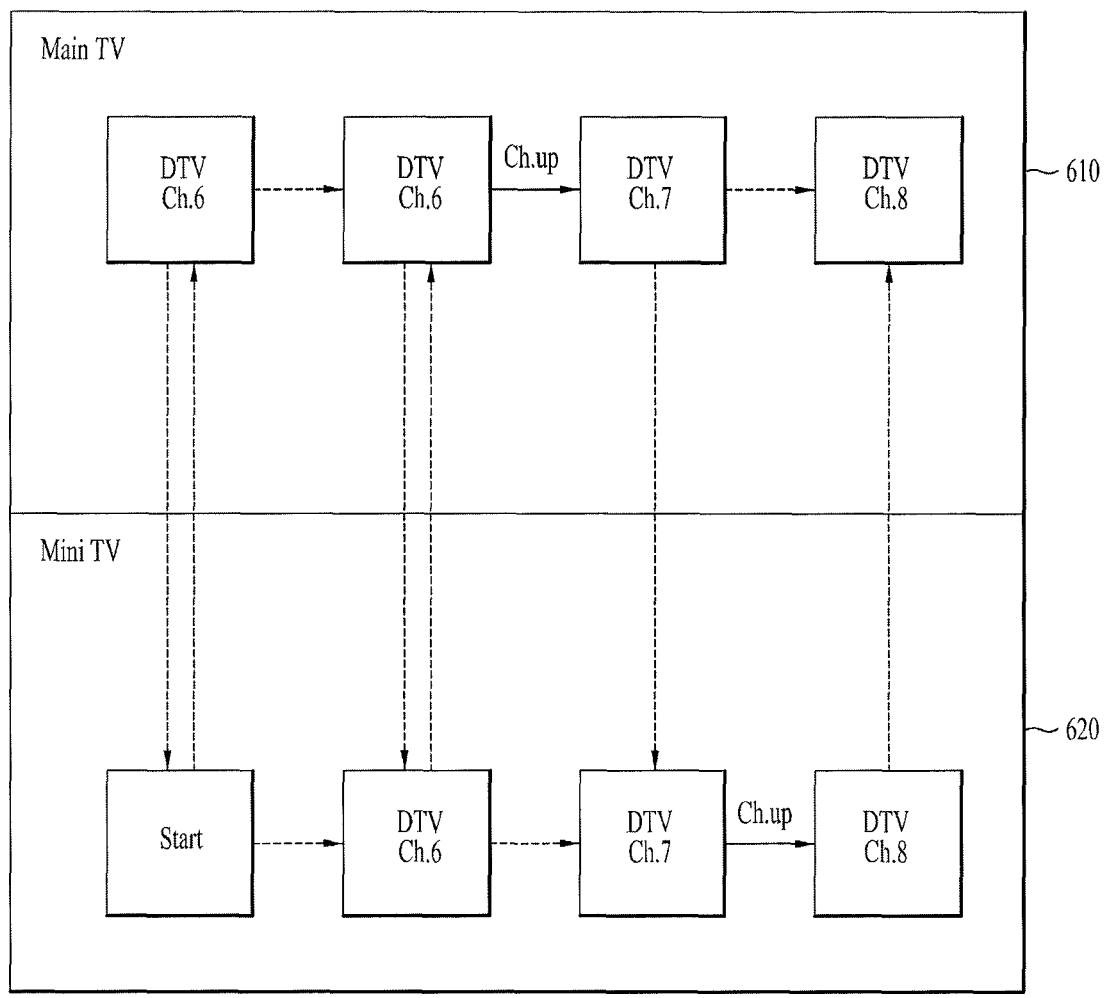
FIG. 6 is a diagram illustrating one example of a scene for a mobile device to provide a mini TV when watching a normal screen in a main device.

FIG. 6 is a diagram illustrating one example of a scene for a mobile device to provide a mini TV when watching a normal screen in a main device. Referring to FIG. 6, a main TV 610 initially displays DTV channel 6. If the main TV 610 is paired with a mobile device 620 by the pairing process mentioned above, the mobile device 620 exchanges data with a main device (main TV 610), thereby providing a mini TV function.

For instance, if the pairing and the mini TV function are initiated by activating the remote application, the mobile device 620 provides a channel (or content) currently provided by the main device 610 to a screen for the mini TV function. This process may continue until a channel switching operation is performed by the paired main device 610 or the mini TV function is turned off, for example.

If the channel is switched or changed (e.g., channel 6 to channel 7) in the main device 610, the channel of the mini TV 620 is switched or changed to the same channel. However, although the mobile device can directly switch the channel in response to the main device, the mobile device can also inform a user using a popup UI indicating whether the channel is switched to another channel (e.g., channel 7) in the main device 610, whether a channel is changed, and/or the like and may then enable the channel switching operation to be performed in response to a selection made by the user.

Thereafter, if the channel is switched to another channel (e.g., channel 8 from channel 7) again in the main device 610, the mobile device 620 may perform an automatic channel switching operation or a channel switching operation in response to a user selection after providing a UI. Thus, the operation of the mini TV 620 in response to the channel change or switching of the main TV 610 is described with reference to FIG. 6, for example.

Figure 7:
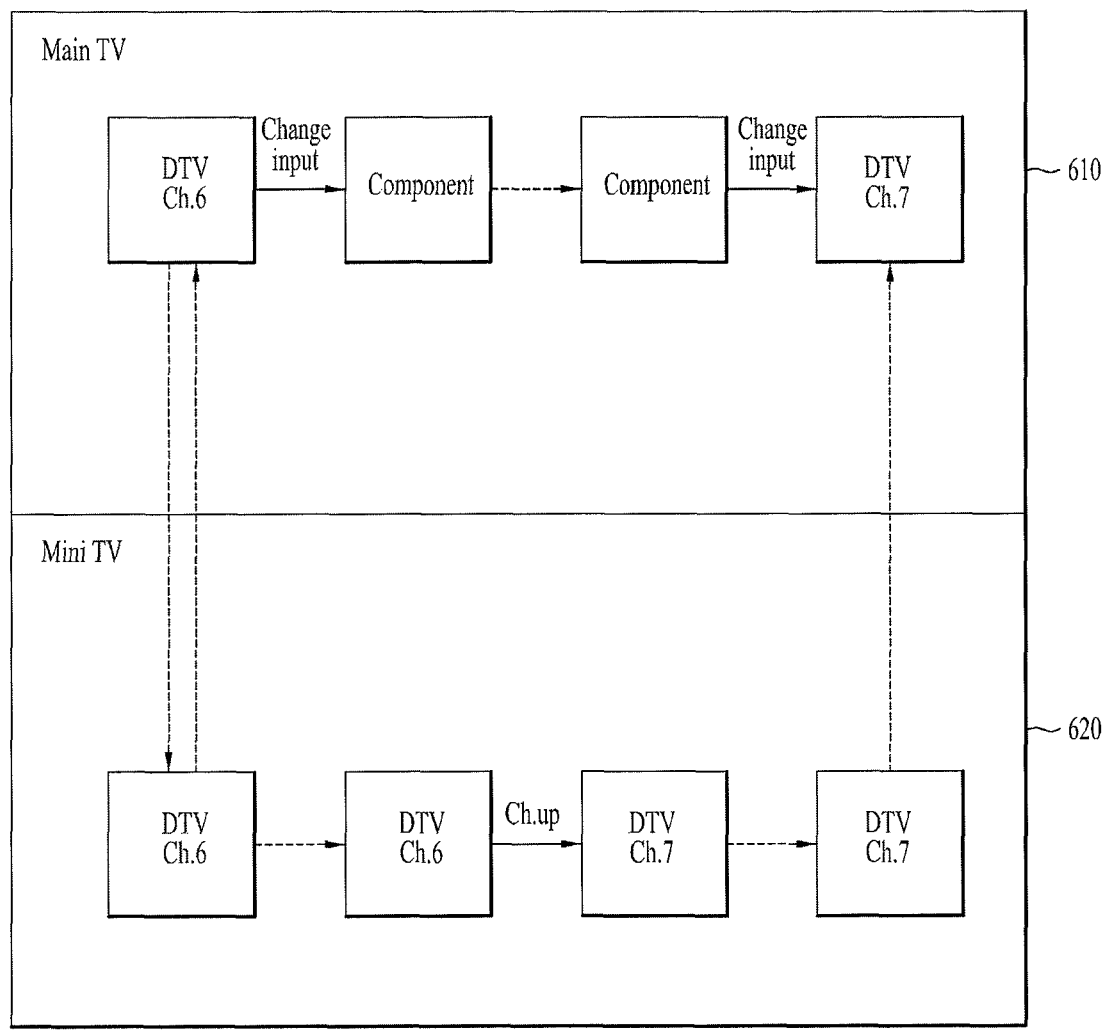
FIG. 7 is a diagram illustrating one example of a scene for a mobile device to provide a mini TV when changing an input in the course of watching a broadcast screen in a main device.

Next, FIG. 7 is a diagram illustrating one example of a scene for a mobile device to provide a mini TV when changing an input while watching a broadcast screen in the main device 610. Referring to FIG. 7, the main TV 610 initially provides DTV channel 6. If the mobile device 620 is paired with the main TV 610 by the paring process described with reference to FIG. 4 or FIG. 5, the mobile device 620 exchanges data with the main device 610 by being linked with the main device 610 and then provides a mini TV function.

The mobile device 620 provides the DTV channel 6 currently provided by the main TV 610. This may continue until a channel change or switching occurs in the main TV 610, for example. If an input to the main TV 610 is changed (e.g., the input is changed into a component input instead of a DTV channel for watching a broadcast program), the mini TV 620 of the mobile device may perform two kinds of operations as follows. First of all, the mini TV 620 performs an operation of changing a screen of the mini TV 620 in response to an input change of the main TV 610. Secondly, the mini TV 620 can perform an operation of maintaining a current screen of the mini TV 620 despite that the input of the main TV 610 is changed.

In the former case, if the mini TV 620 has a configuration corresponding to a component input, for example, it can play back the component input. If the mini TV 620 does not have the corresponding configuration, a format of data received from the main TV 610 may be converted to a format (e.g., file conversion, resolution conversion, size adjustment, screen ratio adjustment, etc.) that is outputtable from the mini TV 620.

Next, FIG. 7 shows the latter case. In particular, the mini TV 620 provides a screen by tuning a channel for a current screen by itself. Alternatively, the mini TV 620 receives a signal from the main TV 610 and then plays the received signal. Referring to FIG. 7, when an input to the mini TV 620 is changed into such an external input as a component, the mini TV 620 can keep providing a previous channel irrespective of the input change unless a channel for a broadcast program is switched in the main TV 610. In particular, in FIG. 7, the mini TV 620 continues to provide the DTV channel 6 at the timing point of changing the input of the main TV 610 to the component input.

Thus, the mini TV 620 can switch a channel (e.g., channel 6 to channel 7) separately from the external input of the main TV 610. However, since the main TV 610 still provides the data according to the component input, the main TV 610 does not provide the channel 7. On the other hand, if the input of the main TV 610 is switched from the component input to a broadcast channel for a broadcast program, the main TV 610 may perform the following operations. First of all, the main TV 610 changes a channel previously provided before the external input switching into the same channel currently provided by the mini TV 620 and then provides the same channel currently provided by the mini TV 620. Secondly, the main TV 610 continues to provide the channel previously provided before the external input switching.

For instance, FIG. 7 shows the former case of providing the channel currently provided by the channel previously provided before the external input switching. If the mini TV 620 receives and plays a broadcast signal using the tuner of the main TV 610, since the main TV 610 is already tuned to the corresponding channel for a channel switching operation of the mini TV 620, it may have no difficulty in providing a screen as soon as the input switching is performed. However, if the main TV 610 has a plurality of tuners or the tuner of the main TV 610 is used for the channel switching operation in the mini TV 620, the main TV 610 can operate like the latter case. Moreover, even if the main TV 610 has a single tuner, the main TV 610 can provide the channel 6 again by being forced to be tuned to the previous channel.

In the above description, the examples of the operations of the mini TV in response to an input change or switching of the main TV are explained with reference to FIG. 7.

Figure 8:
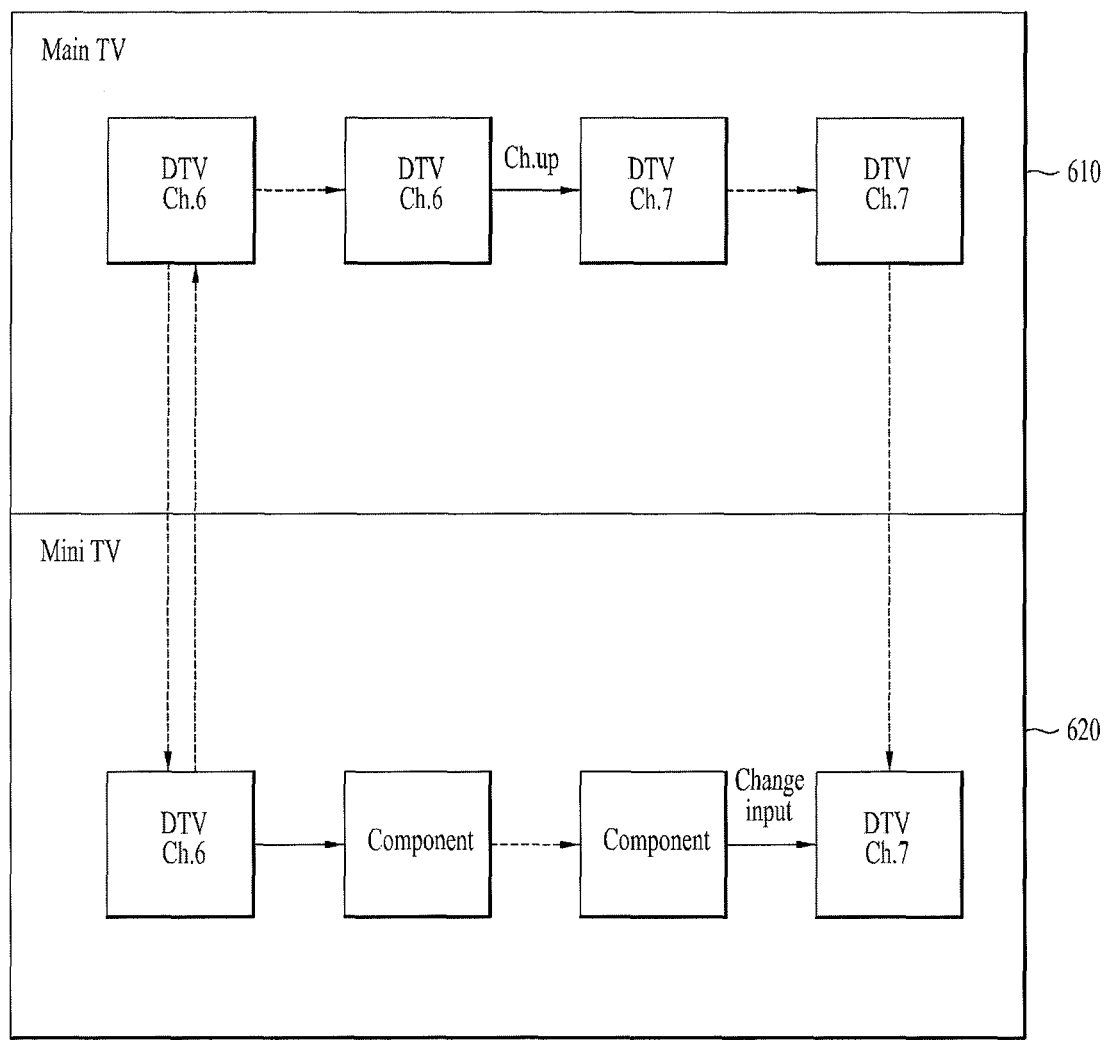
FIG. 8 is a diagram illustrating one example of operations when changing an input while a mobile device is providing a broadcast program on a channel received from a main device.

Next, FIG. 8 is a diagram illustrating one example of operations when changing an input while the mobile device 620 is providing a broadcast program on a channel received from the main device 610. In particular, FIG. 8 shows an operation for a case opposite to that shown in FIG. 7. For instance, FIG. 8 relates to operations of a mobile device and a main device when an input of the mini TV 620 is switched to a component input despite that the main TV 610 keeps displaying the broadcast program, whereas FIG. 7 shows that the main TV 610 changes a currently watched broadcast program into a component input.

If the main TV 610 provides the DTV channel 6, the mini TV 620 also provides the same DTV channel 6 by processing a signal received via the main TV 610. Thereafter, despite that there is no change in the main TV 610, an input of the mini TV 620 is switched to a component input. The input of the main TV 610 is switched to the component input by being linked with the mini TV 620 or no change may occur in the main TV 610. FIG. 8 shows one example of the latter case. In particular, the main TV 610 continues to provide the same channel after the component input switching of the mini TV 620.

Subsequently, the main TV 610 can change a broadcast channel irrespective of the mini TV 620. In this instance, the mini TV 620 continues to maintain a currently provided external input or may provide a changed channel, in response to a broadcast channel change of the main TV 610. Further, the main TV 610 and/or the mini TV 620 provides a popup alarm for changed items of each device as a result of a mini TV function activation or a pairing and can then perform a corresponding operation. Further, although the pairing is provided to perform the mini TV function, it may be performed irrespective of the mini TV 620.

In FIG. 8, the mini TV 620 continues to provide the component input irrespective of the channel switching operation of the main TV 610. Thereafter, after the component input has been ended, if the input of the mini TV 620 is changed into a broadcast channel again, the mini TV 620 provides the previously provided channel 6 or the currently provided channel (e.g., channel 7) of the main TV 610.

In the above description, examples of the operations of the mobile device and the main device in response to the input switching of the mini TV 620 are explained with reference to FIG. 8.

Figure 9:
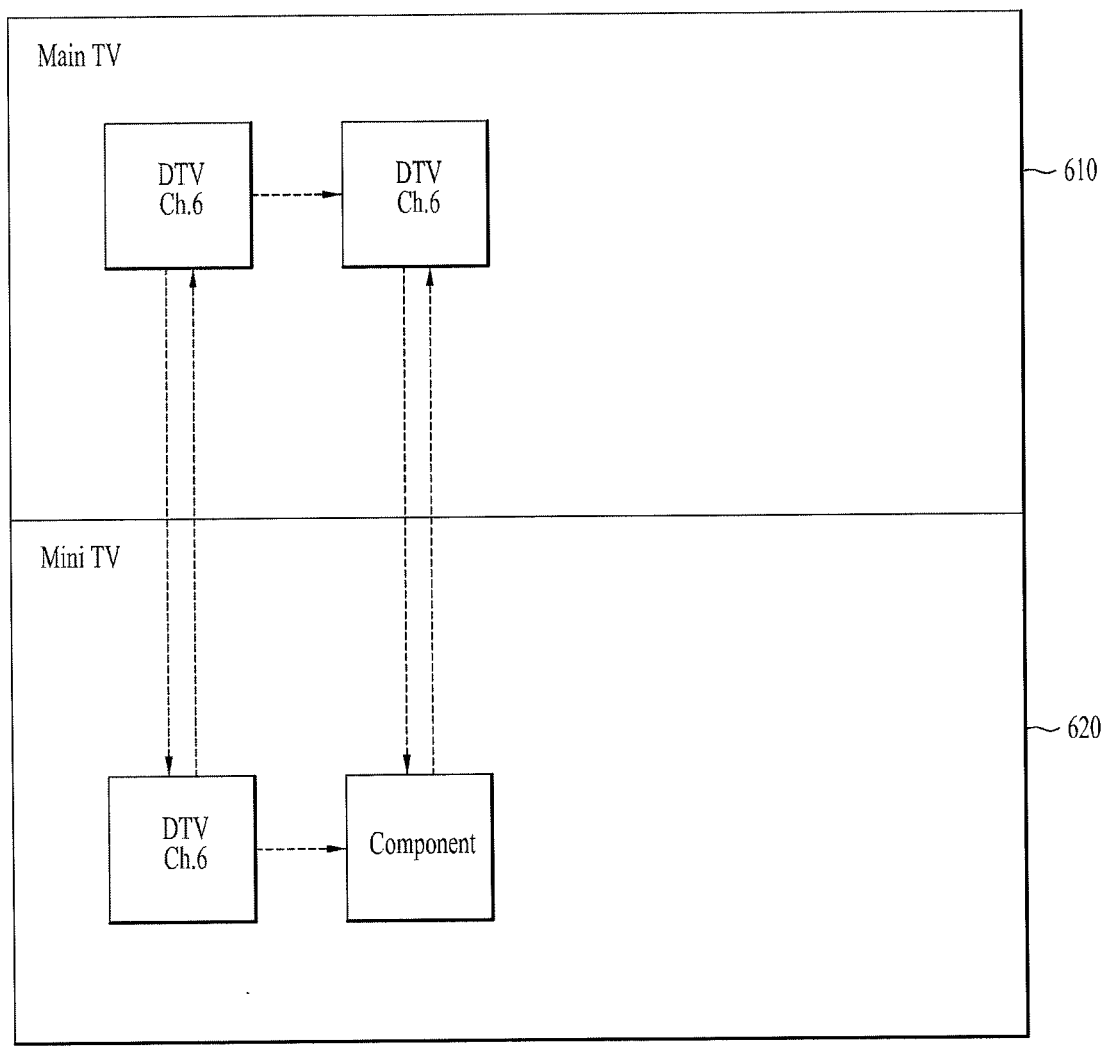
FIG. 9 is a diagram illustrating one example of an operation of a mobile device while a main device provides a component input instead of a broadcast channel.

Next, FIG. 9 is a diagram illustrating one example of an operation of the mobile device 620 while the main device 610 provides a component input instead of a broadcast channel. For instance, in the description with reference to FIG. 7, when the input of the main TV 610 is switched to a component input from a broadcast channel, the mini TV 620 continues to provide the broadcast channel instead of switching to provide the component input. However, FIG. 9 relates to an operation when the main TV 610 is providing the component input instead of the broadcast channel when activating the mini TV function.

Referring to FIG. 9, if the main TV 610 provides a component input instead of a broadcast channel, the mini TV 620 receives the component input and then provides the received component input. However, since the mini TV 620 differs from the main TV 610 in operations, attributes, capabilities and the like, the mini TV 620 converts the component input to be suitable for the mini TV 620 and then provides the converted component input. If the broadcast channel is input instead of the component input, it may be converted appropriately likewise.

Figure 10:
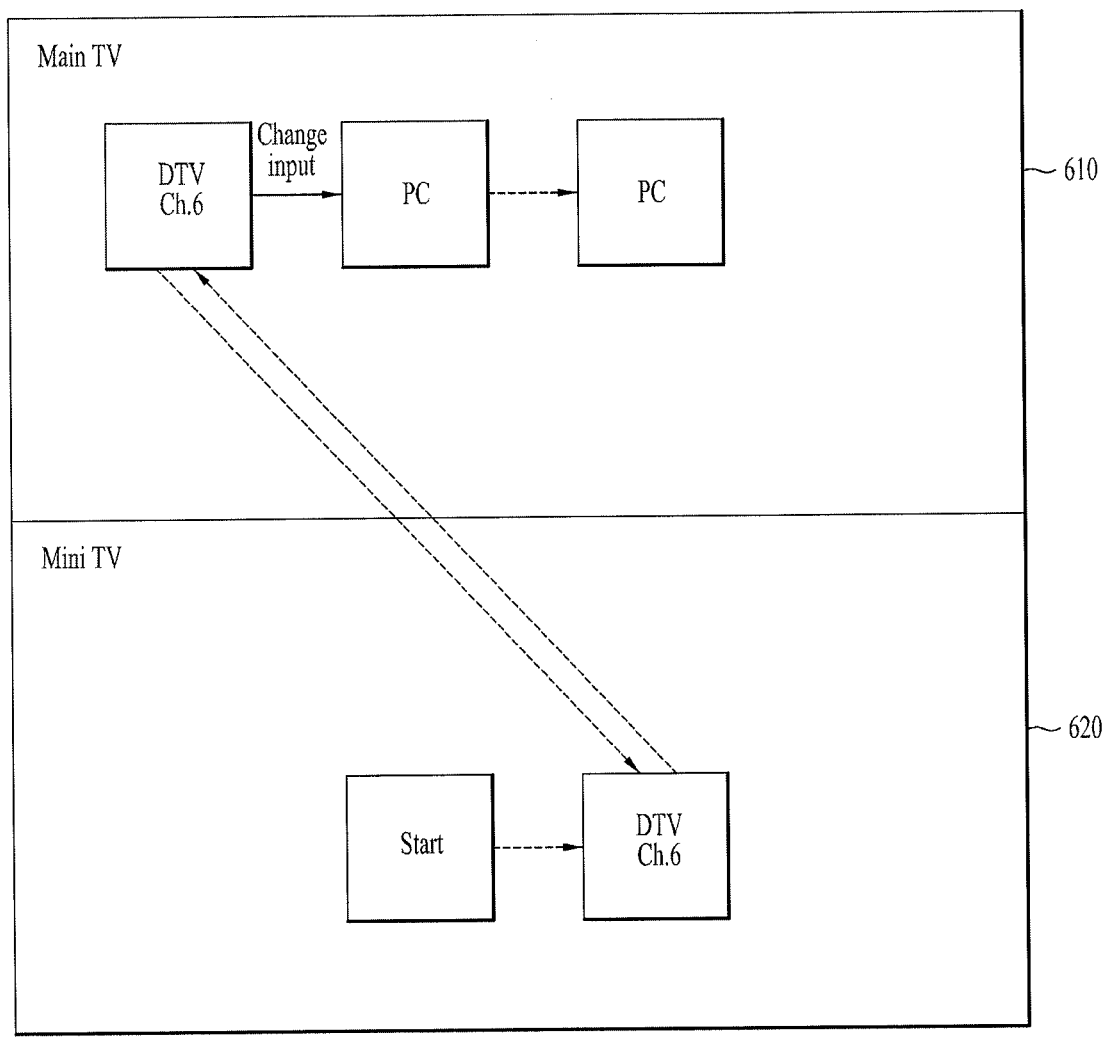
FIG. 10 is a diagram illustrating one example of an operation of a mobile device when a main device switches to a PC input when providing an initial broadcast channel.

FIG. 10 is a diagram illustrating one example of an operation of the mobile device 620 when the main device 610 switches an initially provided broadcast channel to a PC input while providing the initial broadcast channel. Although the component input is taken as an example of an external input in FIGS. 7 to 9, a PC input is taken as an example of an external input in FIG. 10.

Referring to FIG. 10, the main TV 610 initially provides DTV channel 6. Hence, the mini TV 620 also provides the DTV channel 6 via a screen. If an input of the main TV 610 is switched from a broadcast channel to an external input, i.e., to a PC input, the mini TV 620 may continue to maintain a previous channel or may provide the PC input. However, in the latter case, the PC input may be provided with a corresponding configuration in order to be provided by the mini TV 620 or may need a configuration to convert an input. Thus, FIG. 10 shows one example of when the mini TV 620 continues to provide the broadcast channel (e.g., channel 6) despite the PC input switching of the main TV 610.

Figure 11:
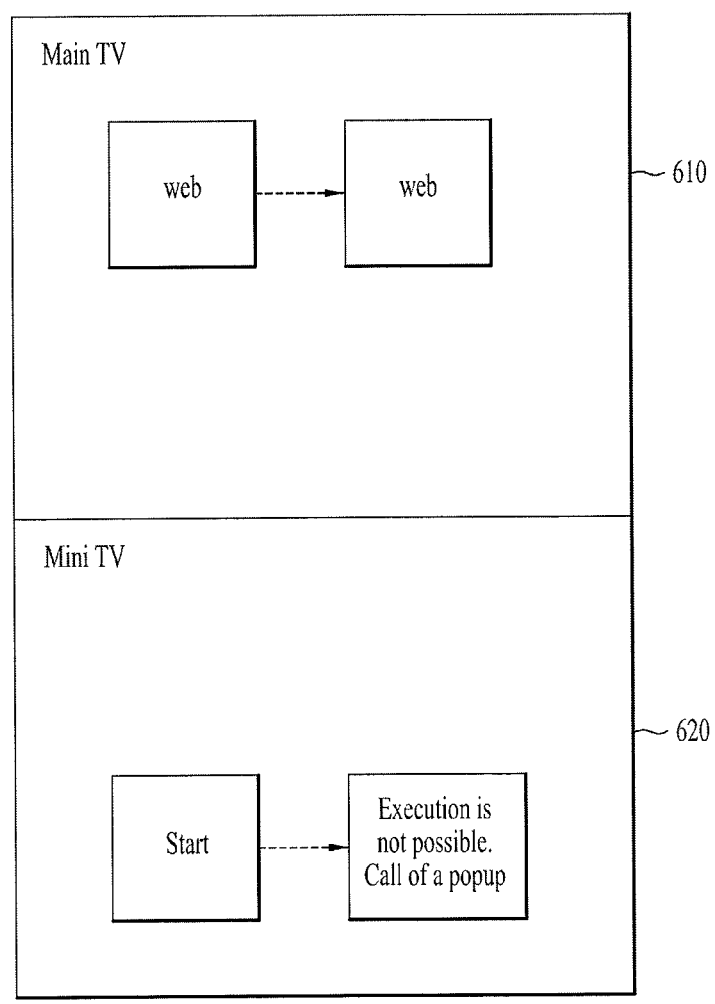
FIG. 11 and FIG. 12 are diagrams illustrating examples of an operation of a mini TV when implementing a web browser in a main TV.
Figure 12:
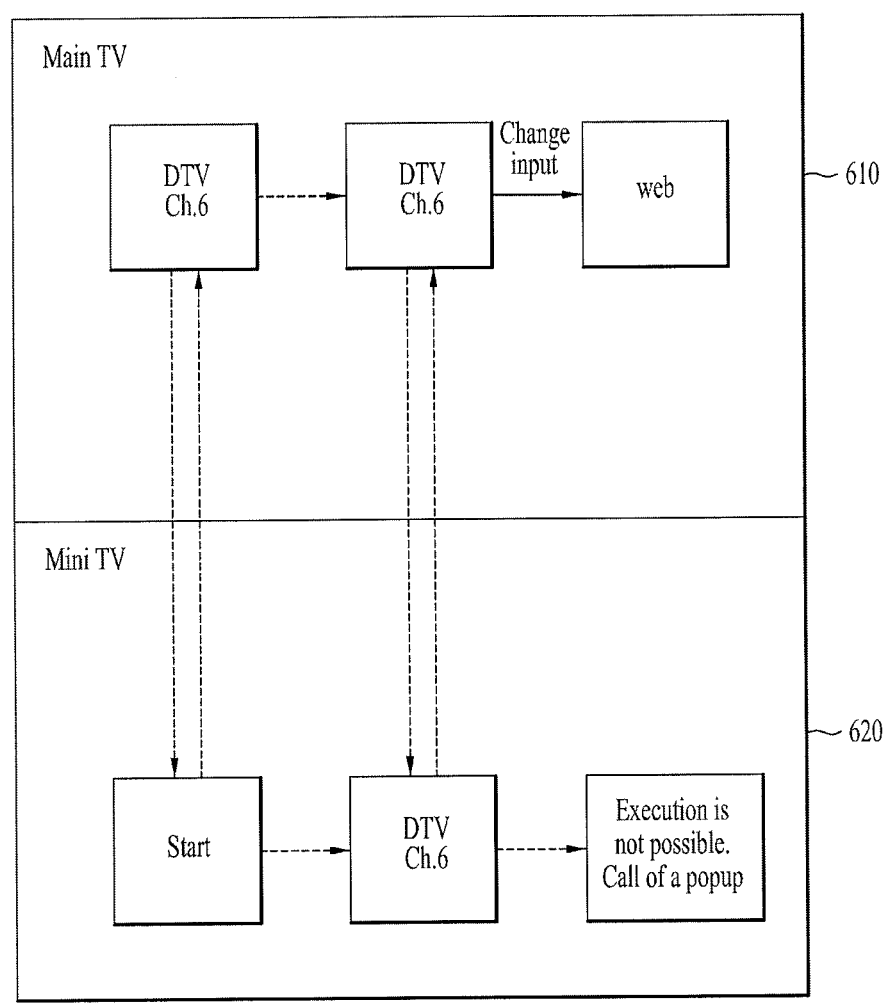

Next, FIG. 11 and FIG. 12 are diagrams illustrating examples of an operation of the mini TV 620 when implementing a web browser in the main TV 610. First of all, in order to provide a mini TV function together with a activation of a remote application and a pairing process, the mini TV 620 can receive various kinds of additional information including a currently provided screen of the main TV 610, attributes, channel number, channel name, signaling information and the like. Since the main TV 610 and the mini TV 620 differ from each other in functions, attributes and the like, the additional information are received to provide an appropriate screen. Thus, various kinds of information can be transmitted and received between the main TV 610 and the mini TV 620.

Next, FIG. 11 shows one example of when the mini TV 620 is unable to provide a screen identical to a web browser screen of the main TV 610. Referring to FIG. 11, the mini TV 620 can display a popup alarm to indicate that a web browser is currently active in the main TV 610 and is unable to be activated in the mini TV 620.

Referring to FIG. 12, if the main TV 610 activates a web browser when providing a broadcast channel of an initial DTV channel 6 before the activation of the web browser, a tuner of the main TV 610 continues to provide a currently tuned broadcast channel and a popup may be provided to indicate that the activation of the web browser is impossible.

FIG. 12 may be identically applicable to when the web browser is active in the main TV 610 at the time of the mini TV activation except when the main TV 610 activates the web browser in the middle of providing a broadcast channel at the time of activating the function of the mini TV 620.

Unlike the above descriptions mentioned with reference to FIG. 11 and FIG. 12, if the main TV 610 receives a mini TV function request, the main TV 610 can provide the mini TV 620 with address information of a currently provided web browser. In this instance, the mini TV 620 indicates that the web browser is currently active in the main TV 610 and that the mini TV function is not executable and provides a UI to determine whether the mini TV 620 will activate a web browser for a corresponding address access based on the address information provided via the main TV 610, in response to a mini TV function request made by a user. If the user selects to activate the web browser, the mini TV 620 can provide a webpage optimized for the mini TV 620 via the activated web browser.

In the above description, the operations of the mini TV 620 when the web browser is currently active in the main TV 610 are explained with reference to FIG. 11 and FIG. 12. In the foregoing descriptions with reference to FIGS. 6 to 12, various scenarios of operations between the mini TV 620 and the main TV 610 in accordance with the activation of the mini TV function are explained.

Figure 13:
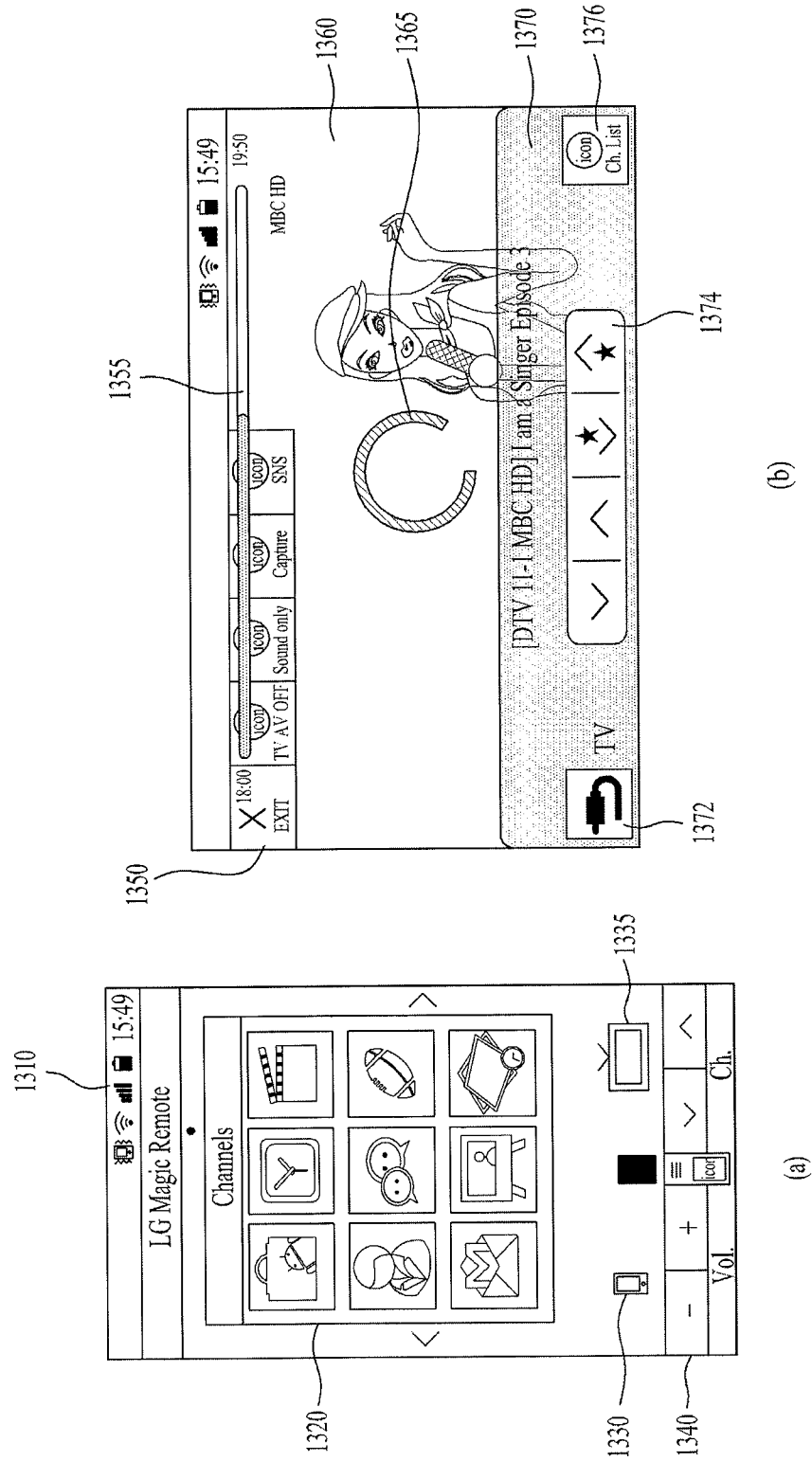
FIG. 13 is a diagram illustrating one example of activating a mini TV function by activating a channel selected from a home screen of a mobile device.
Figure 14:
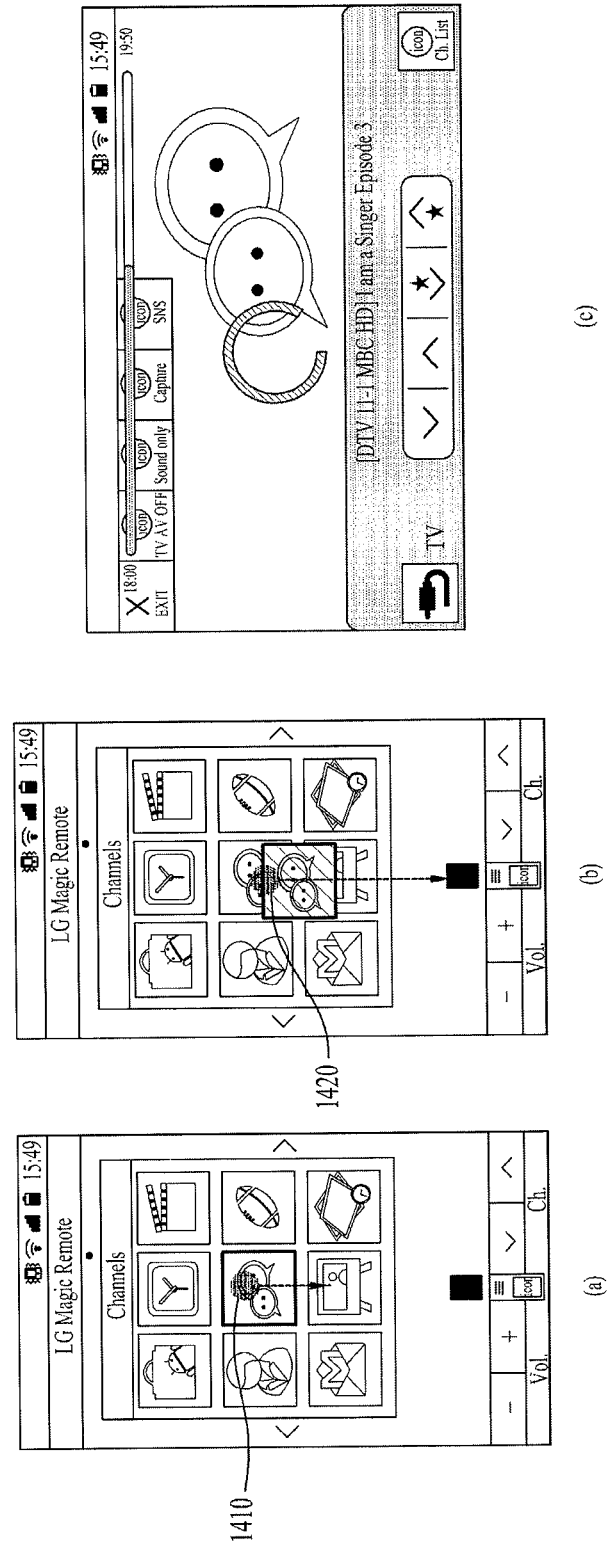
FIGS. 14(a) to 14(c) are diagrams describing the mini TV function activation.
Figure 15:
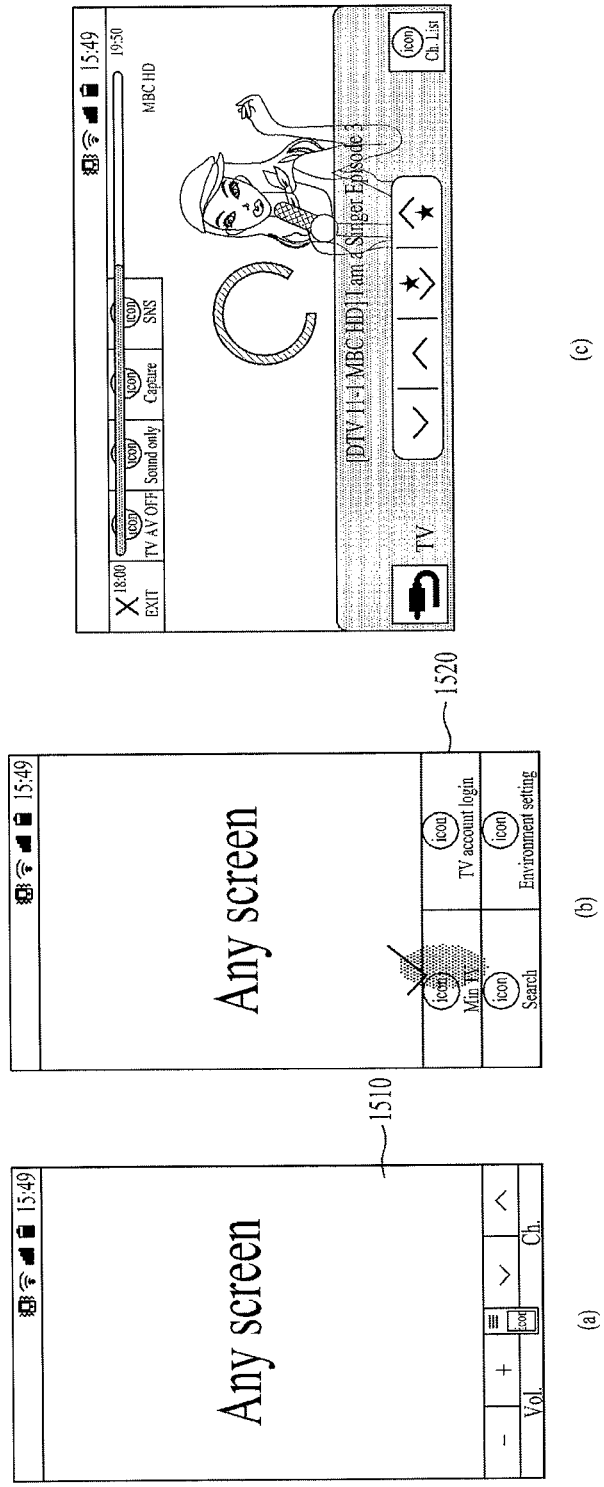
FIGS. 15(a) to 15(c) are diagrams illustrating one example of an access method for a mini TV function activation according to an embodiment of the present invention.

In the following description, various uses and operation scenarios for a mini TV access such as an activation of a mini TV function and the like will be explained in detail with reference to the accompanying drawings. In particular, FIGS. 13 to 15 are diagrams illustrating examples of a mini TV function access method according to embodiments of the present invention. In particular, FIG. 13 is a diagram illustrating one example of activating a mini TV function by activating a channel selected from a home screen of a mobile device.

For example, FIG. 13(a) shows one example of a home screen of a mobile device. Referring to FIG. 13(a), a mode of a mobile device, a network state, a remaining battery level, a signal strength, time information and the like are provided to a top end 1310 of a screen. In addition, a menu icon may be provided directly below the top end 1310 of the screen.

A channel list 1320 may be provided to a middle part of the screen. In this instance, the channel list 1320 is displayed and another menu screen may be provided thereto. Further, text information (e.g., "channels") indicating that the corresponding menu is the channel list is provided to a top end of the channel list 1320 and information on a plurality of channels is provided below the text information. In this instance, the information on the channel may include broadcast station information, channel information, thumbnail image, information on broadcast time, other text information and the like for example.

Further, the channel list menu screen configuration shown in FIG. 13 is just exemplary. In addition, various kinds of channel list menu screen configurations can be provided in accordance with various references including broadcasting system provider, channel, viewing restriction and the like.

An icon including text information for an activation of a mini TV function of the present invention, image information and the like is provided to a region 1330 below the channel list. In addition, a menu item for a volume adjustment, a menu item for a channel adjustment and the like may be provided to a most bottom end 1340 of the screen. If a user performs a click, double click, pointing or the like on a mini TV icon, the mobile device directly activates the mini TV function, receives a screen currently provided by the main device, and then switches its screen to the screen shown in FIG. 13(b).

Referring to FIG. 13(b), the mobile device enlarges and outputs a thumbnail image 1360 of the channel which is received when receiving video data from the main device or currently provided by the main device. In addition, the mobile device can output a loading wheel animation 1365 to indicate that a loading for the mini TV function activation is in progress. Further, if an external input is currently executed in the main device, the mobile device can display an external input control panel 370.

Further, in the mini TV function loading process, referring to FIG. 13(b), prescribed function items including an exit item (EXIT), a TV AV on/off item (TV AV ON/OFF), a sound only item (Sound only), a capture item (Capture), an SNS (social network service) item (SNS) and the like are output to a first region 1350 of a screen. A playback bar (e.g., a reproducing bar, a replay bar, etc.) including time information of a currently corresponding content is also provided to a second region 1355 of the screen. In particular, the playback bar provides information on a current play time.

In addition, a control panel 1370 including channel information, broadcast station information, content information, input information (e.g., external input, TV input, PC input, etc.) 1372, a volume and/or channel adjustment item 1374 and a channel list icon 1376 is provided to a third region of the screen of the mobile device.

The exit item (EXIT) mentioned in the above description is provided to end a mini TV and to enter the home screen shown in FIG. 13(a). The TV AV on/off item is provided to turn on/off a display of the main TV paired with the mini TV, i.e., a power and to enable/disable a mute. If the sound only item is enabled, multitasking is implemented by keep providing a sound of a currently provided content (i.e., the sound keeps being provided despite the switching to the home screen) despite that the mini TV function is ended. On the contrary, if the sound only item is disabled, the sound of the content is not provided by being turned off together with the mini TV function. The capture item is provided to capture a current video screen and to save the captured video screen in a prescribed location. The SNS item is provided to enable a current screen to provide a screen panel related to an SNS service. In doing so, a currently provided screen is paused or may continue to be provided irrespectively.

The external input control item within the control panel 1370 provides a list of inputtable external inputs of each of the mini TV and the main TV and also provides a UI for a switching or change to an item selected from the provided list. Further, in FIG. 13(a), the mini TV function may be directly entered and provided in response to a prescribed action. However, a UI is configured and provided to determine what function will be activated. In addition, a selection can be made using the configured UI. For instance, the mobile device provides a UI including an icon for a mini TV, an icon for TV account login, an icon for a search, an icon for configuration settings and the like. If a user selects the mini TV icon, the mobile device may operate as shown in FIG. 13(b).

Another example of a method of activating a mini TV function in a home screen (or a channel list) is to drag & drop a thumbnail image of a desired channel in the channel list in direction of the item 1330 indicating the mini TV function. In this instance, unlike the foregoing description, a content of a channel corresponding to the thumbnail image selected (i.e., dragged & dropped) irrespective of a channel currently provided by the main TV. Further, if the mobile device has a configuration (e.g., a tuner) capable of tuning and receiving a broadcast signal, the screen of the main TV is not switched or changed.

However, if the mobile device receives a broadcast signal on a channel tuned via the tuner of the main TV, the mobile device transmits a control signal for channel information and the like to the main device and can then receive a broadcast signal from the main device in a manner that the main device receives the broadcast signal by tuning a channel based on the corresponding channel information via the tuner. Besides, if the main device includes a multi-tuner, there is no concern. However, if the main device includes a single tuner, a screen of the main TV can be provided by being switched based on the control signal of the mobile device.

Next, FIGS. 14(a) to 14(c) are diagrams illustrating the mini TV function activation mentioned in the above description. Referring to FIG. 14(a), a channel list, which is one of a home screen shown in FIG. 13(a), is provided to a screen. Thumbnail images for a total of 9 channels are provided to the screen at a time. If a user intends to watch a mini TV by accessing a channel corresponding to the thumbnail image at the center of the 9 thumbnail images, the user touches & drags the corresponding thumbnail image item 1410/1420 shown in FIG. 14(a)/FIG. 14(b) and then drops the corresponding thumbnail image item toward a bottom direction. If so, the screen automatically collects the information on the dragged & dropped thumbnail image. A control signal is created based on the collected information and is then transmitted to the main TV. Having received the control signal, the main TV performs an operation based on the received control signal. Thereafter, the mobile device receives a signal from the main device and then provides such a screen as shown in FIG. 14(c). If the channel corresponding to the dragged & dropped thumbnail image (i.e., the selected thumbnail image) is not the ongoing channel already provided by the main TV, it may take a little bit more loading time. Further, the screen of the main TV may be switched and provided.

Next, FIGS. 15(a) to 15(c) are diagrams illustrating one example of an access method for a mini TV function activation according to an embodiment of the present invention. Referring to FIG. 15(a), 'any screen' is displayed on a main screen 1510 of a mobile device. If a user performs a touch action (e.g., click, double click, press for prescribed duration, etc.) on a prescribed region of the main screen 1510 or an option icon provided to a bottom end of the main screen, an option menu function item 1520 shown in FIG. 15(b) is provided.

In the option menu function item 1520, an icon for a mini TV function, an icon for TV account login, an icon for search, an icon for configuration setting and the like may be included. Further, the option menu function item 1520 shown in FIG. 15(b) can be activated in response to a prescribed action (e.g., shaking the mobile device right and left, shaking the mobile device up and down, etc.) as well as the above touch action. The mobile device may further include a gyro sensor and the like.

Referring to FIG. 15(b), if a user selects the mini TV icon from the icon list of the option menu function item 1520 provided to the mobile device, the screen shown in FIG. 15(c) may be provided. A last TV channel may be played in the course of a smart share playback.

If the mini TV icon is selected in FIG. 15(b), the mobile device provides information on a currently provided channel of the main device, information on a corresponding channel, information on recording/recording reservation, information on a time shift, information on a time machine and the like.

Having provided information related to the provided information, the mobile device may switch to the screen shown in FIG. 15(c) in response to a corresponding selection. In this instance, the related information may include series information, rebroadcast information, retransmission channel information, and detailed information of a currently provided channel and content, and the like. The related information may be directly provided by the switched screen shown in FIG. 15(c).

FIGS. 16(a) to 16(d) are diagrams illustrating another example of an access method for a mini TV function activation or access according to an embodiment of the present invention.

Referring to FIG. 16(a), video is displayed on a main TV and any screen is displayed on a mobile device. If a user performs a receiving action in a similar manner of quick rapid movement or shaking (e.g., fishing up) the mobile device away from the TV video quickly, the mobile device can output the video currently output by the main TV (FIG. 16(b)). In response to the receiving action, the mobile device may obtain a thumbnail image of the corresponding time only or may provide a mini TV function instantly. In both of the former and latter cases, a UI for querying whether to save, whether to activate a mini TV function and the like is provided to the user and an operation corresponding to the selection made by the user according to the query UI can be performed.

Referring to FIG. 16(c), assume that the main TV and the mobile device are outputting a video 1 and a video 2, respectively. If a user performs a throwing action, which is reverse to the receiving action shown in FIG. 16(a), i.e., a quick throwing (e.g., a line dropping action in fishing), the video 2 currently provided by the mobile device can be provided by the main TV (FIG. 16(d)).

Also, if the video of the main TV is taken via a camera or is recorded up to a prescribed time of footage, a UI can be provided for querying whether to save the taken or recorded video and whether to activate the mini TV function. Further, the case shown in FIG. 16 may be performed after completion of the pairing process described with reference to FIG. 4 or FIG. 5. Although the pairing is performed in response to the activation of the remote application in FIG. 4 or FIG. 5, it may be performed if a user performs the action shown in FIG. 16 or lightly shakes the mobile device horizontally or vertically.

Figure 17:
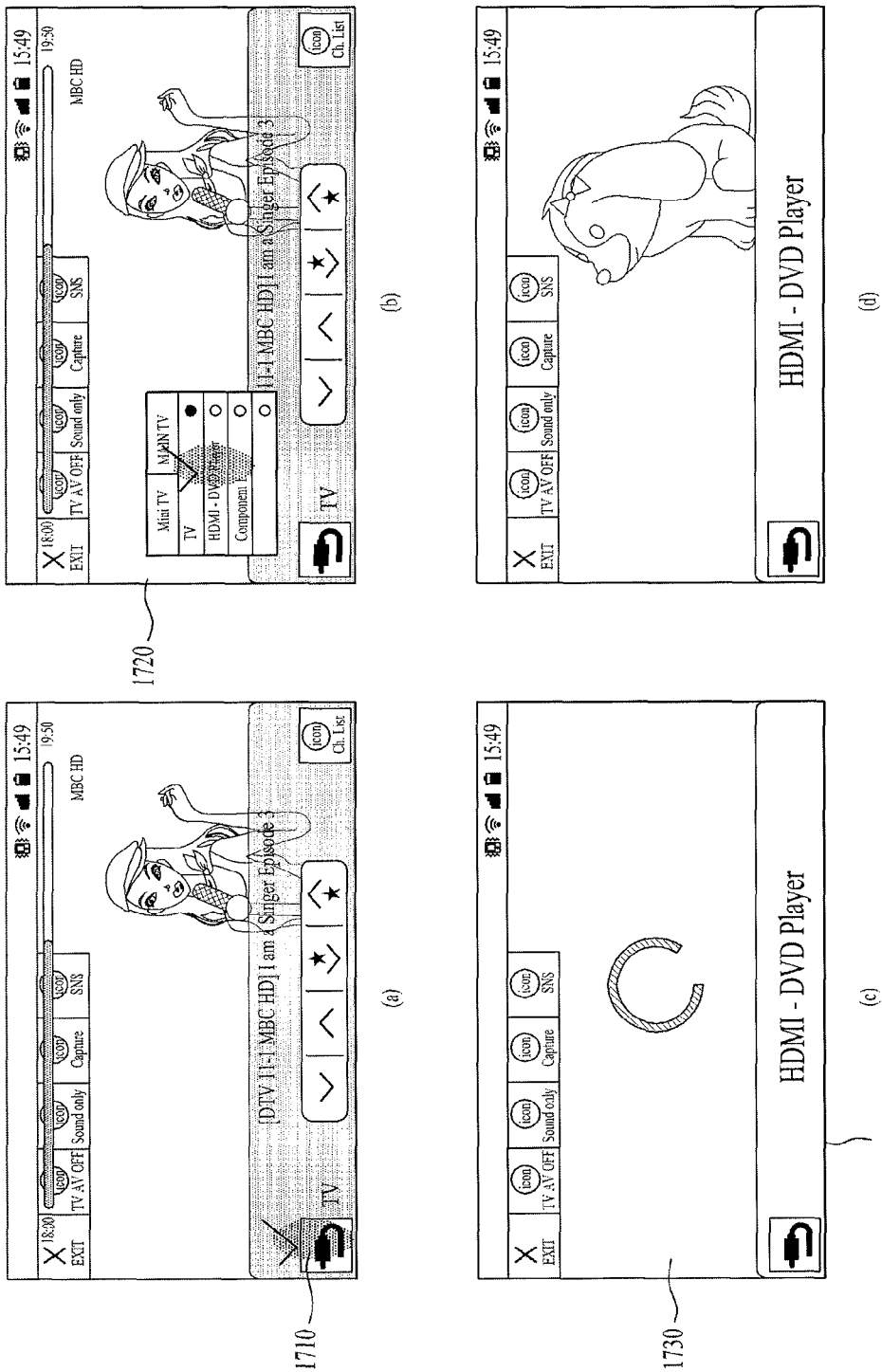
FIG. 17 is a diagram illustrating attempting to change or switch an input while activating a mini TV function in a mobile device according to an embodiment of the present invention.

A method of activating or accessing a mini TV function in a mobile device will now be explained in the following description of the corresponding part. In particular, FIG. 17 is a diagram illustrating a case of attempting to change or switch an input while activating a mini TV function in a mobile device according to an embodiment of the present invention.

FIG. 17(a) shows when a mini TV function is activated in a mobile device, which is mentioned in the foregoing description. If a user selects an external input item 1710 of a control panel, for example, the mobile device provides a UI 1720 shown in FIG. 17(b). As mentioned with reference to FIG. 13, the UI 1720 is divided into a mini TV and a main TV and is provided as a list of input types currently set or available for each of the mini TV and the main TV or a list of external inputs connected to each of the mini TV and the main TV. If a user selects HDMI as an input of the main TV instead of selecting TV shown in FIG. 17(a), the mobile device receives a video from the HDMI, which is connected with the main TV, via the main TV and then provides the received video (FIG. 17(d)).

Referring to FIG. 17(c), a user can recognize a screen switching process in a manner that an indication 1740 for the selected input is displayed on a control panel together with a loading wheel icon 1730. If the screen shown in FIG. 17(c) continues for a prescribed duration due to a network failure or the like and that a switching to the screen shown in FIG. 17(d) is not achieved, the mobile device can automatically check and/or refresh a network connected state. The mobile device can also provide the screen shown in FIG. 17(c) at a prescribed count or for a prescribed time or can keep providing the screen displayed before the external input selection, as shown in FIG. 17(a). Moreover, the mobile device provides a UI about this situation to the user and then performs an operation in response to a selection made by the user later.

Figure 18:
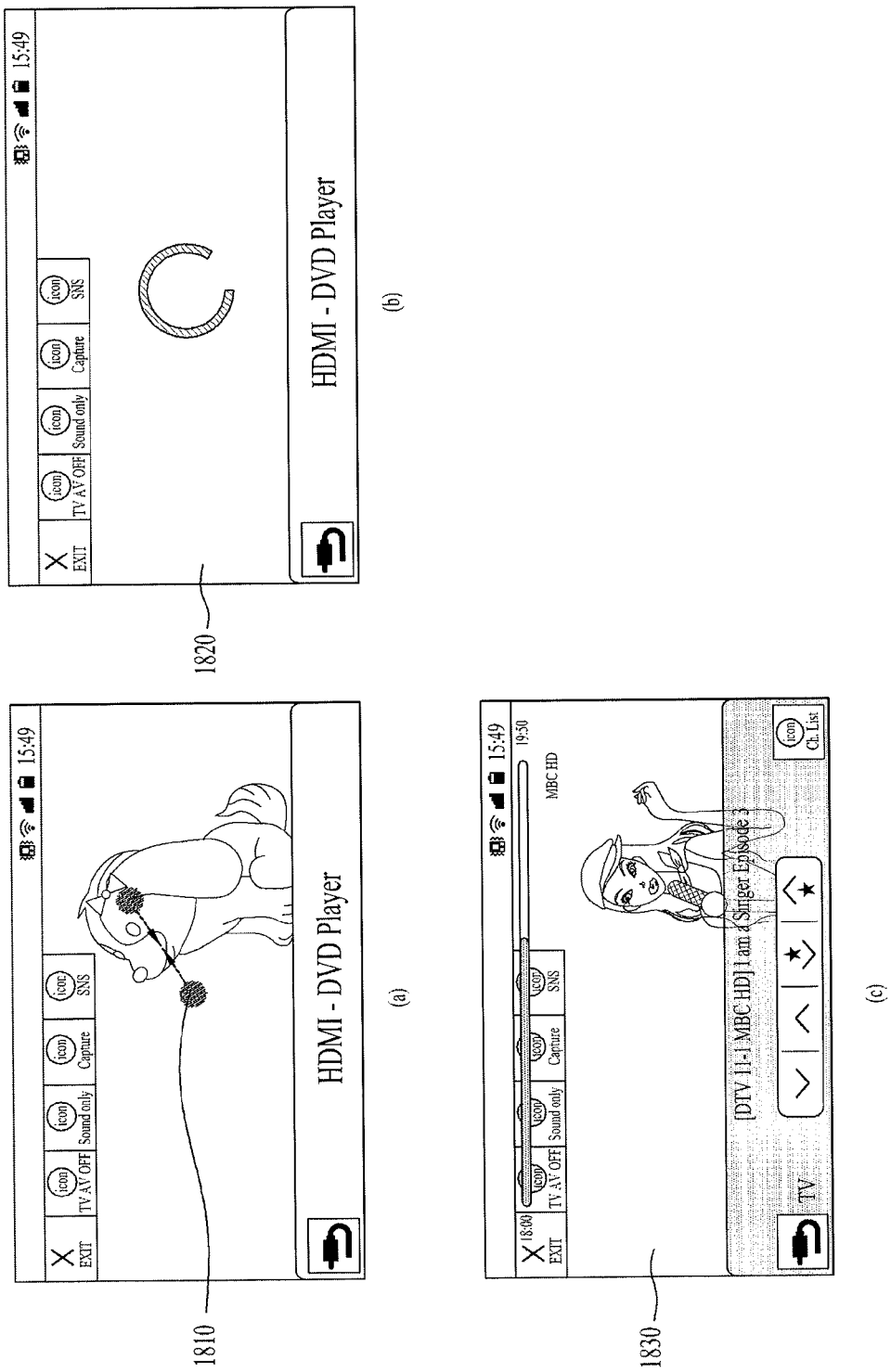
FIG. 18 and FIG. 19 are diagrams illustrating describing a mini TV function according to an embodiment of the present invention.
Figure 19:
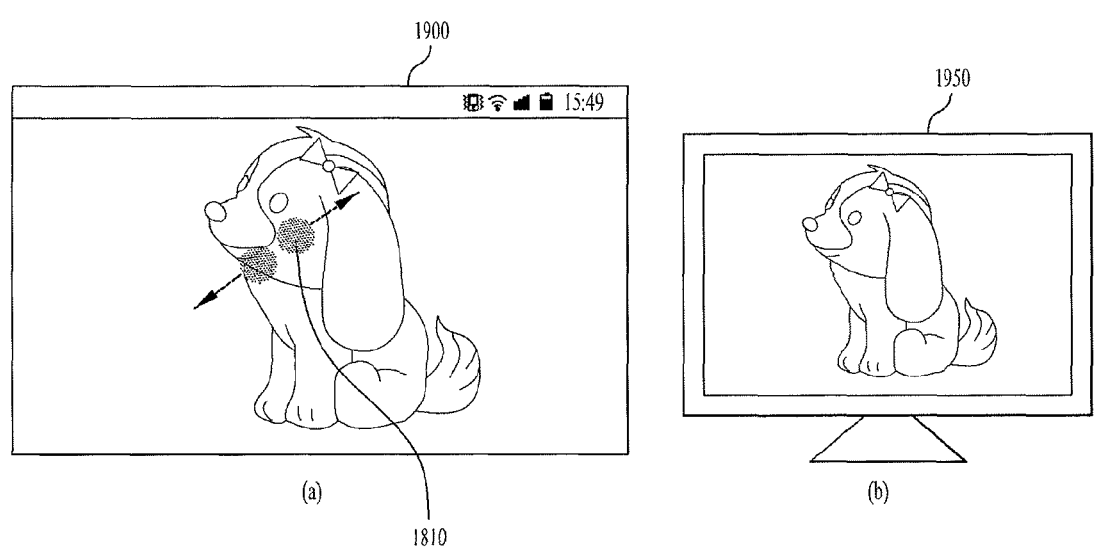

Next, FIG. 18 and FIG. 19 are diagrams illustrating a mini TV function according to an embodiment of the present invention. In particular, FIG. 18 and FIG. 19 relate to a video synchronization function as one of mini TV functions according to an embodiment of the present invention. In particular, FIG. 18 shows when a mini TV screen of a mobile device is video-synchronized with a screen of a main device, while FIG. 19 shows a screen of the main device is video-synchronized with a screen of the mini TV screen of the mobile device. In FIG. 18 and FIG. 19, a subject of the operations is the mobile device. The mini TV and the main TV display different screens, respectively.

Referring to FIG. 18(a), assume that the mobile device is providing an HDMI input to the mini TV and that the main TV is providing a broadcast channel. A user can perform an action of switching to a broadcast channel screen of the main TV by switching an external input via a control panel. Further, in FIG. 18(a), by performing a prescribed action on the screen without using the control panel, synchronization (e.g., bringing a main TV input state) with the screen currently provided by the main TV can be performed. In this instance, for example, the prescribed action includes a touch & drag 1810 performed by touching two points and then dragging the two touched points to pinch in (FIG. 18(a)).

Through this, the screen of the mini TV is provided by including a loading wheel icon 1820 together with a UI indicating that the screen switching is in progress, as shown in FIG. 18(b). A screen 1830 synchronized with the main TV may be then provided by the mini TV, as shown in FIG. 18(c).

On the contrary, referring to FIG. 19(a), if a prescribed action (e.g., a touch & drag 1910) is performed on the mini TV by touching two points and then dragging the touched two points to pinch out, the mobile device 1900 creates a control signal including information on synchronization with a video currently provided by the mobile device 1900 and then provides the created control signal to the main TV 1950. Through this, referring to FIG. 19(b), the main TV 1950 synchronizes a previously provided screen with the screen currently provided by the mini TV shown in FIG. 19(a).

In the above description, the video synchronization in response to a prescribed action is described with reference to FIG. 18 and FIG. 19. In this specification, the video synchronization is achieved by touching two points on the screen and then dragging the touched two points toward or away from each other (FIG. 18 or FIG. 19), by which the present invention is non-limited. For instance, the action for the video synchronization may include one of a horizontal or vertical shaking of a mobile device, a single touch & drag in prescribed direction, a multi-touch & drag in prescribed direction, a use of a control panel, a single touch or multi-touch & circular drag, and the like. If each of the above enumerated actions is performed, a UI for video synchronization is provided and a video synchronization corresponding to a selection via the UI can be then performed.

Figure 20:
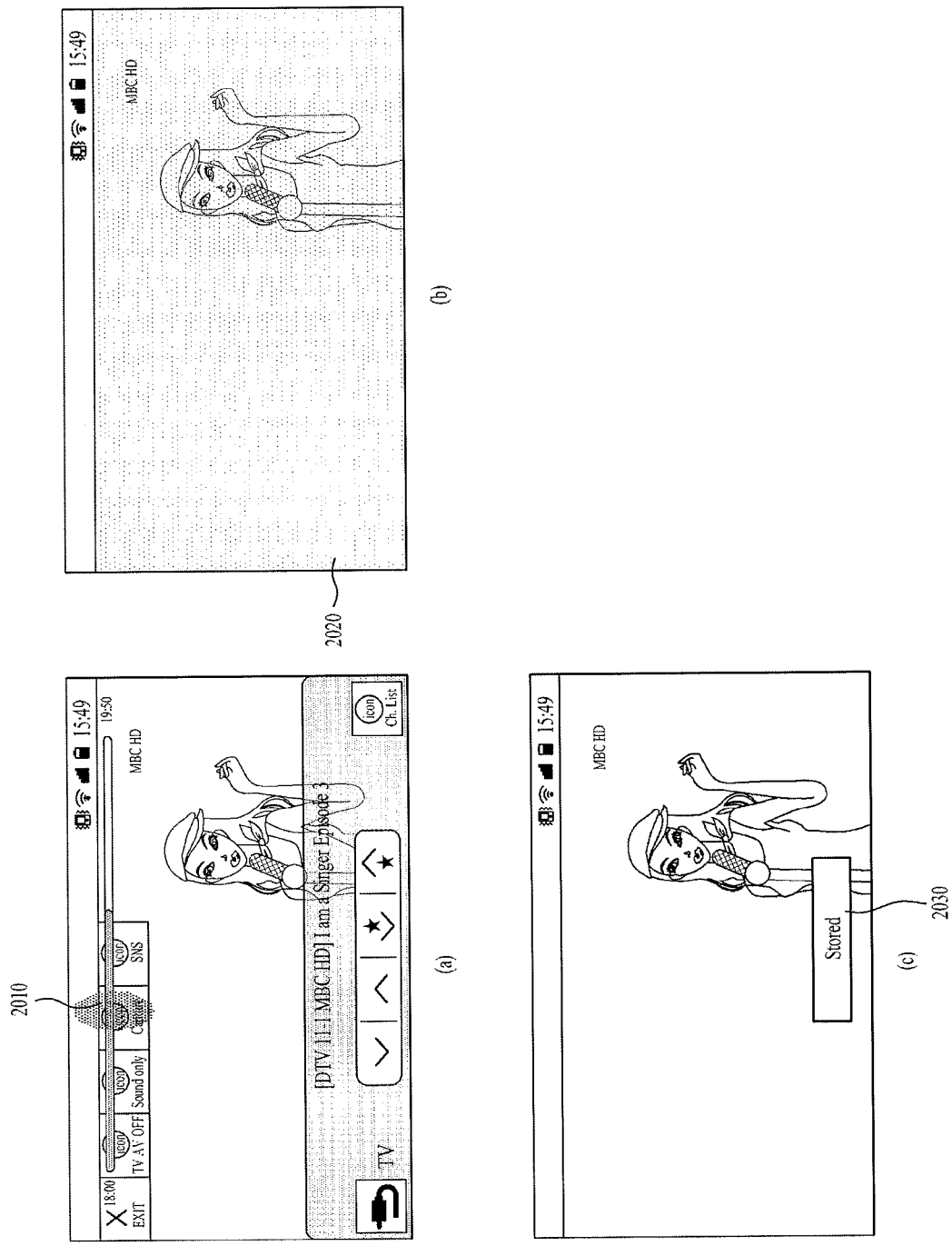
FIG. 20 is a diagram illustrating another example of a mini TV function according to an embodiment of the present invention.

Next, FIG. 20 is a diagram illustrating another example of a mini TV function according to an embodiment of the present invention. In particular, FIG. 20 shows a screen capture function as one of mini TV functions.

Referring to FIG. 20(a), after a mini TV function has been activated, if a prescribed region is touched, a control item is displayed. If a user intends to capture a currently broadcasted screen, the user selects a capture item 2010. Referring to FIG. 20(b), if the user selects the capture item 2010, a currently output screen is captured as a screen 2020 and is slightly blurred, which is similar to a sort of a camera function in a mobile device. If the capture is completed, referring to FIG. 20(c), a UI 2030 may be provided to indicate that the capture screen is stored. A storage location may be determined as a default.

Alternatively, the storage location may be determined by providing the user with a UI for selecting the storage location and having the storage location selected by the user. Further, in order to check whether an image is sufficiently captured or whether a captured image is clear, the captured image is provided as a thumbnail to a prescribed region of the screen. If the provided thumbnail image is selected, the corresponding thumbnail image is displayed on the screen by being enlarged. If the user selects the enlarged thumbnail image, a UI and/or tool for editing can be provided together. The UI and/or tool for the editing may be provided simultaneously with the enlarged thumbnail image. Moreover, if the user selects the capture item in FIG. 20(a) or a list of thumbnail images of captured screens for a current or previous channel is provided after the process shown in FIG. 20(c), a screen may be configured to enable the editing off the thumbnail images.

Further, in a manner similar to the process shown in FIG. 20, the mini TV can provide a time shift function. When a time shift item is displayed as one of control items, if a user selects the time shift item, a saving operation starts with a current screen to be saved in a storage unit. If capacity of the storage unit is insufficient, it may be able to secure storage space by deleting oldest items and the like. Alternatively, a related UI is provided and a user can then select items to delete. Besides, recording/recording reservation can be handled in a similar manner.

Next, FIG. 21 is a diagram illustrating another function of a mini TV according to an embodiment of the present invention. In particular, FIG. 21 relates to a function providing method when attempting to use an SNS service while watching a mini TV function. Referring to FIG. 21, if a user selects an SNS item 2110 (FIG. 21(a)), an SNS content 2120 about a current channel or a content of a channel is displayed on a prescribed region (FIG. 21(b)). The SNS can provide contents of social network services (SNSs) linkable with or accessible to the mobile device in association with the channel or the channel content as well as a content of a single service. If a user makes a selection 2130 to check a listed-up specific content in FIG. 21(b), the mobile device can overlap and display a screen shown in FIG. 21(c). Further, if a corresponding content is too much and can't be displayed on a whole screen, a wheel bar UI 2140 is provided to a prescribed region of the screen. The user touches and drags the wheel bar UI 2140 in desired direction to check the corresponding content (FIG. 21(d)).

Figure 22:
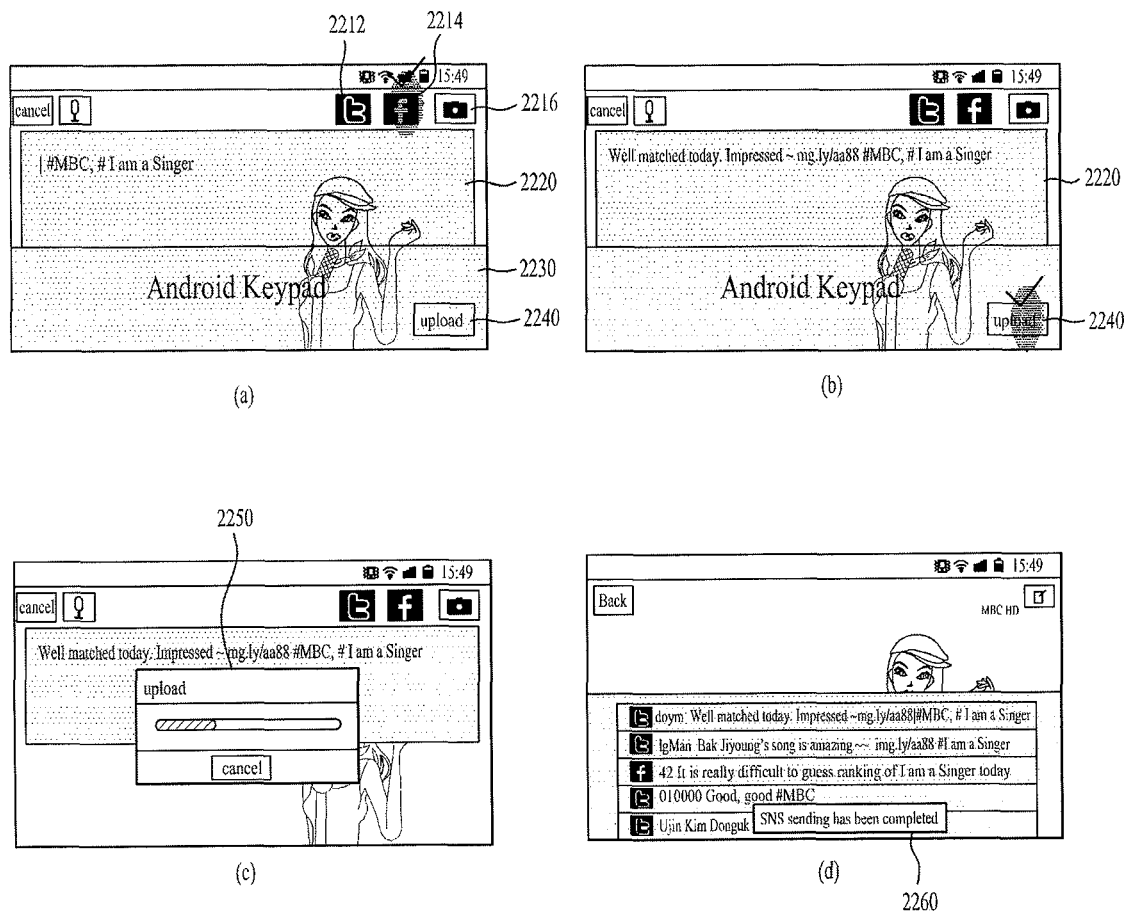
FIG. 22 is a diagram illustrating when a user attempts to compose a content using SNS instead of checking a related SNS content like FIG. 21.

FIG. 22 is a diagram illustrating when a user attempts to compose a content using SNS instead of checking a related SNS content in the manner shown in FIG. 21. In particular, FIG. 22(a) shows an interface UI provided for a user to compose an SNS content if a write item provided to a right top end is selected shown in FIG. 21(b).

In addition, a cancel button, a voice button, SNS type buttons including a Twitter button 2212 and a Facebook button 2214, and a camera button 2216 are provided to a top end 2210 of a screen. In this instance, the cancel button is selected, a current screen is switched to the screen shone in FIG. 21(b). The voice button is provided to attach a voice recording file. If the voice button is selected, a recording can be instantly performed or a desired voice content can be attached via a list of previously recorded contents.

A user can select a type of SNS, which is preferred by the user or via which the user attempts to compose a content, such as Twitter, Facebook and the like. In this instance, an interface provided for composing a content may differ on the screen in accordance with the selected type of SNS.

On the other hand, if an SNS is not selected, a defaulted SNS or all SNSs are selected to be linked with the corresponding service(s). Further, the camera button is provided to capture an image or to photograph and save a photo. If the camera button is selected, previously saved image items (e.g., videos, moving pictures, etc.) may be provided. Further, an SNS item, which is not logged on to, may be provided by being discriminated from a logged-on item.

A text window 2220 and a keypad window 2230 may occupy most of the screen. In addition, an upload button 2240 for uploading a composed content is provided to a prescribed region of the screen. In particular, the keypad window 2230 may be provided with QWERTY keyboard or the like in accordance with a type of a mobile device. If a mobile device is connected with a separate input mechanism, the keypad window 2230 may not be provided to the screen.

Thus, if a hash tag related to a currently watched content is input and uploaded through the steps shown in FIG. 22(b) and FIG. 22(c), an indication 2250 indicating that an upload is in progress is displayed (FIG. 22(d)). In addition, the content composed by the user is additionally provided to a screen shown in FIG. 22 similar to the former screen shown in FIG. 21(b) together with a UI 2260 indicating that the SNS transmission is completed. Besides, the content composed by the user may be provided by being discriminated from other contents.

Figure 23:
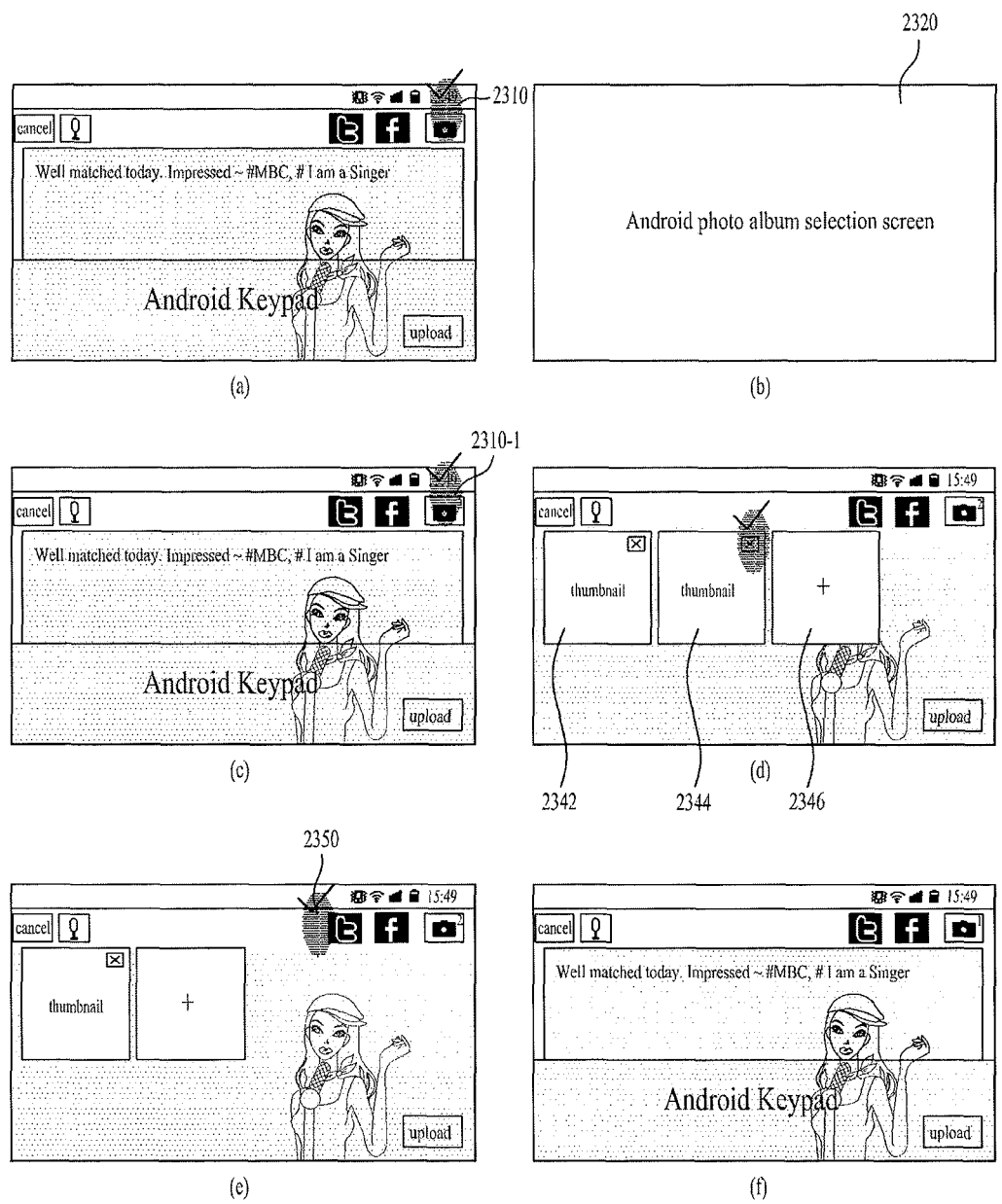
FIG. 23 is a diagram illustrating attaching image information to SNS as well as text data.

Next, FIG. 23 is a diagram illustrating a case of attaching image information to SNS as well as text data. Referring to FIG. 23, if a user selects a camera item 2310 from a screen shown in FIG. 23(a), a list of image information is provided (FIG. 23(b)). If the user selects one or more image information, the number of the image information selected in FIG. 23(b) is displayed on the camera item 2310-1 of the original screen (FIG. 23(c)). In addition, the added image information may be then output as shown in FIG. 23(d). For example, the screen shown in FIG. 23(d) corresponds to when an image information needs to be modified (e.g., add, delete, etc.) is added in FIG. 23(c). This screen may be configured if the camera button 2310-1 is selected again.

Referring to FIG. 23(d), the image information 2342 and 2344 selected in FIG. 23(b) and an item 2346 to be added are displayed. Further, a delete icon may be output to a prescribed part of each of the image information 2342 and 2344. For instance, if the delete icon of the second image information 2344 is selected in FIG. 23(d), a screen shown in FIG. 23(e) may be provided. For instance, if the add icon 2346 is selected, a current screen is switched to the screen shown in FIG. 23(b) to facilitate a user to add image information. If a prescribed region 2350 except the icons is touched in FIG. 23(e), a screen for a final SNS image upload may be provided as shown in FIG. 23(f).

Further, when an image is attached when using an SNS, since a size of an image is too big or small, if a user intends to edit the image, an editing may be directly performed by clicking the image, double-clicking the image, single- or multi-touching & dragging the image in prescribed direction, or the like. Alternatively, an UI including an icon for editing tools may be provided. Also, while a mini TV is being watched, if an SNS authentication or login procedure is required for an activation of SNS function, a control window for the corresponding procedure may be provided.

Next, FIG. 24 is a diagram illustrating another example for a mini TV access according to an embodiment of the present invention. Referring to FIG. 24, in a manner similar to that described with reference to FIG. 17, after a remote application has been activated in a mobile device, if a main TV is snatched in an any screen state 2410, the mobile device captures a current screen of the main TV.

After this quick rapid movement or shaking (snatching), if a screen of the main TV is again snatched, the mobile device provides such a spot menu 2420 as shown in FIG. 24(b) automatically or in response to a selection made by a user. Optionally, only if the number of screens captured by the quick rapid movement or shaking is equal to or greater than a prescribed number, the mobile device can provide the spot menu.

Referring to FIG. 24(b), the mobile device according to an embodiment of the present invention provides a spot menu UI including a menu for a mini TV, a menu for SNS, a menu for a detailed view, a menu for a preferred image or channel, a menu for an image saving and the like together with a captured image. According to an embodiment of the present invention, if the mini TV icon is selected, the mini TV function is activated. If the mini TV function is activated, a control signal is transmitted to a main device. Thereafter, video data of a currently output screen is received from the main device and then provided to a screen of a mobile device.

Figure 25:
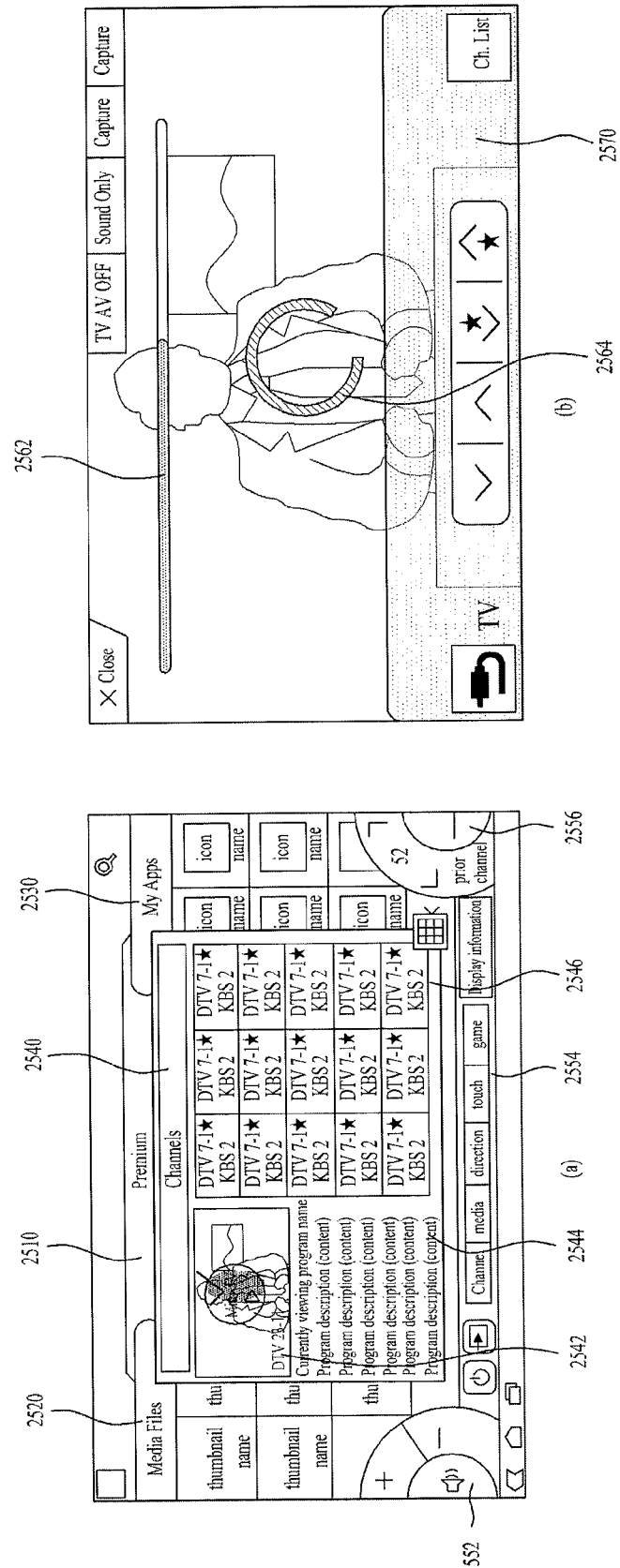
Figure 27:
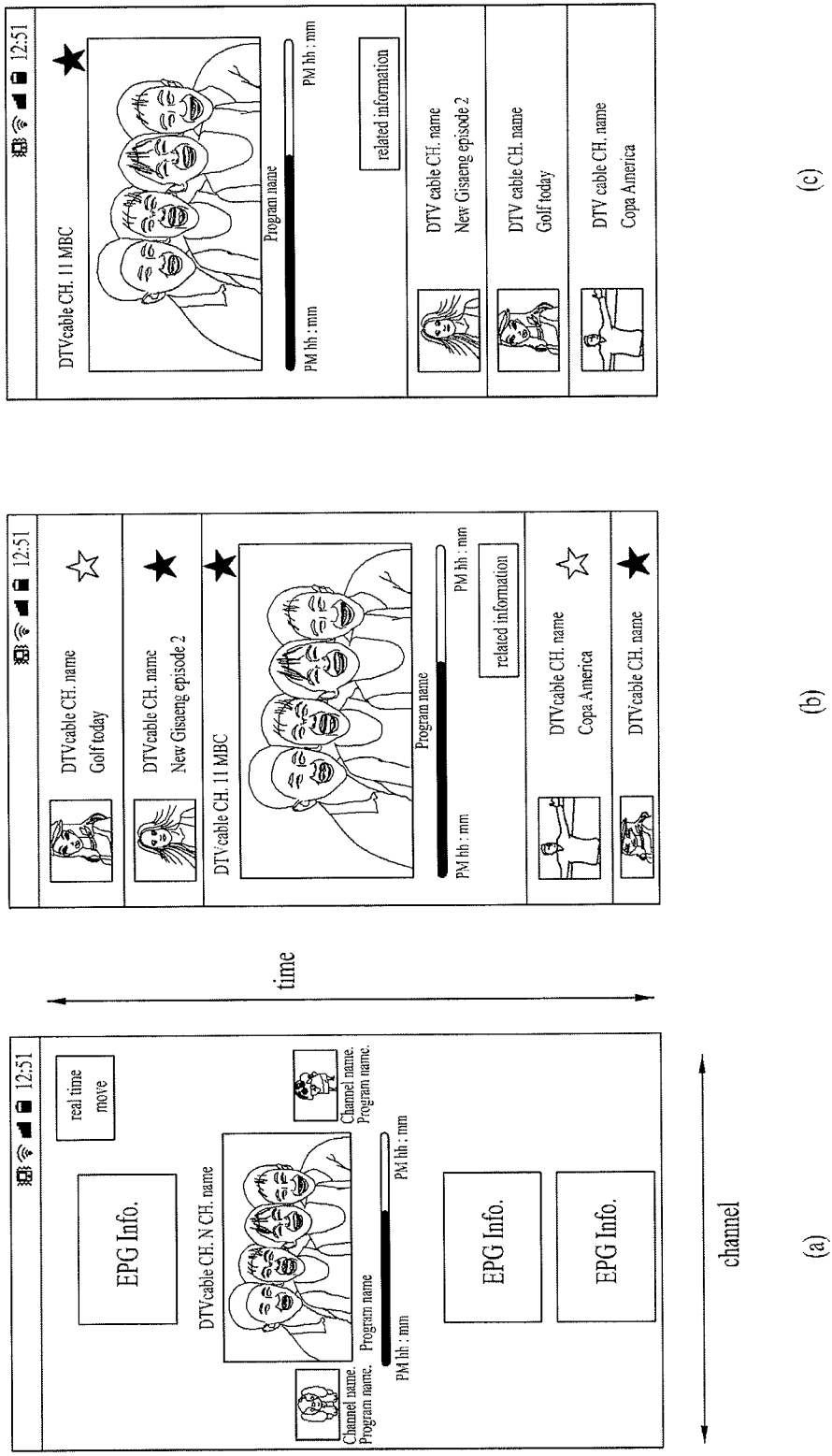

Next, FIGS. 25 to 27 are diagrams illustrating other examples for a mini TV access according to an embodiment of the present invention. Referring to FIG. 25(a), a mobile device can provide a premium menu 2510 including a media file 2520, My Apps 2530, a channel list (Channels) 2540 and the like. In this instance, each of the items configuring the premium menu 2510 may be provided in one of various formats including a layer type, a list type and the like.

A mobile device provides a first function icon 2552 and a second function icon 2556 to a first region of a screen provided with the premium menu and may provide separate optional function icons 2554 to a second region of the screen. In particular, the first function icon 2552 is provided to an audio function control for example and may be provided with keys related to an audio level, i.e., a volume adjustment and the like. Further, the second function icon 2556 relates to a video function control or a channel function control and may include keys related to channel numbers, previous channels and the like. The optional function icons 2554 may be provided with a power key and keys for controlling channels, media, directions, touches, games and the like. For instance, if the touch key is selected, a whole screen turns into a touchpad to play a role as an input means for inputting a control command and the like to a main TV and the like.

The channel list in the premium menu shown in FIG. 25(a) may include an identifier (ID) (or, a name) for identifying a channel list for example and may be provided with a preview item, a detailed program information item 2544, and a channel list item. Moreover, a function icon 2560 for changing a configuration or arrangement system of channel list items is provided to a prescribed region of the screen.

In particular, the preview item may be provided with a mini TV function icon 2542 together with a still image such as a thumbnail image or a video. Hence, it can directly activate a mini TV function from the preview item in the course of a channel list access according to an embodiment of the present invention. If the mini TV activating icon 2542 is selected from the preview item by a user, the mobile device receives a channel or content corresponding to the preview item from a corresponding device and then provides the received channel or content (FIG. 25(*b*)). In this instance, the device is non-limited by a main TV. Alternatively, the device may include one of various devices including an external input and the like. However, an indication for a corresponding input can be displayed. Further, the device may include an individual or separate content provider (CP) or IP server.

If the function icon 2560 is selected, it pops up to provide type information on various configuration or arrangement systems. If one of the type information is selected, the screen configuration shown in FIG. 25(*a*) may be changed overall.

For instance, referring to FIG. 26(*a*) and FIG. 26(*b*), when a plurality of contents are provided in horizontal direction, a screen related to a content at the screen center has a largest size and a size ratio of a screen may relatively decrease toward an edge of the screen. Referring to FIG. 26(*a*), a function icon for volume adjustment and a function icon for enabling a channel list to pop up are provided below the contents. In particular, the popup function icon can be provided at the center below the contents. Referring to FIG. 26(*b*), a channel list is enumerated in horizontal direction to provide schematic channel numbers and names.

Further, referring to FIG. 26(*a*) and FIG. 26(*b*), each channel or content list may provide a preview image 2610 together with channel or content information. In addition, time information such as a current play time, a remaining play time and the like may be displayed as a play bar below the preview image. Further, the preview image 2610 may include a still image such as a thumbnail image or a moving picture. In addition, a mini TV switching icon 2620 may be further included within the preview image 2610. Besides, FIG. 26(*a*) or FIG. 26(*b*) may show a preferred channel list (My channels) or a preferred content list.

According to an embodiment of the present invention, if the mini TV switching icon 2620 within the preview image is selected in the course of the service shown in FIG. 26(*a*) or FIG. 26(*b*), it can directly provide a mini TV switching screen shown in FIG. 25(*b*). Further, if the mini TV switching icon 2620 is not provided within the preview image, a preview image is selected and then dragged & dropped in prescribed direction, whereby the mini TV function can be entered.

Next, FIG. 27(*a*) shows one example of a screen provided with both a channel browser and EPG information. FIG. 27(*b*) and FIG. 27(*c*) show one example of a screen of a channel browser provided with a list and detailed information. The overall contents of FIG. 27 are similar to those of FIG. 25 and FIG. 26 but differ from the contents of FIG. 25 and FIG. 26 in the formats provided for the channel browser and EPG. In this instance, a user just performs a flicking operation to search or move right and left channels and EPG information of a corresponding channel in a vertical direction. Using the EPG information, it can perform such a function as recording/recording reservation and the like. Further, the channel provided at the center within the channel browser may be switched to a mini TV by dragging & dropping a mini TV switching icon or image inside in prescribed direction, as mentioned in the foregoing description with reference to FIG. 26(*a*) and FIG. 26(*b*). In addition, a function item 'real-time use' may be usable in providing a preferred function.

FIG. 27(*b*) and FIG. 27(*c*) have contents similar to each other overall but slightly differ from each other in a display format. Referring to FIG. 27(*b*), a channel provided to a center region of a screen is provided with a detailed content only but schematic information is provided to the remaining region. Referring to FIG. 27(*c*), a channel provided to a top end of a screen is provided with a detailed content only but channels in the rest of the regions below are provided with schematic information only. Further, in FIG. 27(*b*) or FIG. 27(*c*), a mini TV switching icon within a preview image or the preview image is dragged & dropped in prescribed direction, thereby entering a mini TV directly.

Further, in this specification, a time machine function is explained by taking a content (e.g., a video, a moving picture file) as an example. Moreover, the time machine function is applicable to a still image file such as an image, an audio file such as music, a text file and the like in a similar manner. In addition, a UI may be configured in a similar manner in consideration of a content attribute, a step of a user interface and the like.

Figure 28:
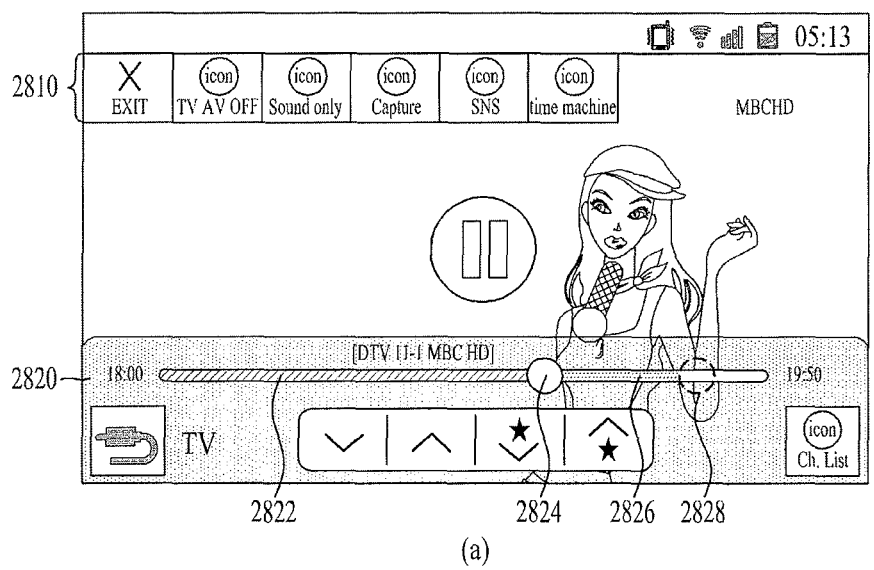
FIG. 28 and FIG. 29 are diagrams illustrating a mini TV providing method according to an embodiment of the present invention.

FIG. 28 is a diagram illustrating one example of a method of providing a time machine function in a mobile device. Referring to FIG. 28, a mobile device provides a content to a screen. The provided content may include one of mini TV functions of outputting a video received from a main TV.

In consideration of features or attributes of a mobile device, a time machine function may be activated automatically or manually in one of the following cases. A user can randomly stop a content currently played in a mobile device. The mobile device may operate as follows. First, the mobile device stops playing a content in response to a request made by a user and does not perform other operations.

Secondly, the mobile device stops playing a content after the timing point of requesting to stop a time machine function and provides a time machine UI. The latter case may be performed only if a separate time machine function request is made in accordance with setup. Alternatively, the latter case may be performed if a play stop request is made.

Further, a playback of a content in a mobile device may be abnormally stopped or ended. In this instance, the mobile device can activate a time machine function automatically or manually. In this instance, the 'abnormal' means when a screen is abnormally switched or ended in the course of watching. For instance, a time machine function may be activated in one of when a power is turned off while a content is played due to a battery shortage or the like, when a play is ended without using a separate content play stop button or that a power is forced to be turned off, a case of a reset due to other errors of a mobile device, or when a content reception is impossible or delayed due to network error or environment (e.g., deviation from a service area, etc.).

The time machine function may be provided based on such signaling information related to A/V playback as PID information, time information, frame information and GOP information of a content received via a main device or another digital device and the like. Further, a mobile device can provide a prescribed region of a screen with a UI including a size of a storage space remaining in a storage medium, data of a time machine function available time in accordance with the size of the storage space and the like while storing a content in accordance with a time machine function activation.

In association with a time machine function execution, a mobile device can receive and store signaling information on a content only for a part after a time machine request. In this instance, the mobile device provides a user with information based on each signaling information, creates a control signal for a content selected based on the provided information, transmits the created control signal to a main device, receives the corresponding content from the main device in a previous manner, and then provides the received content to the user.

Due to a limited storage capacity, storage/play time/speed and the like, a mobile device transmits a control signal to a main device. The mobile device performs a time machine function on a UI only. As a time machine function of the main device is actually activated, a content can be saved in a corresponding storage medium. In this instance, the mobile device creates and transmits a control signal in response to a play request made by a user, receives a corresponding video from the main device, and then provides the received video.

In the above description, if the storage space of the mobile or main device becomes in short due to the time machine function execution, it can use an external storage space (e.g., an external hard disc, an IP server, a USB device, a PMP, a PSP, an X-BOX, a cloud server, etc.). Alternatively, it can secure a storage space is secured by deleting an oldest storage capacity. Alternatively, it can secure a storage space in a manner that a later part is not saved.

Further, when the storage space is insufficient, as mentioned in the above description, it can reduce a storage capacity itself by deleting an advertisement part and the like randomly or in accordance with settings despite a part saved in a time machine process. In addition, it can provide various kinds of UIs for convenience of identification for the storage space.

When a storage space allocated for a time machine function and a storage space allocated for recording/recording reservation differ from each other in location or address, a recording/recording reservation mode is entered in the course of performing the time machine function and a content may be then saved in the storage space allocated for the recording/recording reservation.

A mobile device can randomly change settings when activating a mini TV or a time machine despite user's settings for the related function. For instance, even if a user sets a screen of a mobile device to be turned off in the absence of any touch in a first time, it can automatically control the screen to stay on after expiration of the first time in the course of activation of the mini TV or the time machine function. In particular, attributes of functions related to each other can be randomly changed and serviced in accordance with the attributes of the respective functions.

On the contrary, if the time machine function is activated, the mobile device can randomly set or service the screen to be turned off for saving the battery and the like despite the settings even if the first time does not expire. In this instance, the above service may be provided only if a remaining level of the battery is within a prescribed range.

In consideration of at least one of a remaining battery level and a storage capacity of the mobile device and/or the main device at the play stop or end request timing point, a mobile device may not activate a time machine function automatically. In this instance, a UI for indicating that the time machine function will not be automatically activated is provided to encourage user's convenience. This may identically apply to when a user makes a separate request for a time machine function.

Thus, it can solve the problems and/or inconveniences due to a limited size of a storage capacity of a mobile device and the like. If a user touches or taps to select an any region of a screen to which a currently played content is being provided, referring to FIG. 28, a mobile device can provide various UIs (or panels) 2810 and 2820.

In addition, each of the panels 2810 and 2820 may be provided or disappear individually in response to a touch to a corresponding region or the like. In particular, while a content is played, an icon 2815 indicating a pause and/or stop is provided to a center of a screen in accordance with a play state of the content. For a pause state, an icon indicating a play and/or stop may be provided. In this instance, a corresponding function may be activated in accordance with an access to the icon.

The control panel 2820 is provided to a bottom end of the screen. In particular, in association with a time machine, a UI for various identification information corresponding to the icon access can be configured and provided to a play bar. For instance, referring to FIG. 28, a mobile device can provide a play bar within a control panel with a first icon 2824 indicating a play stopped point at a play stop icon selected point and a second icon 2828 indicating a play point at current hour after the play stopped point when activating a time machine function together with a selection of the play stop icon.

Further, the play bar provides a start hour and an end hour of a content using a horizontal rod shape. On the play bar, a rod 2822 ranging from the start hour to the first icon 2824 is colorized, highlighted or focuses to indicate that the content has been played up to the corresponding part. This may be implemented by being discriminated from another rod 2826 ranging from the first icon 2824 to the play end hour.

Further, as the time machine function is provided, if the second icon 2828 is created, the rod 2826 between the first icon 2824 and the second icon 2828 may be preferably provided by being discriminated from the rod 2826 ranging from the second icon 2828 to the end hour as well as the rod 2822 between the start hour and the first icon 2824. For instance, the respective rods are differentiated from one another in color to be easily perceived by a user. In another instance, the respective rods are differentiated from one another in type, level and size of focusing/highlight and the like.

Assuming that the rod moves from left to right in accordance with a flow of time, the above-mentioned second icon indicates that a playback is being performed on a prescribed level in accordance with a time machine function activation. In this instance, the second icon is not a final point until the end of the time machine function.

Hence, the second icon can be differentiated from the first icon 2824 in shape, color, size and the like. Even if the time machine function is ended, a user can select a play point at a current time instead of a time machine part (i.e., a section between a time machine start and a time machine end).

In this instance, the mobile device configures a third icon within the play bar to cover a section between the second icon 2828 and an end hour. In particular, the third icon may be configured identical to the first icon 2824 for example. Therefore, the above configuration enables a user to recognize that a time machine function is applied to a content despite that the user did not select a time machine function applied part. In addition, the above configuration provides the user with convenience in playback and the like thereafter.

Further, a time machine function may be activated for a single content several times as well as one time. In this instance, icons are appropriately configured to provide a user with convenience in selection. When a plurality of time machine icons are configured and provided in accordance with several activations, a plurality of the time machine icons are provided by being discriminated from one another. Alternatively, a plurality of the time machine icons may be provided by being configured identical to one another for the purpose of time machine function identification.

A mobile device can provide various related functions such as a bookmark function and the like together with the above time machine icons. When there is an incoming call while a content is being played via a mobile device, as shown in FIG. 29(a), the mobile device immediately stops playing the content, activates a time machine function, and provides a UI for a cell reception. Alternatively, the mobile device provides a content played screen with a UI indicating that there is the incoming call and then switches the screen, as shown in FIG. 29(b), in response to a selection made by the user.

In the latter case, if the screen is switched in response to the selection made by the user, as shown in FIG. 29(b), the played content is paused and the time machine function may be activated. Alternatively, in the latter case, a video call or a call connected state is displayed on a prescribed region of a content provided screen, the content continues to be played, and audio is eliminated only. Therefore, it can control a phone call to be enabled while the user enjoys the video.

Figure 30:
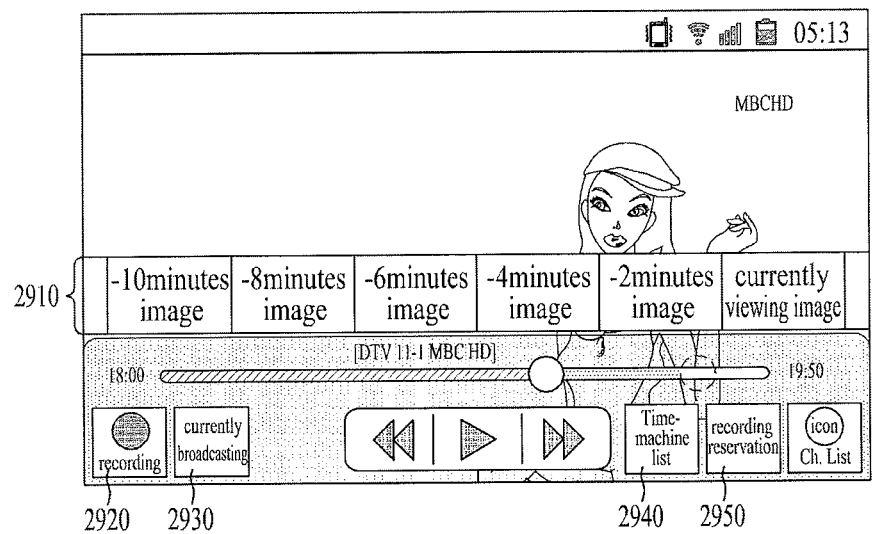
FIG. 30 is a diagram of a UI.

If the call is ended, the screen shown in FIG. 28 or FIG. 30 is provided to control operations after the time machine function. Further, if a message, a mail, an information update or the like occurs in the course of playing a content in a mobile device, the above description may be similarly applicable to a corresponding service.

After a user has made a request for a time machine function activation, if the user makes a request for deactivating the time machine function or intends to preview the content attributed to the time machine function activation up to now before the end, the mobile device can provide a UI shown in FIG. 30. FIG. 30 is a diagram of a UI.

Referring to FIG. 30, a list 3010 of video screens saved in accordance with time machine function application by a prescribed time unit is provided to a prescribed region except the aforementioned control panel 2820. For instance, referring to FIG. 30, the video screens are provided as a list from an initial time machine function start point by 2-minute unit from a current video. In this instance, each list can provide a thumbnail image and may include related information as well.

Referring to FIG. 30, unlike FIG. 28, a recording button 3020, a current broadcast button 3030, a time machine list button 3040, recording reservation button 3050, a channel list and the like may be provided to the control panel if paged. In particular, for example, if a user intends not to check a time-machined content due to a long time machine time, a considerable amount of a stored content, or an insufficient time, the recording button 3020 is provided to switch a time machine function to a recording function. If the recording button 3020 is selected, a current screen may be switched to EPG screen. This can be done by the recording reservation button 3050 as well.

The current broadcast button 3030 is provided to switch to a currently broadcasted screen together with a time machine end. The time machine list button 3040 can page a corresponding content or a whole time machine list including the corresponding content. The recording reservation button 3050 pages EPG, provides a series, retransmission button and rebroadcast channel of a corresponding content, information on the corresponding content and/or a related UI as well as the above-mentioned functions.

Referring to FIG. 30, thumbnail images of previous times in accordance with a set time reference by starting with a thumbnail image of a video currently played on a screen are extracted with reference to the set time reference and are then provided to the screen. In this instance, the mobile device may provide a thumbnail image in accordance with the settings or may provide detailed information on a content currently saved after the time machine function activation only.

Unlike the UT shown in FIG. 30, a UI may be configured by a frame unit in order to facilitate a saved content to be viewed in accordance with time machine function activation or to be edited like an editing after moving picture photographing. In this instance, a frame selected by a user may be enlarged and provided to a prescribed region (e.g., a region right below or above a corresponding frame within UI, a whole screen provided region, etc.).

Based on a separate editing button or a selection or action requested for editing, a selected frame may be deleted, moved, copied, or cut. Further, in FIGS. 28 to 30, if a region to which a UI is not provided is selected by a touch or the like, previously provided UIs may be deleted from the screen entirely or in part.

Figure 29:
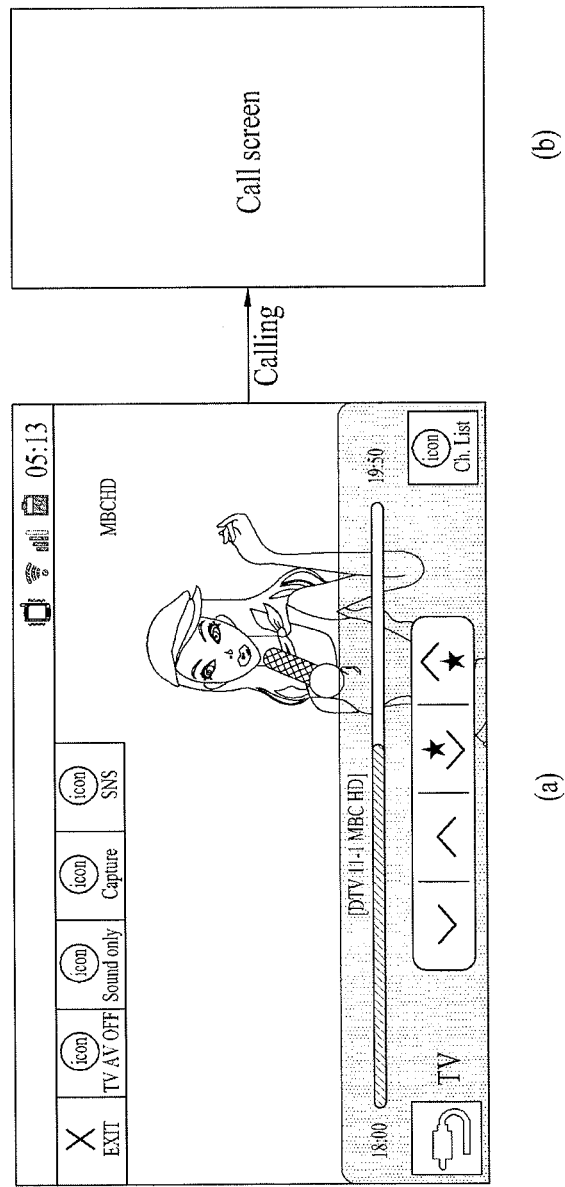

If the UI shown in FIG. 30 has difficulty in being provided to a single screen due to a size of the screen, the mobile device can configure the UT to enable a user to check a desired content by moving the UI by flicking or the like. The UIs provided in FIGS. 28 to 30 are the embodiments configured for the description of the present invention for clarity, by which the scope of the appended claims and their equivalents is non-limited.

Figure 31:
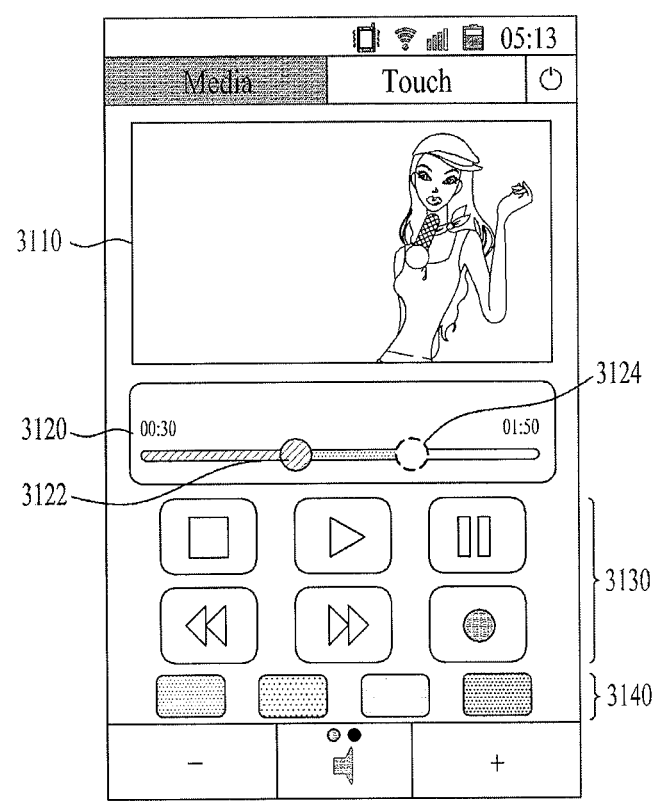
FIG. 31 is a diagram of a mobile device.

Further, regarding a time machine function, a mobile device may configure and provide a UI shown in FIG. 31 unlike the former UI shown in FIG. 28 or FIG. 30. This UI configuration allows a user to perceive a time machine function more visually, i.e., intuitively. According to the above UI configuration, if a time machine function is activated, since a play of a content is stopped, it may be unable to provide an image for a video to a whole screen. Instead, if a UI for user's control convenience is provided in the course of a time machine function activation or at an end timing point of the time machine function, it can enhance user's convenience.

FIG. 31 is a diagram of a mobile device. Referring to FIG. 31, in association with a time machine function, a mobile device can provide an identifier for identifying a mode or type of a screen, a content screen (when outputting a still image), a play bar, a play control icon, a function icon, an audio control icon and the like. In particular, the play bar may be implemented into the former play bar described with reference to FIGS. 28 to 30.

In addition, the play control icon may include an icon for stop, an icon for play, an icon for pause, an icon for fast rewind, an icon for fast forward wind, an icon for recording control and the like. In particular, the function icon may include an icon for moving to a current broadcast screen, a recording list request icon, a recording reservation screen paging icon, a channel list providing icon and the like.

Further, the recording list request icon or the channel list providing icon may provide a list other than a played content. If the recording reservation screen paging icon is selected, EPG may be paged and provided. However, an initially provided EPG screen may be provided by being configured with reference to a corresponding content or a channel of the corresponding content for example.

If the channel list providing icon is selected, a channel video list may be paged. If a video is unseen, a channel number and a program title may be displayed. In addition, a time machine function may be duplicatively performed on currently broadcasted channels. In another instance, digital devices according to an embodiment of the present invention can perform a mini TV function using sensing information. In this instance, the sensing information may be received from at least one of a main device and a mobile device. In particular, the sensing information may be generated from at least one of a camera sensor, a weight sensor, a gyro sensor, a gravity sensor, a location sensor, a contact sensor and the like, which are provided to each of the devices. Therefore, each of the digital devices further includes a sensor and a sensing circuit in accordance with the above-mentioned configuration. Subsequently, a control unit processes the sensing information and can then transmit a control signal to a corresponding configuration or another device.

For instance, assume that a camera sensor is provided to a mobile device and that the mobile device is activating a mini TV function by being paired with a main device. The camera sensor can obtain sensing information on an object consecutively or by prescribed periods in the course of the mini TV function activation. While a user activates a mini TV function via a mobile device, if a prescribed interruption occurs, it may be to control the active mini TV function. In this instance, the interruption may include a case of activating such a mobile dedicated function as a phone call function and the like, when a user is temporarily doing something else instead of watching a mini TV, or the like.

When the interruption includes such a mobile dedicated function as a phone call function, the mobile device may control the active mini TV to be stopped or time-shifted immediately. If the interruption includes the case that a user is doing something else, considerable attention should be paid to stopping or time-shifting the mini TV. Since the mobile device has difficulty in obtaining user's intension precisely, if a control differing from the user's intention is performed, it may cause inconvenience to the user. To this end, the present invention intends to use sensing information.

If sensing information is obtained from a camera sensor by 3-second periods, a control unit can determine user's intention using the sensing information. For instance, if an object recognized from the obtained sensing information keeps being recognized, the control unit controls a mini TV function keeps being activated. However, if an object different from a previously recognized object is recognized, the control unit can create a control signal by further referring to at least one sensing information consecutively received rather than to stop activating the mini TV function.

If a different object is recognized from at least two sensing information received thereafter, the control unit can control the mini TV function to stop being activated from the corresponding timing point. In this instance, a previously recognized object means one object that is not a vacant space at least. An object different from the previously recognized object includes one object or a vacant space having no object exist therein. On the other hand, if the control unit has difficulty in identifying an object from received sensing information, the control unit may adjust a camera angle or process the object into a non-existing object.

When the control unit receives sensing information by prescribed periods, if an object different from a previously recognized object is recognized from the sensing information for faster and more accurate control, the control unit may set a camera sensing period to differ from a previously set camera sensing period, obtain consecutive sensing information, and use the obtained sensing information for a control. The control unit may adjust a sensing angle of a camera sensor together with or separately from the sensing period, obtain sensing information at a different angle, and use the obtained sensing information for the control.

Further, the control unit may control a pause or time shift function to be activated in accordance with a live broadcast, a previously saved broadcast or a different content, i.e., a content type. Before the pause or time shift function is activated, the control unit may configure a corresponding UI, provide a user with the configured UI, and activate the corresponding function in accordance with a selection made by the user.

A case of using a contact sensor as a substitute for a camera sensor is described, for example, as follows. This case is overall similar to the above-mentioned case of using the camera sensor but slightly differs in a reference for determination. Hence, the aforementioned duplicative description is omitted from the following description and different matters shall be mainly described in the following description.

First of all, a control unit obtains sensing information from a contact sensor or a heat sensor continuously or by prescribed periods. In this instance, the contact sensor is provided to determine whether a user is handling a mobile device in direct. In addition, the contact sensor may be provided to lateral and/or rear side of the mobile device. When a mini TV function is activated via a mobile device, the contact sensor is used because a user generally holds the mobile device in his hand(s) in order to facilitate the mobile device to be handled rather than to fix the mobile device to a prescribed position. So to speak, if a mobile device is not handled in user's hand(s), it may be highly possible for the user not to use a mini TV function on account of the experience in using the mobile device.

Therefore, the control unit extracts user's contact information and/or heat information from the continuously received sensing information obtained from the contact sensor and/or the heat sensor and then determines whether the user is watching the mini TV function. In this instance, regarding the heat information, a reference value may be set by considering the temperature generated from the mobile device and a prescribed temperature range added to a temperature of hand with reference to human body temperature at least. When the heat information is used, only if the temperature given by the heat information is lower than the reference value, the control unit determines that the user is not watching the mini TV function and then controls the pause or time shift function to be activated in accordance with the content type.

The control unit may consider both of the sensing information of the camera sensor and the sensing information of the contact sensor and/or the heat sensor. The control unit prioritizes the sensing information of the camera sensor and the sensing information of the contact sensor and/or the heat sensor by giving higher priority to the camera sensing information. If an object different from a previously sensed object is sensed based on the camera sensing information, the control unit obtains the sensing information of the contact sensor and/or the heat sensor and then uses the obtained sensing information for the control. Alternatively, sensing information may be obtained in a manner that the sensing periods of the respective sensors are set equal to each other or set not to overlap with each other. This may identically apply to a gyro sensor. If a user uses a mini TV via a mobile device, the user may watch the mini TV in the course of moving in general. Hence, if error of the sensing information input via the gyro sensor is equal to or smaller than a reference value, the control unit may determine that the user is doing something else without holding the mobile device in his hand.

For the time shift, the control unit performs a time shift function within a surplus space only in consideration of capacity of a built-in storage unit of a mobile device. If there is no surplus space, the control unit makes a request for a time shift to a main TV or stops the time shift function not to further play a corresponding content. In the latter case, if data in a previously saved space has a low priority or is not significant, the data is deleted to secure a storage space. In continuation with the above description, the control unit can secure a space using a web server like a cloud server or may secure a sufficient storage space using a cloud server from the beginning.

Further, when a prescribed channel or a content of a broadcast serial is controlled to be continually played back, the control unit controls the corresponding content of the corresponding channel or the corresponding installment in the above manner only and may stop playing the rest of the content or installments.

Moreover, the control unit determines user's intension further using sensing information received via a plurality of sensors provided to the mobile device in addition to the above-described sensors and can then use the determination for a corresponding control.

Further, sensing information may be provided to a main device as well as a mobile device. In this instance, the main device can perform a control function in a manner almost equal to that of the aforementioned method of using the sensing information in the mobile device. Further, even if a mini TV function is used via a mobile device, a control unit of the mobile device can refer to the sensing information of the main device as well. For instance, since the main device generally includes components (e.g., an image processor, etc.) functionally better than those of the mobile device, the mobile device receives the sensing information obtained by the main device and then uses the received sensing information for the control.

Besides, if each sensing information is set to be activated/deactivated on a prescribed region of a screen in case of mini TV function activation, it can prevent such inconvenience as a control that deviates from user's intention. In addition, it can provide UI information to enable a user to set a reference value randomly for a factor of sensing information that affects a control operation of a control unit.

Figure 32:
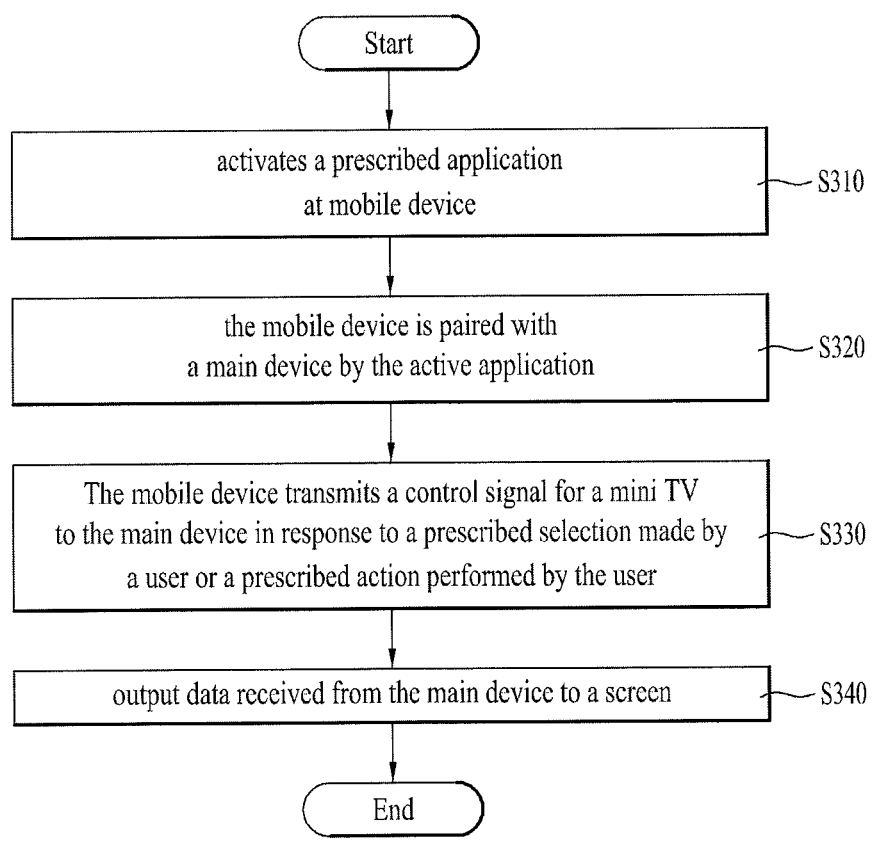
FIG. 32 and FIG. 33 are flowcharts illustrating a mini TV providing method according to an embodiment of the present invention.
Figure 33:
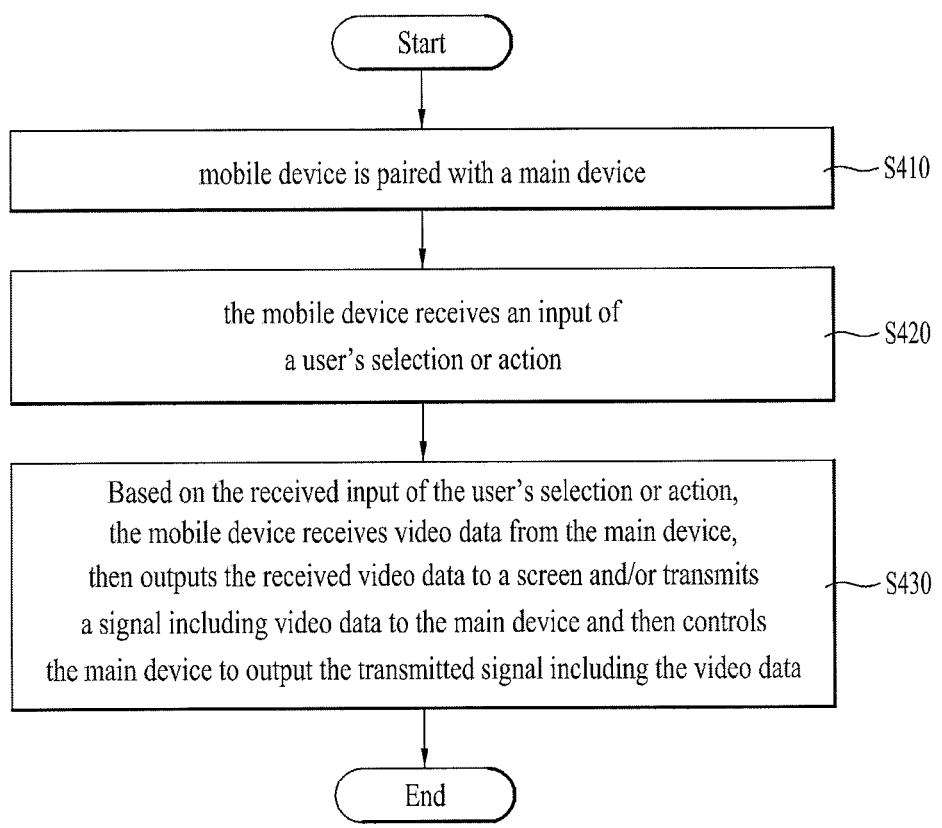

FIG. 32 and FIG. 33 are flowcharts for a mini TV providing method according to an embodiment of the present invention. Referring to FIG. 32, in a method of processing a mini TV service according to one embodiment of the present invention, if a mobile device activates a prescribed application (S310), the mobile device is paired with a main device by the active application (S320).

The mobile device transmits a control signal for a mini TV to the main device in response to a prescribed selection made by a user or a prescribed action performed by the user (S330) and then output data received from the main device to a screen (S340). In addition, the mini TV service processing method according to an embodiment of the present invention may further include at least one of the steps of receiving a signal for an output change from the main device, determining whether to switch an output video based on the output change signal received from the main device, and controlling an output of the main device by creating a signal for an output video change of the mobile device and then transmitting the created signal to the main device.

Referring to FIG. 33, in a method of processing a mini TV service according to another embodiment of the present invention, a mobile device is paired with a main device (S410). After the pairing step S410, the mobile device receives an input of a user's selection or action (S420). Based on the received input of the user's selection or action, the mobile device receives video data from the main device and then outputs the received video data to a screen (S430). The mobile device also transmits a signal including video data to the main device and then controls the main device to output the transmitted signal including the video data (S430).

In addition, the mini TV service processing method according to an embodiment of the present invention may further include at least one of the steps of activating a prescribed application in the mobile device, receiving a signal for an output change from the main device, determining whether to switch an output video based on the output change signal received from the main device, and controlling an output of the main device by creating a signal for an output video change of the mobile device and then transmitting the created signal to the main device.

In this instance, the prescribed application may include a remote application. The mini TV may include one of hardware provided to the mobile device, an application activated in the mobile device, a function activated in the mobile device, and software activated in the mobile device. The mini TV receives output video data of the main device and/or output video data of a different device paired with the main device and then outputs the received output video data to the mobile device. Alternatively, the mini TV controls an output of the main device or an output of the different device paired with the main device to be adjusted, changed, or adjusted.

The above-mentioned prescribed selection may be made via an icon for an activation of the mini TV, which is provided by each depth or step in a UI provided by the mobile device. The above-mentioned prescribed action may include at least one of a quick rapid movement or shaking toward the main device, a drag & drop operation of a prescribed item in the UI provided by the mobile device in prescribed direction, and a drag or flicking in prescribed direction by touching a prescribed region within the screen of the mobile device. In addition, the prescribed action may include at least one of a capture of a screen of the main device by the mobile device and a drag & drop operation of image data output to the mobile device onto a prescribed region.

Further, the above-mentioned mini TV may be provided as a landscape or portrait screen in accordance with attributes of a screen configuration. In particular, the landscape or portrait screen may be provided on the basis of current inclination information of the mobile device. Alternatively, the landscape screen and the portrait screen may be provided by being switched to each other in accordance with current inclination information of the mobile device. Alternatively, the landscape or portrait screen may be provided as a default. For clarity, the above descriptions relate to the examples of providing a landscape screen as a default due to the property of a broadcast screen.

Figure 34:
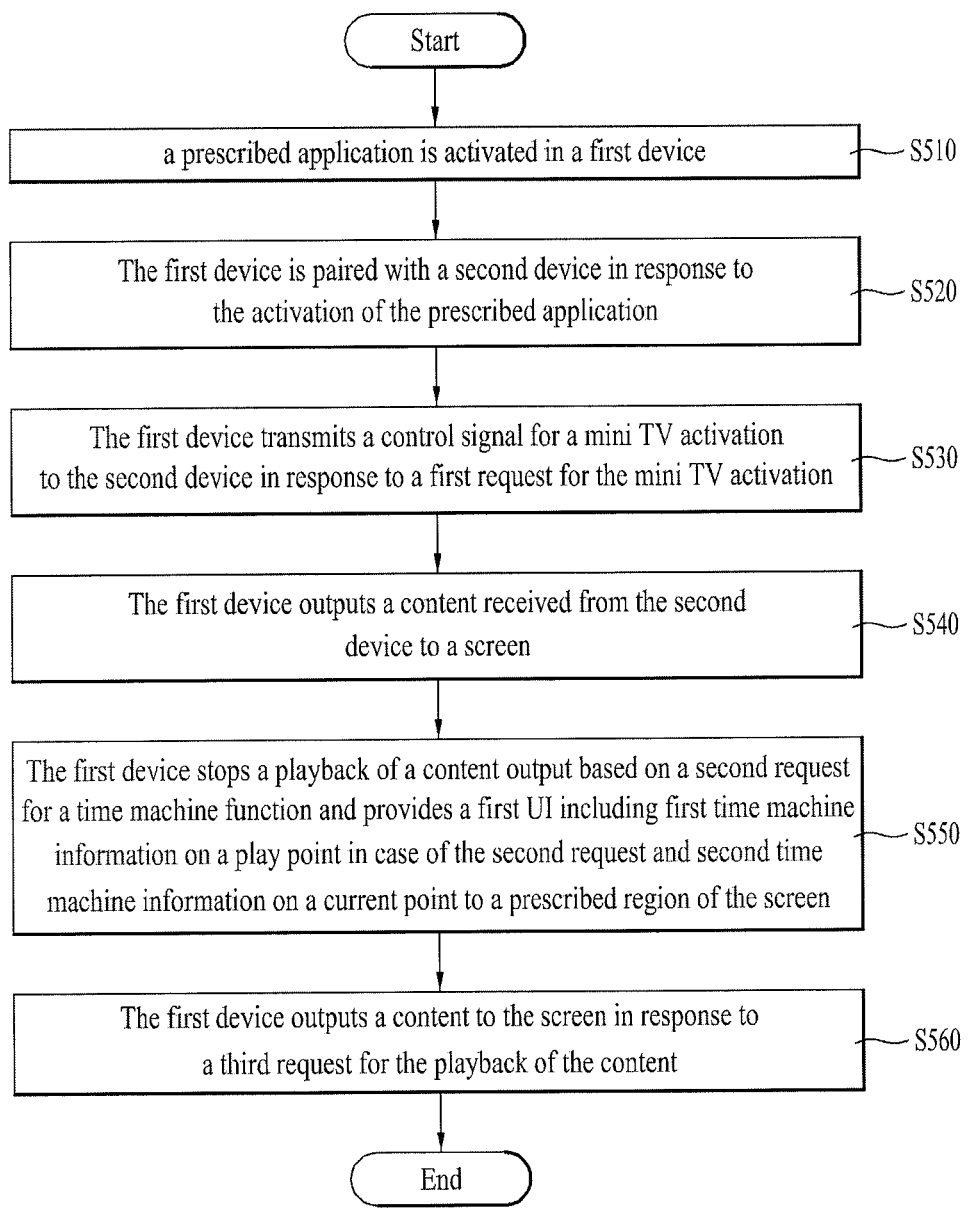
FIG. 34 and FIG. 35 are flowcharts illustrating a method of providing a time machine function in a mobile device.
Figure 35:
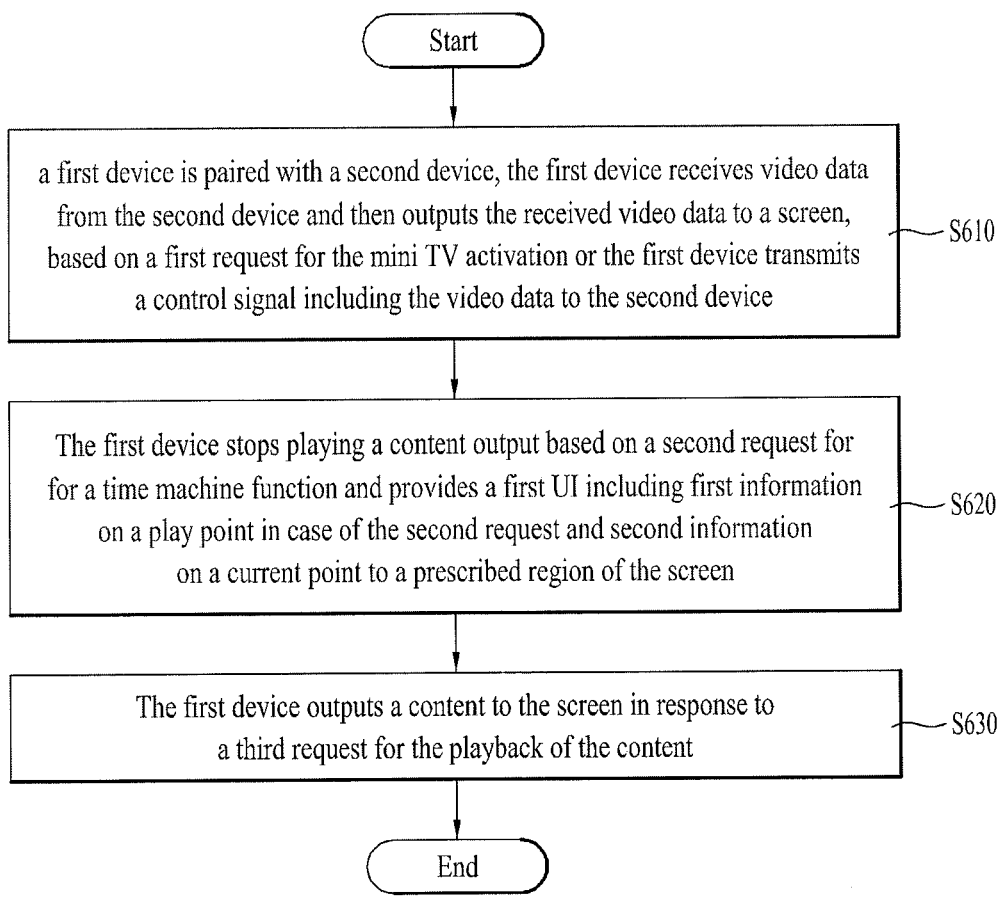
Figure 36:
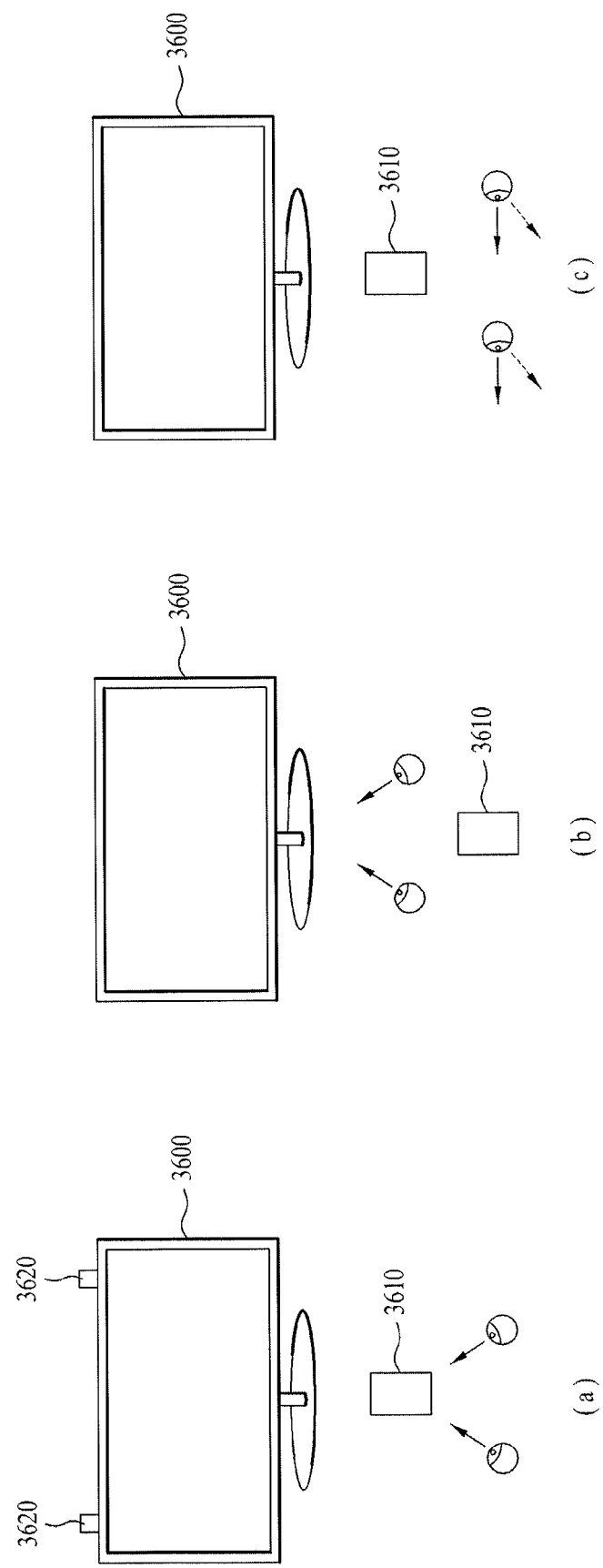
FIGS. 36(a), (b) and (c) illustrates an overview of a mobile terminal interfacing with a display device according to an embodiment of the present invention.

FIG. 34 and FIG. 35 are flowcharts for a method of providing a time machine function in a mobile device. Referring to FIG. 34, in a method of processing a mini TV service according to one embodiment of the present invention, a prescribed application is activated in a first device (S510).

The first device is paired with a second device in response to the activation of the prescribed application (S520). The first device transmits a control signal for a mini TV activation to the second device in response to a first request for the mini TV activation (S530).

The first device outputs a content received from the second device to a screen (S540), and the first device stops a playback of a content output based on a second request for a time machine function and provides a first UI including first time machine information on a play point in case of the second request and second time machine information on a current point to a prescribed region of the screen (S550).

Thereafter, the first device outputs a content to the screen in response to a third request for the playback of the content (S560). In particular, the first UI may include a play bar. The first time machine information and the second time machine information are displayed in the first UI by being discriminated from each other. For instance, the first time machine information and the second time machine information are configured to differ from each other in color and/or size. For another instance, the first time machine information and the second time machine information may be discriminatively displayed in a manner that the second time machine information includes at least one of highlight, focusing, thumbnail image and visual indicator, which are not included in the first time machine information.

In particular, the first request is made via an icon for the mini TV activation, which is provided by each step in the UI provided by the first device. Alternatively, the first request may be made via at least one of a quick rapid movement or shaking toward the second service, a drag & drop operation of a prescribed item in the UI provided by the first device in prescribe direction, a drag or flicking in prescribed direction by touching a prescribed region in the screen of the first device, a capture of a screen of the second device by the first device, and a drag & drop operation of image data output to the first device onto a prescribed region.

In particular, the second request is made via a phone call to the first device or an icon for the time machine activation, which is provided by each step in the UI provided by the first device. Alternatively, the second request may be made via at least one of an action of shaking the first device in prescribed direction, a touch & drag of a prescribed region in the screen of the first device in prescribed direction, a flicking of a prescribed region, and a drag & drop operation to a prescribed region.

Optionally, the above-mentioned service processing method may further include at least one of the steps of outputting a second UI for a playback control of a content output to the screen in response to the third request, receiving a signal for an output change from the second device, determining whether to switch an output video based on the received signal for the output change of the second device, and controlling an output of the second device by creating a signal for an output vide change of the first device and then transmitting the created signal to the second device.

Besides, the first device may include a mobile device, the second device may include a digital broadcast receiver, and the prescribed application may include a remote application.

Referring to FIG. 35, in a method of processing a mini TV service according to another embodiment of the present invention, a first device is paired with a second device. The first device receives video data from the second device and then outputs the received video data to a screen, based on a first request for the mini TV activation. Alternatively, the first device transmits a control signal including the video data to the second device (S610).

The first device stops playing a content output based on a second request for a time machine function and provides a first UI including first information on a play point in case of the second request and second information on a current point to a prescribed region of the screen (S620). Thereafter, the first device outputs a content to the screen in response to a third request for the playback of the content (S630).

In addition, FIGS. 36-46 illustrate an alternative embodiment of the present invention. In this embodiment, a display device interfaces with a mobile terminal and the display device and mobile terminal are controlled based on an eye movement and/or a grip pattern of a user.

In more detail, FIGS. 36(a)-(c) illustrate a display device 3600 interfacing with a mobile terminal 3610. In particular, FIG. 36(a) illustrates the display device 3600 including camera units 3620 that are able to capture and view an eye movement of a user using the mobile terminal 3610. In FIG. 36(a), the user's eyes are viewing the mobile terminal 3610.

FIG. 36(b) illustrates the user's eyes facing the display device 3600. FIG. 36(c) illustrates the user's eyes looking away from the mobile terminal 3610 as well as the display device 3600.

According to an embodiment of the present invention, the display device 3600 performs different functions based on the user's eye movement. These features will be described in more detail with respect to FIG. 37. In addition, it is respectfully noted the display device 3600 in FIG. 36(a) includes two camera units 3620. This is just an example and any number of camera units may be disposed around the display 3600 in order to sufficiently capture the eye movement of the user holding the mobile terminal 3610. In more detail, the camera unit 3620 can include a face recognition process for recognizing facial expressions of the user, and then the controller of the display device 3600 can determine the eye movement of the user by analyzing the facial expressions of the user. In an alternative embodiment, the mobile terminal 3610 can use the camera included on the mobile terminal 3610 to capture the facial expressions of the user, and then transmit this information to the display 3600. That is, the mobile terminal 3610 already includes a camera and thus the camera can be used to determine the eye movement of the user using the mobile terminal 3610. For example, the camera unit of the mobile terminal 3610 or the camera units 3620 of the display device 3600 can tell whether the user's eyes are looking at the mobile terminal 3610, looking at the display device 3600 or looking away from both the mobile terminal 3610 and the display device 3600 (as shown in FIGS. 36(a)-(c)).

Based on the different eye movements of the user, the streaming operating of the display device 3600 is controlled to provide an enhanced service to the user and to save power and energy.

Figure 37:
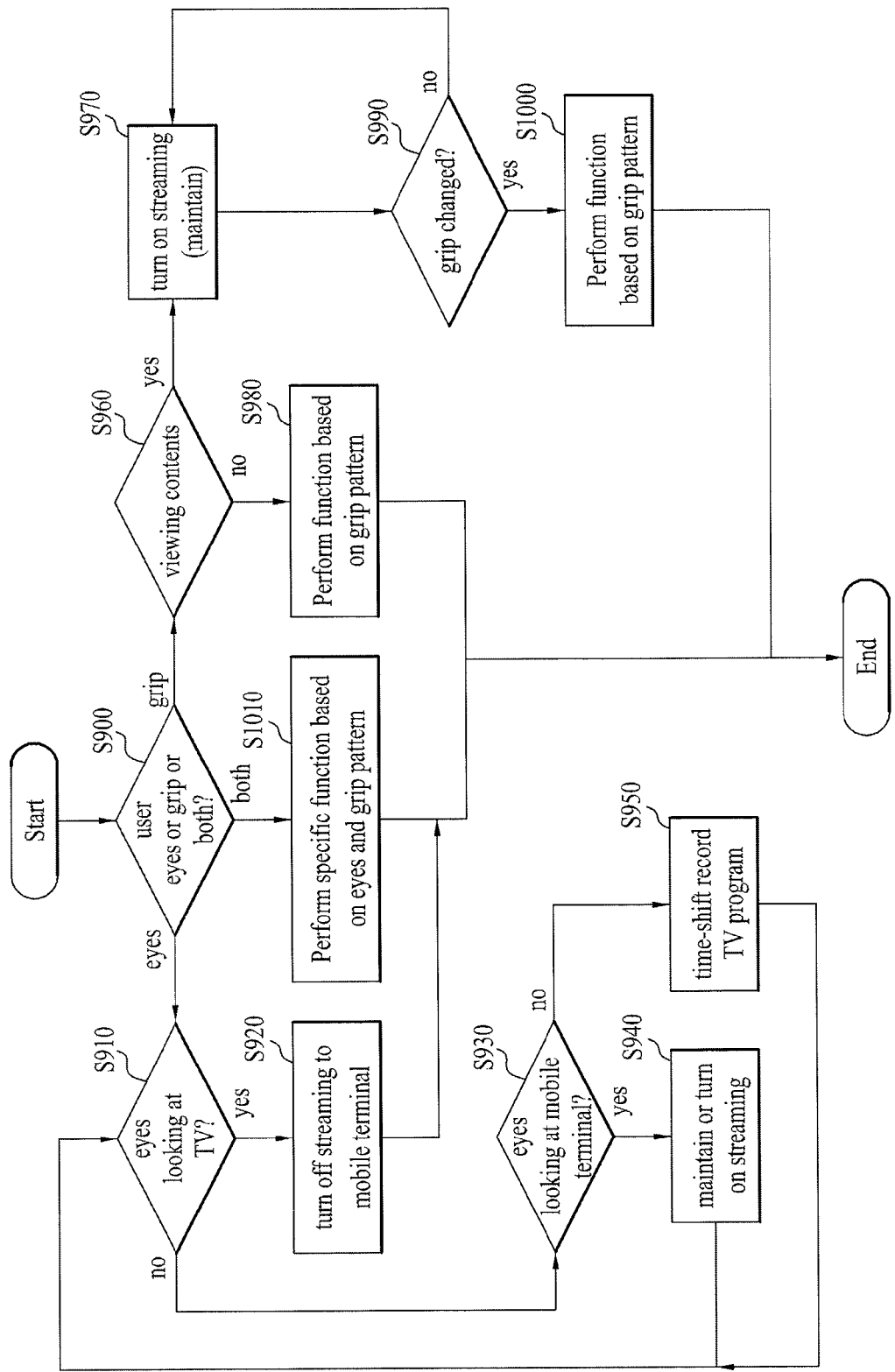
FIG. 37 a flow chart illustrating a method of controlling a display device and mobile terminal according to an embodiment of the present invention.

Turning next to FIG. 37, which is flow chart illustrating a method of controlling the display device 3600 and mobile terminal 3610 according to an embodiment of the present invention. The operations performed in FIG. 37 can be performed by the control unit of the display device 3600 or in an alternative embodiment controlled by the control unit of the mobile unit 3610. Thus, the control units of the display device 3600 and the mobile terminal 3610 can cooperate with each other in order to provide commands between each device.

As shown in FIG. 37, the control unit of the display device 3600 determines whether the control operation is to be based on the user's eye movements, the user's grip pattern on the mobile terminal 3610 or both (S900). This feature can be set by the manufacturer of the display device, mobile terminal or can be set by the user. For example, the user may set the display device 3600 or mobile terminal 3610 to perform the control method using only the eye movement of the user, using only the grip pattern of the user or using both the eye movement and grip pattern of the user.

If the user's eye movement is set as the control method, the controller determines whether the user's eyes are looking at the display device 3600 (S910) (this is shown in FIG. 36(b)). If the user's eyes are looking at the display device 3600 (yes in S910), the control unit turns off the streaming of the video contents displayed on the display device 3600 to the mobile terminal 3610. That is, as discussed above, the user can view contents on their mobile terminal 3610 that are displayed on the display device 3600. Thus, if the user was watching a program on the display device 3600 and had to leave the room in order to go to the kitchen or bathroom, for example, the user can have the contents currently being displayed on the display device 3600 displayed on the mobile terminal 3610. Thus, the user can view the streamed contents on their mobile 3610 while they leave the room including the display device 3600.

In step S910, the control unit determines whether the user's eyes are looking at the TV. If they are looking at the TV (yes in S910), the control unit of the display device 3600 automatically stops streaming the data that was being streamed to the mobile terminal 3610, because the user is not looking at the mobile terminal, but rather has moved their eye pattern to look at the display device. Thus, the battery power of the mobile terminal 3610 is saved and any extra streaming charges are avoided.

On the contrary, if the user's eyes are not looking at the TV (no in S910), the control unit determines whether the eyes of the user are looking at the mobile terminal 3610 (S930) (as in FIG. 36(a)) or looking away from both the mobile terminal 3610 and the display device 3600 (as shown in FIG. 36(c)). If the user's eyes are looking at the mobile terminal (yes in S930), the control unit maintains the streaming operating between the display device 3600 and 3610 or if the streaming operation has not started, starts the streaming operation (S940). In more detail, if the control unit determines the user's eyes are looking at the mobile terminal 3610, the control unit can advantageously determine that the streaming operation should continue or should start because the user's eyes are looking at the mobile terminal 3610 and are not looking at the display device 3600.

Alternatively, if the user's eyes are not looking at the mobile terminal and are not looking at the TV (no in S910 and no in S930), the control unit of the display device 3600 automatically starts a time-shift record process in which the contents displayed on the display device 3600 are recorded (S950). Thus, if the user was interrupted while watching the display device 3600 and had to turn around to welcome a guest entering their home, or for any other reason, the display device 3600 automatically records the data being displayed on the display device 3600. Thus, the user can easily go back to viewing the contents that they missed when they were distracted from viewing the program. Thus, according to the present embodiment, the user can easily watch a video program on the display device 3600, on the mobile terminal 3610 or view recorded contents without requiring any particular input operations, because the display device analyzes and determines their eye movement and then advantageously controls the display device 3600 and the mobile terminal 3610.

The right side of FIG. 37 illustrates the user's grip pattern on their mobile terminal being used to perform different functions. In particular, the user tends to grip their mobile terminal using the same grip patterns for each of the different functions. For example, the user has a first grip pattern when making a phone call, a second grip pattern when viewing a video file, a third grip pattern when texting, a fourth grip pattern when searching the Internet, a fifth grip pattern when taking a picture, etc. Thus, based on the different grip patterns, the control unit of the mobile terminal 3610 or the display device 3600 can perform specific operations. FIGS. 39-46 illustrate different grip patterns corresponding to different functions executed on the mobile terminal (these Figures will be described in more detail later). Thus, returning to FIG. 37, the control unit determines whether the grip pattern corresponds to the user viewing contents (S960). If the user is viewing contents (yes in S960), the control unit either maintains the streaming operation between the display device 3600 and the mobile terminal 3610 or turns on the streaming operation (S970). The control unit can then determine if the user's grip has changed (S990). If the user's grip has not changed (no in S990), the operation in step S970 is continued. However, if the user's grip has changed (yes in S990), the control unit can perform a function based on a new grip pattern (S1000).

Alternatively, if the user's grip pattern does not correspond to the user view contents (no in S960), the control unit performs a function based on the grip pattern. The below Table 1 illustrates different functions being performed for different grip patterns (S980).

FIG. 37 also illustrates both the user's eye movement and grip pattern being used in order to determine how to operate functions between the mobile terminal 3610 and the display device 3600 (S1010).

In more detail, the below Table 1 illustrates functions being performed by different eye patterns and grip patterns. The user can also define their own grip patterns and what functions should be executed based on the grip pattern.

TABLE 1

| | Function |
|---|---|
| Eye Pattern | |
| Looking at TV | Turn off mobile terminal streaming operation |
| Looking at mobile terminal | Maintain or turn on streaming |
| Looking away from TV and mobile terminal | Turn off mobile terminal streaming time/shift record |
| Grip Pattern | |
| Phone call grip | Stop streaming to mobile terminal; time shift TV |
| Viewing video grip | Turn on/maintain streaming to mobile terminal |
| Texting grip | Display/execute (overlay) text window |
| Internet searching grip | Display/execute Internet browser |
| Camera grip | Execute/turn on camera |
| Undefined grip | Notify user |
| User-defined grip | Refer to function table |
| User-defined Grip | |
| Grip Pattern # 1 | Texting |
| Grip Pattern # 2 | Video watching |
| Grip Pattern # 3 | Phone calling |
| Grip Pattern # 4 | Internet searching/viewing |

TABLE 1-continued

| | Function |
|---|---|
| Grip Pattern # 5 | Camera |
| Grip Pattern # N | User-defined function |

Thus, with reference to Table 1, the control unit can determine the eye pattern, grip pattern or both in order to determine what function is executed. As discussed above, if the user is looking at the display device, the control unit can turn off the mobile terminal streaming operation. If the user is looking at the mobile terminal, the control unit can maintain or turn on the streaming operation. If the user is looking away from the mobile terminal and the display device, the control unit can turn off the streaming operating and/or perform a time shift recording operation. These features are discussed above with respect to FIG. 37.

Regarding the grip patterns, if the grip pattern corresponds to a phone call grip pattern, the control unit can stop the steaming operation between the display device 3600 and mobile terminal 3610 and/or can start a time shift recording operation. FIG. 43 illustrates the grip pattern for a phone call operation. Thus, if the user is watching a streaming operation on their mobile terminal 3610 from the display device 3600 and receives an incoming call, the control unit of the display device 3600 or the mobile terminal 3610 automatically stops streaming the contents to the mobile terminal and/or starts a recording operation. Thus, the user can answer the phone call and then return to viewing the contents.

In addition, if the grip pattern is viewing a video or contents on the mobile terminal 3610, the control unit can maintain the streaming operation to the mobile terminal or if the streaming operation has not yet started, to start the streaming operation. Thus, the user can merely grab their mobile terminal using the video viewing grip, and the control unit automatically either starts the streaming operation or maintains a current streaming operation.

Further, as shown in Table 1, the user also has a particular grip when texting. Thus, when the grip pattern indicates the user is texting or beginning to text, the control unit can display or execute a text window on the mobile terminal 3610. In more detail, if the user is watching a streamed video on their mobile terminal 3610 and wants to let another user know about the video, the user may want to start a text message session with the other user. In the present invention, the user merely needs to grip the phone using their standard text grip pattern and the control unit automatically displays a text window on the mobile terminal 3610. In addition, so that the user can continue to watch the streaming operation, the control unit can display the text message window in an overlaying manner on the content being displayed on the mobile terminal 3610. Alternatively, the control unit may display the text message window on the display device 3600.

In addition, one example of using both the user's eye movement and grip pattern is as follows. If the user is watching a video streaming operation on their mobile terminal 3610 and wants to text another user, the user may grab the phone using their standing text gripping pattern. Then, the control unit starts or executes the text messaging process. If the user then stops looking at the mobile terminal 3610 and looks at the display device 3600, the control unit can automatically display the text messaging window on the display device 3600 rather than on the mobile terminal 3610. Thus, in this example, both the grip pattern and user's eye movement are used in order to determine the operations to be controlled. This is true for each of the grip pattern and eye patterns discussed in Table 1 and the above description.

Similar comments apply to the Internet searching grip. That is, FIG. 45 illustrates one example of a grip pattern used when searching the Internet. Thus, when the control unit determines the grip pattern in FIG. 45 holding the mobile terminal, the control unit can display or execute an Internet browser on the mobile terminal 3610. Again, if the user's eye movement moves away from the mobile terminal 3610 towards the display device 3600, the control unit can execute or display the Internet browser on the display device 3600 instead of the mobile terminal 3610. This is another example of using a combination of the user's eye movement and grip patterns when determining the operation to be performed.

Another grip pattern is when the user is taking a picture. FIG. 46 illustrates the user taking a picture of himself and a friend. Thus, in this example, the user has a particular grip pattern as shown in FIG. 46 that indicates the user is taking a picture. The control unit can then execute or turn on the camera function based on the camera grip pattern. If the user was watching a streaming operation prior to gripping the mobile terminal 3610 using the camera grip pattern, the control unit can stop the streaming operation between the display device 3600 and mobile terminal 3610, because the user is using the mobile 3610 as a camera.

Table 1 also illustrates an undefined grip pattern. In particular, if the control unit cannot determine the grip pattern and what function to perform, the control unit can notify the user that the grip pattern is undefined. Table 1 also illustrates user-defined grip patterns. In particular, the user can set particular grip patterns and particular functions. For example, the user can set a first grip pattern to be a texting grip pattern, a second grip pattern to be a video watching grip pattern, a third grip pattern to be a phone calling grip pattern, etc. These features are illustrated in the bottom portion of Table 1.

Thus, according to the present invention, the grip pattern and user's eye movement can be used individually or in combination to determine what function should be performed on the display device, the mobile terminal or between the display device and the mobile terminal.

Figure 38:
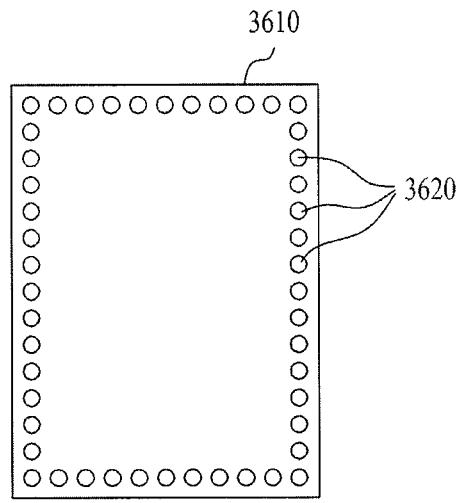
FIG. 38 is an overview of a mobile terminal including sensors for detecting different grip patterns of the mobile terminal.

Turning now to FIGS. 38-46, which illustrate features regarding the different grip patterns. In particular, FIG. 38 is an overview of a mobile terminal 3610 including a plurality of sensors 3620. In particular, the sensors 3620 can be placed around the mobile terminal 3610 in order to determine the different grip patterns of the user. The sensors can be pressure sensors, for example, which can determine pressure being applied by the user's fingers. The sensors 3620 in FIG. 38 are merely examples, and the sensors can be placed in different patterns. For example, the sensors 3620 can be placed on particular areas of the mobile terminal 3610 which receive a grip pattern from the user. The positions include top surfaces, side surfaces and bottom surfaces of the mobile terminal 3610. Thus, using the sensors 3620, the control unit can determine the grip pattern of the mobile terminal 3610. In addition, the control unit of the mobile terminal 3610 can determine the grip pattern of the user gripping the mobile terminal 3610 and then transmit this information to the control unit of the display device 3600 as discussed above.

Next, FIG. 39(a) illustrates the user gripping the mobile terminal 3610. As shown in FIG. 39(a), the particular grip pattern may correspond to a video viewing grip pattern. Thus, when the user grips the mobile terminal 3610 using the grip pattern shown in FIG. 39(a), the control unit can determine that the grip pattern corresponds to a viewing video grip pattern. FIG. 39(b) illustrates the different areas touched in FIG. 39(a). Thus, when the mobile terminal 3610 determines the grip pattern corresponding to that shown in FIG. 39, the function can be executed based on this particular grip pattern.

FIG. 40 illustrates another example of a viewing video grip pattern. As shown in FIG. 40(a), the user is currently viewing a video. Note that the grip pattern in FIG. 40(a) is slightly different than the grip pattern shown in FIG. 39(a), but both are grip patterns for the viewing contents. Thus, both of these grip patterns can be designated as viewing video content grip patterns. The user can also set one of these grip patterns to be for video viewing and another to be for picture taking, for example. A table can be stored in the memory such as that shown in Table 1 which includes the different grip patterns and the functions that are performed based on the particular grip patterns. As discussed above, the user can also define what grip patterns correspond to what functions and this information can be stored in the memory.

FIG. 40(b) illustrates the different positions touched or gripped by the user of the mobile terminal. In particular, FIG. 40(b) illustrates three positions touched by the gripping of the mobile terminal by the user. In addition, the user is selecting the home button or pressing the home button in FIG. 40(a). This additional information can also be used to determine the grip pattern. In particular, because the grip pattern in FIGS. 40(a) and (b) appear to illustrate the video viewing grip pattern, the control unit can use the additional input operation of the home button to determine whether this particular grip pattern is actually the video grip pattern or a picture taking grip pattern (or other grip patterns). Thus, the user's actions on the mobile terminal can be used to distinguish what grip pattern is being used.

FIG. 41(a) illustrates yet another example of a grip pattern for viewing video contents. As shown in FIG. 41(b), the grip pattern includes four positions touched by the user's four fingers excluding their thumb. Thus, the control unit can determine from the sensors 3620 what grip pattern is being used. In FIG. 41(b), the sensors can determine that four positions have been gripped, and thus determine this is a viewing video grip pattern.

Next FIG. 42 illustrates the mobile terminal 3610 being docked in a docking station 3650. In this example, the control unit of the mobile terminal 3610 determines the grip pattern is actually a docking station 3650. Thus, the control unit can determine the docking station 3650 touches and secures the mobile terminal 3610 on the bottom and lower side surfaces of the mobile terminal 3610 as shown in FIG. 42(b). Thus, in this example, the control unit can determine that the user is viewing video contents, especially when the user's eye movement is directed at the mobile terminal 3610. Thus, in this example, the control unit can either start the streaming process from the display device 3600 to the mobile terminal 3610 or continue the streaming service. This is another example of using a combination of both the grip pattern and the eye pattern of the user in order to determine what function to perform.

In addition, as discussed above, FIG. 43 illustrates a user performing a call function. As shown in FIG. 43(a), the user grips the phone with their left hand. FIG. 43(b) illustrates the different touch patterns occurred based on this particular grip pattern. In addition, FIG. 43 illustrates a user gripping the phone with their left hand. However, the user can also grip the phone with their right hand (especially if they are a right handed user) and will have a similar grip pattern as shown in FIG. 43(b) except the grip pattern would be switched.

FIG. 44 illustrates a grip pattern used for texting. In particular, FIG. 44(a) illustrates the user gripping the lower portion of the mobile terminal 3610 in which four regions of the phone are touched as shown in FIG. 44(b). Thus, the control unit can determine the user is performing a texting operation based on this particular grip pattern. In addition, as shown in FIG. 44(a), the user's thumbs are actually touching the keypads. Thus, this addition information case be used to determine the grip pattern is particularly for texting. In addition, if the user is currently viewing a streaming operation, the text message window can be overlayed on the currently streamed content and can also be displayed on the display device 3600 when the user's eyes move to the display device 3600 (as discussed above).

FIG. 45 illustrates an example of a user performing an Internet searching or reading operation. As shown in FIG. 45, the user is gripping the mobile 3610 with their left hand and is using a pointer device 3660 to access information on the displayed page. Thus, the controller can determine that the mobile terminal has a grip pattern as shown in FIG. 45(b), which corresponds to an Internet searching or similar function. Thus, the control unit can automatically execute an Internet browser or perform other similar functions based on this particular grip pattern.

In addition, FIG. 46 illustrates a user taking a picture of himself and a friend. Thus, the control unit can determine the grip pattern includes three touches as shown in FIG. 46(b) and then automatically execute the camera function when the user uses this particular grip pattern.

Thus, as discussed above, the present invention provides a method of controlling the mobile terminal and display device based on the grip pattern of the user, the eye movement of the user or both the grip pattern and eye movement of the user.

Accordingly, the present invention provides the following advantages.

First of all, the present invention provides an interfacing method and environment for communications between a plurality of devices, thereby enabling a service limited to a specific device to be used by various devices more user-friendly.

Secondly, the present invention provides an interfacing method and environment among a plurality of devices, thereby providing various kinds of services.

Thirdly, the present invention raises product satisfaction for devices, thereby encouraging consumer's desire for purchase.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
a display configured to display multimedia contents;
a wireless communication unit configured to wirelessly communicate with at least one external mobile terminal;
a camera unit configured to sense an eye movement of a user holding the mobile terminal; and
a controller configured to receive indication signals from the mobile terminal, the indication signals indicating data on both a grip pattern and an eye movement, and to control a streaming operation of streaming the multimedia contents displayed on the display to the mobile terminal based on a combination of the grip pattern and eye movement included in the received indication signals, wherein the grip pattern is sensed by both a user and a docking station for the mobile terminal, wherein, if the grip pattern is sensed by docking the docking station and video content is displayed on the mobile terminal, the controller is configured to determine either receiving the streaming contents from the external display device or continuing the streaming service based on the eye movement of a user, or wherein if the grip pattern is sensed by docking the docking station, the controller is configured to control the streaming contents to not be displayed and a predefined function to be performed based on the eye movement of a user, wherein the grip pattern includes a first grip pattern mapping with a function predefined by the mobile terminal, a second grip pattern mapping with a function set by a user and a third grip pattern that a sensed grip pattern is an undefined grip pattern, and wherein the controller is further configured to control to notify the user of a user interface for executing a function when the grip pattern is the third grip pattern.

2. The display device of claim 1, wherein, when the indication signals received from the mobile terminal indicate the eye movement of the user is looking at the display and is not looking at the mobile terminal, the controller is further configured to stop the streaming operation of streaming the multimedia contents to the mobile terminal.

3. The display device of claim 1, wherein, when the indication signals received from the mobile terminal indicate the eye movement of the user is looking at the mobile terminal and is not looking at the display, the controller is further configured to start the streaming operation of streaming the multimedia contents to the mobile terminal or maintain the streaming operation.

4. The display device of claim 1, wherein, when the indication signals received from the mobile terminal indicate the eye movement of the user is looking away from the display and the mobile terminal, the controller is further configured to start a time shift recording operation for recording the multimedia contents.

5. The display device of claim 4, wherein the controller is further configured to stop displaying the multimedia contents on the display and to stop the streaming operation of streaming the multimedia contents to the mobile terminal when the time shift recording operation is started.

6. The display device of claim 1, wherein the camera unit includes a face recognition process for recognizing facial expressions of the user, and wherein the controller is further configured to determine the eye movement of the user by analyzing the facial expressions of the user.

7. The display device of claim 1, wherein the controller is further configured to selectively control the streaming operation of the multimedia contents to the mobile terminal based on a type of a particular grip pattern.

8. The display device of claim 1, wherein the first or second different grip pattern includes one of a phone calling grip pattern indicating the user is calling another terminal, a viewing video contents grip pattern indicating the user is viewing video contents on the mobile terminal, a texting grip pattern indicating the user is texting another terminal, and an internet viewing grip indicating the user is viewing internet contents on the mobile terminal.

9. The display device of claim 8, wherein, when the grip pattern included in the indication signals indicates the phone calling grip pattern, the controller is further configured to stop the streaming operation of streaming the multimedia contents to the mobile terminal and to start a time shift recording operation for recording the multimedia contents.

10. The display device of claim 8, wherein, when the grip pattern included in the indication signals indicates the viewing video contents grip pattern, the controller is further configured to start the streaming operation of streaming the multimedia contents to the mobile terminal or maintain the streaming operation.

11. The display device of claim 8, wherein, when the grip pattern included in the indication signals indicates the texting grip pattern, the controller is further configured to determine if the streaming operation is currently streaming the multimedia contents to the mobile terminal, and if the multimedia contents are currently being streamed, to overlay a text message window on the mobile terminal with the streaming contents.

12. The display device of claim 11, wherein, when the eye movement included in the indication signals indicates the user is looking at the display device while gripping the mobile terminal with the texting grip pattern, the controller is further configured to display the text message window on the display instead of on the mobile terminal.

13. The display device of claim 8, wherein, when the grip pattern included in the indication signals indicates the internet viewing grip pattern, the controller is further configured to determine if the streaming operation is currently streaming the multimedia contents to the mobile terminal, and if the multimedia contents are currently being streamed, to overlay an internet window on the mobile terminal with the streaming contents.

14. The display device of claim 13, wherein, when the eye movement included in the indication signals indicates the user is looking at the display device while gripping the mobile terminal with the internet viewing grip pattern, the controller is further configured to display the internet window on the display instead of on the mobile terminal.

15. A mobile terminal, comprising:

a display configured to display multimedia contents;

a wireless communication unit configured to wirelessly communicate with at least one external display device;

a sensor unit configured to sense a grip pattern of a user holding the mobile terminal;

a camera unit configured to sense an eye movement of the user holding the mobile terminal; and a controller configured to receive indication signals indicating data on both a grip pattern and an eye movement, and to control a streaming operation of streaming contents based on a combination of the grip pattern and eye movement included in the received indication signals between the mobile terminal and the external display device, wherein the grip pattern is sensed by both a user and a docking station for the mobile terminal, wherein, if the grip pattern is sensed by docking the docking station and video contents is displayed on the mobile terminal, the controller is configured to determine either receiving the streaming contents from the external display device or continuing the streaming service based on the eye movement of a user, or wherein if the grip pattern is sensed by docking the docking station, the controller is configured to control the streaming contents to not be displayed and a predefined function to be performed based on the eye movement of a user, wherein the grip pattern includes a first grip pattern mapping with a function predefined by the mobile terminal, a second grip pattern mapping with a function set by a user and a third grip pattern that a sensed grip pattern is an undefined grip pattern, and wherein the controller is further configured to control to notify a user of a user interface for executing a function when the grip pattern is the third grip pattern.

16. The mobile terminal of claim 15, wherein, when the indication signals indicate the eye movement of the user is looking at the external display device and is not looking at the mobile terminal, the controller is further configured to instruct the external display device to stop the streaming operation of streaming the contents to the mobile terminal.

17. The mobile terminal of claim 15, wherein, when the indication signals indicate the eye movement of the user is looking at the mobile terminal and is not looking at the external display device, the controller is further configured to instruct the external display device to start the streaming operation of streaming the contents to the mobile terminal or maintain the streaming operation.

18. The mobile terminal of claim 15, wherein, when the indication signals indicate the eye movement of the user is looking away from the external display device and the mobile terminal, the controller is further configured to instruct the external display device to start a time shift recording operation for recording the multimedia contents.

19. The mobile terminal of claim 18, wherein the controller is further configured to stop displaying the multimedia contents on the display and to instruct the external display device to stop the streaming operation of streaming the multimedia contents to the mobile terminal when the time shift recording operation is started.

20. The mobile terminal of claim 15, wherein the camera unit includes a face recognition process for recognizing facial expressions of the user, and wherein the controller is further configured to determine the eye movement of the user by analyzing the facial expressions of the user.

21. The mobile terminal of claim 15, wherein the controller is further configured to instruct the external display device to selectively control the streaming operation of the multimedia contents to the mobile terminal based on a type of a particular grip pattern.

22. The mobile terminal of claim 15, wherein the first or second grip pattern includes one of a phone calling grip pattern indicating the user is calling another terminal, a viewing video contents grip pattern indicating the user is viewing video contents on the mobile terminal, a texting grip pattern indicating the user is texting another terminal, and an internet viewing grip indicating the user is viewing internet contents on the mobile terminal.

23. The mobile terminal of claim 22, wherein, when the grip pattern included in the indication signals indicates the phone calling grip pattern, the controller is further configured to instruct the external display device to stop the streaming operation of streaming the multimedia contents to the mobile terminal and to start a time shift recording operation for recording the multimedia contents.

24. The mobile terminal of claim 22, wherein, when the grip pattern included in the indication signals indicates the viewing video contents grip pattern, the controller is further configured to instruct the external display device to start the streaming operation of streaming the multimedia contents to the mobile terminal or maintain the streaming operation.

25. The mobile terminal of claim 22, wherein, when the grip pattern included in the indication signals indicates the texting grip pattern, the controller is further configured to determine if the streaming operation is currently streaming the multimedia contents to the mobile terminal, and if the multimedia contents are currently being streamed, to overlay a text message window on the mobile terminal with the streaming contents.

26. The mobile terminal of claim 25, wherein, when the eye movement included in the indication signals indicates the user is looking at the display device while gripping the mobile terminal with the texting grip pattern, the controller is further configured to display the text message window on the external display device instead of on the mobile terminal.

27. The mobile terminal of claim 22, wherein, when the grip pattern included in the indication signals indicates the internet viewing grip pattern, the controller is further configured to determine if the streaming operation is currently streaming the multimedia contents to the mobile terminal, and if the multimedia contents are currently being streamed, to overlay an internet window on the mobile terminal with the streaming contents.

28. The mobile terminal of claim 27, wherein, when the eye movement included in the indication signals indicates the user is looking at the display device while gripping the mobile terminal with the internet viewing grip pattern, the controller is further configured to display the internet window on the external display device instead of on the mobile terminal.

* * * * *